(12) United States Patent
Lee et al.

(10) Patent No.: US 11,716,615 B2
(45) Date of Patent: Aug. 1, 2023

(54) NETWORK ARCHITECTURE AND SECURITY WITH SIMPLIFIED MOBILITY PROCEDURE

(71) Applicant: QUALCOMM Incorporated, San Diego, CA (US)

(72) Inventors: Soo Bum Lee, San Diego, CA (US); Gavin Bernard Horn, La Jolla, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 16/825,963

(22) Filed: Mar. 20, 2020

(65) Prior Publication Data

US 2020/0220850 A1    Jul. 9, 2020

Related U.S. Application Data

(62) Division of application No. 15/160,282, filed on May 20, 2016, now Pat. No. 10,637,834.
(Continued)

(51) Int. Cl.
  *H04W 12/041*   (2021.01)
  *H04L 9/40*   (2022.01)
  (Continued)

(52) U.S. Cl.
  CPC ......... *H04W 12/041* (2021.01); *H04L 41/082* (2013.01); *H04L 63/0428* (2013.01);
  (Continued)

(58) Field of Classification Search
  CPC ... H04W 12/04; H04W 12/041; H04W 12/06; H04W 12/0431; H04W 12/069;
  (Continued)

(56) References Cited

U.S. PATENT DOCUMENTS

| 8,660,575 B2 | 2/2014 | Fischer et al. |
| 2007/0171871 A1* | 7/2007 | Forsberg ............... H04W 12/04 713/171 |

(Continued)

FOREIGN PATENT DOCUMENTS

| CN | 102017706 A | 4/2011 |
| WO | 2011142624 A2 | 11/2011 |

(Continued)

OTHER PUBLICATIONS

3GPP TR 33.868 V0.17.0 (Jan. 2014) Technical Report; 3rd Generation Partnership Project; Technical Specification Group Services Aspects; Security aspects of Machine-Type and other Mobile Data Applications Communications Enhancements; pp. 1-118, Release 12. (Year: 2014).*

(Continued)

*Primary Examiner* — Shanto Abedin
(74) *Attorney, Agent, or Firm* — Loza & Loza LLP

(57) ABSTRACT

In an aspect, a network supporting a number of client devices includes a network device that generates a context for a client device. The client device context may include network state information for the client device that enables the network to communicate with the client device. The client device may obtain, from a network device that serves a first service area of the network, information that includes a first client device context. The client device may enter a second service area of the network served by a second network device. Instead of performing a service area update procedure with the network, the client device may transmit a packet in the different service area with the information that includes the client device context. The client device may receive a service relocation message including information associated with the different network device in response to the transmission.

20 Claims, 21 Drawing Sheets

Related U.S. Application Data

(60) Provisional application No. 62/191,460, filed on Jul. 12, 2015.

(51) Int. Cl.
| | | |
|---|---|---|
| *H04L 41/082* | (2022.01) | |
| *H04W 52/02* | (2009.01) | |
| *H04W 8/08* | (2009.01) | |
| *H04W 76/10* | (2018.01) | |
| *H04W 12/04* | (2021.01) | |
| *H04W 12/06* | (2021.01) | |
| *H04W 12/069* | (2021.01) | |
| *H04W 12/0431* | (2021.01) | |
| *H04W 36/00* | (2009.01) | |
| *H04W 4/70* | (2018.01) | |

(52) U.S. Cl.
CPC ........ *H04L 63/062* (2013.01); *H04L 63/0876* (2013.01); *H04L 63/0892* (2013.01); *H04W 8/08* (2013.01); *H04W 12/04* (2013.01); *H04W 12/0431* (2021.01); *H04W 12/06* (2013.01); *H04W 12/069* (2021.01); *H04W 52/0209* (2013.01); *H04W 76/10* (2018.02); *H04W 4/70* (2018.02); *H04W 36/0038* (2013.01); *Y02D 30/70* (2020.08)

(58) Field of Classification Search
CPC .... H04W 76/10; H04W 8/08; H04L 63/0428; H04L 63/062; H04L 63/0876; H04L 63/0892
See application file for complete search history.

(56) References Cited

U.S. PATENT DOCUMENTS

| | | | |
|---|---|---|---|
| 2008/0225770 A1 | 9/2008 | Cho et al. | |
| 2008/0254800 A1* | 10/2008 | Chun | H04W 36/0033 455/438 |
| 2009/0258631 A1* | 10/2009 | Forsberg | H04L 63/08 455/411 |
| 2010/0323705 A1 | 12/2010 | Iwamura et al. | |
| 2011/0002300 A1 | 1/2011 | Lee et al. | |
| 2011/0059736 A1 | 3/2011 | Norrman et al. | |
| 2011/0200013 A1 | 8/2011 | Cheng et al. | |
| 2011/0250892 A1 | 10/2011 | Gupta et al. | |
| 2012/0106370 A1 | 5/2012 | Radulescu et al. | |
| 2012/0149383 A1 | 6/2012 | Wang et al. | |
| 2012/0195255 A1 | 8/2012 | Nylander et al. | |
| 2012/0258715 A1 | 10/2012 | Souissi et al. | |
| 2012/0309419 A1 | 12/2012 | Lee et al. | |
| 2013/0005344 A1 | 1/2013 | Dimou et al. | |
| 2013/0128873 A1* | 5/2013 | Eipe | H04W 76/10 370/338 |
| 2014/0066073 A1 | 3/2014 | Kwag | |
| 2014/0078890 A1 | 3/2014 | Lu et al. | |
| 2014/0115187 A1 | 4/2014 | Li et al. | |
| 2014/0198637 A1* | 7/2014 | Shan | H04W 52/244 370/229 |
| 2014/0349570 A1 | 11/2014 | Pan et al. | |
| 2015/0146519 A1 | 5/2015 | Zakrzewski | |
| 2015/0312322 A1 | 10/2015 | Kamat et al. | |
| 2016/0006726 A1* | 1/2016 | Mizikovsky | H04L 63/061 713/171 |
| 2016/0007138 A1* | 1/2016 | Palanisamy | H04W 4/70 455/41.2 |
| 2016/0128020 A1 | 5/2016 | Agarwal et al. | |
| 2016/0330610 A1* | 11/2016 | Bindrim | H04W 12/08 |
| 2016/0381662 A1* | 12/2016 | Wang | H04W 12/00 370/329 |
| 2017/0012947 A1 | 1/2017 | Lee et al. | |
| 2017/0041841 A1 | 2/2017 | Pedersen et al. | |
| 2017/0094577 A1 | 3/2017 | Kim et al. | |

FOREIGN PATENT DOCUMENTS

| | | |
|---|---|---|
| WO | 2012175664 A2 | 12/2012 |
| WO | 2014124318 A1 | 8/2014 |
| WO | 2015018074 A1 | 2/2015 |

OTHER PUBLICATIONS

Seung-Man Chun et al, CoAP-Based Mobility Management for the Internet of Things, Sensors. (Year: 2015).*

An Overview of Next-Generation Mobile WiMAX Technology.*

3GPP TR 23.887: 3rd Generation Partnership Project, Technical Specification Group Services and System Aspects, Study on Machine-Type Communications (MTC) and Other Mobile Data Applications Communications Enhancements (Release 12), 3GPP Standard, 3rd Generation Partnership Project (3GPP), Mobile Competence Centre, 650, Route Des Lucioles, F-06921 Sophia-Antipolis Cedex, France, vol. SA WG2, No. V12.0.0, Dec. 20, 2013 (Dec. 20, 2013), pp. 1-151, XP050729146, [retrieved on Dec. 20, 2013] sections 5.1.2, 7, 8.1, 8.3, 8.4, 9.4, Annex A.

3GPP TR 33.868: "3rd Generation Partnership Project; Technical Specitication Group services and system Aspects Security aspects of Machine-Type and other Mobile Data Applications Communications Enhancements; (Release 12)", 3GPP Draft; 33868-100, V1.0.0, 3rd Generation Partnership Project (3GPP), Mobile Competence Centre; 650, Route Des Lucioles; F-06921 Sophia-Antipolis Cedex; France, Mar. 5, 2014 (Mar. 5, 2014), pp. 1-119, XP050802671, Retrieved from the Internet: URL: http://www.3gpp.org/ftp/Meetings_3GPP_SYNC/SA/SA/Docs/ [retrieved on Mar. 5, 2014.

Barton B., "LTE and Beyond", Apr. 29, 2012, pp. 1-10, http://www.lteandbeyond.com/2012/04/tracking-area-update-tau-procedure.html.

De S., et al., "Semantic Enablers for Dynamic Digital-Physical Object Associations in a Federated Node Architecture for the Internet of Things," Jul. 2014, 28 pages.

International Preliminary Report on Patentability—PCT/US2016/037066, The International Bureau of WIPO—Geneva, Switzerland, dated Oct. 16, 2017.

International Search Report and Written Opinion—PCT/US2016/037066—ISA/EPO—dated Oct. 21, 2016.

Jaime Ferragut Martinez-Vara de Rey., "Traffic and Mobility Management in Large-scale Networks of Small Cells," Universitat Politecnica de Catalunya—Barcelonatech, Jun. 2014, 202 pp. https://upcommons.upc.edu/handle/2117/95451.

Michelle Do, "LTE: Tracking Area (TA) and Tracking Area Update (TAU)," NetManias, Aug. 2013, https://www.netmanias.com/en/post/blog/5930/lte-tau/lte-tracking-area-ta-and-tracking-area-update-ta . . . (Year: 2013).

Partial International Search Report—PCT/US2016/037066—ISA/EPO—dated Aug. 25, 2016.

Translation of WO2015018074, Dec. 11, 2017 https://woridwide.espacenet.com/publicationDetails/biblio?CC=WO&NR=2015018074A1&KC=A1&FT=D.

Wray Castle: "LTE Evolved Packet Core Network," First Published 2009, LT3604/V4.0, 204 pages.

Zhang etaL, WO2015018074, Feb. 12, 2015, https://woridwide.espacenet.com/publicationDetails/originaiDocument?CC=WO&NR=2015018074A1&KC=A1&FT=D&ND=&date=20150212&DB=&locale=.

European Search Report—EP22196378—Search Authority—Munich—dated Dec. 13, 2022.

* cited by examiner

NETWORK ARCHITECTURE AND SECURITY WITH SIMPLIFIED MOBILITY PROCEDURE

CROSS REFERENCE TO RELATED APPLICATIONS

This is a divisional application of U.S. application Ser. No. 15/160,282 entitled "Network Architecture and Security with Simplified Mobility Procedure" filed on May 20, 2016, which claims priority to and the benefit of U.S. Provisional Application No. 62/191,460 entitled "IoT Architecture and Security with Simplified Mobility Procedure" filed Jul. 12, 2015, the entire contents of which are incorporated herein by reference.

INTRODUCTION

Field of the Disclosure

Aspects of the disclosure relate generally to communication, and more specifically, but not exclusively, to an Internet of Things (IoT) network architecture with a simplified mobility procedure.

Background

In a conventional wireless communication network (e.g., a Long Term Evolution (LTE) network), a client device (also be referred to as an Internet of Things (IoT) device) may attach to the network by selecting a cell and registering with the network. For example, the client device may be a cellular telephone (e.g., a smartphone), a personal computer (e.g., a laptop computer), a gaming device, or any other suitable device that is configured to communicate with the network. Mobility management is implemented by the network in order to keep track of the location of the client device in the network, and to be able to find and page the client device. For example, the network may define a number of tracking areas (referred to as "service areas" in some aspects), where each tracking area includes a group of cells. Therefore, the network may determine the location of the client device by the current tracking area in which the client device is located.

Upon entering a new tracking area, the client device performs a tracking area update (TAU) operation so that the network is aware of the location (e.g., the new tracking area) of the client device. After the TAU operation is completed, the client device may begin transmitting data packets to the network. These separate operations (e.g., the TAU operation and the subsequent transmission of data packets) may increase the period of time needed for the client device to switch to a connected mode (e.g., wake up) from an idle mode, which may increase power consumption of the client device power supply (e.g., battery). Therefore, improvements to networks and mobility management procedures are needed.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, a method for a client device is provided. The client device may obtain information that includes a first client device context generated at a first network device that serves a first service area of a network, the first client device context including first network state information associated with the client device. The client device may enter a second service area of the network served by a second network device, transmit, in the second service area, data and the obtained information, and receive a service relocation message in response to the transmission, the service relocation message including information associated with the second network device. In an aspect, the first service area or the second service area is identified as a tracking area based on a tracking area identifier. In an aspect, the client device may refrain from performing a service area update procedure with the network upon entering the second service area. In an aspect, the first client device context is encrypted at the first network device based on a secret key that is only known to the first network device. In an aspect, the service relocation message includes a second client device context associated with the second network device, wherein the second client device context includes second network state information associated with the client device. In an aspect, the second client device context is encrypted at the second network device based on a secret key that is only known to the second network device. In an aspect, the client device may store the second client device context. In an aspect, the client device may establish a network connection with the first network device. In an aspect, the service relocation message includes an identifier associated with the second network device. In an aspect, the identifier is a globally unique temporary identifier. In an aspect, the client device may store the globally unique temporary identifier. In an aspect, the context is removed at the network. In an aspect, the service relocation message is a service area update accept message. In an aspect, the client device may encrypt and integrity protect the data with at least one key shared with the first network device. In an aspect, the client device is attached to the network in a reduced data transfer mode or a low power consumption mode.

In an aspect, a client device is provided. The client device may include means for obtaining information that includes a first client device context generated at a first network device that serves a first service area of a network, the first client device context including first network state information associated with the client device. The client device may further include means for entering a second service area of the network served by a second network device, means for transmitting, in the second service area, data and the obtained information, and means for receiving a service relocation message in response to the transmission, the service relocation message including information associated with the second network device. In an aspect, the first service area or the second service area is identified as a tracking area based on a tracking area identifier. In an aspect, the client device may further include means for refraining from performing a service area update procedure with the network upon entering the second service area. In an aspect, the first client device context is encrypted at the first network device based on a secret key that is only known to the first network device. In an aspect, the service relocation message includes a second client device context associated with the second network device, wherein the second client device context includes second network state information associated with the client device. In an aspect, the second client device context is encrypted at the second network device based on a secret key that is only known to the second network device. In an aspect, the client device may further include means for storing the second client device context. In an aspect, the client device may include means for establishing a network connection with the first network device. In an aspect, the service relocation message includes an identifier associated with the second network device. In an aspect, the identifier is a globally unique temporary identifier. In an aspect, the client device may further include means for storing the globally unique temporary identifier. In an aspect, the context is removed at the network. In an aspect, the service relocation message is a service area update accept message. In an aspect, the client device may further include means for encrypting and integrity protecting the data with at least one key shared with the first network device. In an aspect, the client device may be attached to the network in a reduced data transfer mode or a low power consumption mode.

In an aspect, a method for a first network device configured to serve a first service area of a network is provided. The first network device may receive, from a client device that has entered the first service area from a second service area, a data packet intended for a second network device configured to serve the second service area. The first network device may transmit the data packet and a relocation request to the second network device, and transmit a service relocation message to the client device, the service relocation message including information associated with the first network device. In an aspect, a target network function is implemented at the first network device and a source network function is implemented at the second network device. In an aspect, the first network device may receive a relocation response from the second network device, obtain a first client device context from the relocation response, and generate a second client device context based on the received relocation response, wherein the information associated with the first network device includes the second client device context. In an aspect, the first network device may encrypt the second client device context based on a secret key that is only known to the first network device. In an aspect, the second client device context is generated based on the first client device context. In an aspect, the first network device may generate the second client device context by generating a globally unique temporary identifier, and generating a security context that includes at least an encryption key, an integrity key, or an algorithm. In an aspect, the information associated with the first network device includes the globally unique temporary identifier. In an aspect, the data packet received from the client device is encrypted and integrity protected with at least one key shared between the client device and the second network device. In an aspect, the service relocation message is integrity protected.

In an aspect, a first network device configured to serve a first service area of a network is provided. The first network device may include means for receiving, from a client device that has entered the first service area from a second service area, a data packet intended for a second network device (e.g., source IoTF) configured to serve the second service area, means for transmitting the data packet and a relocation request to the second network device, and means for transmitting a service relocation message to the client device, the service relocation message including information associated with the first network device. In an aspect, a target network function is implemented at the first network device and a source network function is implemented at the second network device. The first network device may further include means for receiving a relocation response from the second network device, means for obtaining a first client device context from the relocation response, and means for generating a second client device context based on the received relocation response, wherein the information associated with the first network device includes the second client device context. The first network device may further include means for encrypting the second client device context based on a secret key that is only known to the first network device. In an aspect, the second client device context is generated based on the first client device context. In an aspect, the means for generating the second client device context may be configured to generate a globally unique temporary identifier, and generate a security context that includes at least an encryption key, an integrity key, or an algorithm. In an aspect, the information associated with the first network device includes the globally unique temporary identifier. In an aspect, the data packet received from the client device is encrypted and integrity protected with at least one key shared between the client device and the second network device. In an aspect, the service relocation message is integrity protected.

In an aspect, a method for a first network device configured to serve a first service area of a network is provided. The first network device may receive a data packet from a second network device configured to serve a second service area, wherein the data packet is generated by a client device that has entered the second service area from the first service area. The first network device may receive a relocation request from the second network device, transmit the data packet to a network entity, and transmit a relocation response message to the second network device, the relocation response message including a client device context, where the client device context includes network state information associated with the client device. In an aspect, a source network function is implemented at the first network device and a target network function is implemented at the second network device. In an aspect, the first network device may decrypt and verify the data packet.

In an aspect, a first network device configured to serve a first service area of a network is provided. The first network device may include means for receiving a data packet from a second network device (e.g., target IoTF) configured to serve a second service area, wherein the data packet is generated by a client device that has entered the second service area from the first service area. The first network device may further include means for receiving a relocation request from the second network device, means for transmitting the data packet to a network entity (e.g., gateway), and means for transmitting a relocation response message to the second network device, the relocation response message including a client device context, where the client device context includes network state information associated with the client device. In an aspect, a source network function is implemented at the first network device and a target network function is implemented at the second network device. In an aspect, the first network device may further include means for decrypting and verifying the data packet.

In an aspect, a method for a network access node is provided. The network access node may receive a data packet from a client device, and forward the data packet to a first network function implemented at a first network device, wherein the first network function is associated with the network access node and is configured to process at least one of user plane traffic or control plane traffic for the client device when the client device is in a reduced data transfer mode. In an aspect, the first network function associated with the network access node is different from a second network function indicated in the data packet, the second network function implemented at a second network device. In an aspect, the network access node may receive a control message from the first network function associated with the network access node, identify a temporary identifier in the control message, the temporary identifier associated with the client device, remove the temporary identifier from the control message, and transmit, to the client device, a service relocation message that includes the control message. In an aspect, the control message includes information associated with the first network function implemented at the first network device. In an aspect, the control message includes a client device context generated at the first network function implemented at the first network device, and wherein the client device context includes network state information associated with the client device. In an aspect, the client device context is encrypted by the first network function implemented at the first network device.

In an aspect, a network access node is provided. The network access node may include means for receiving a data packet from a client device, and means for forwarding the data packet to a first network function implemented at a first network device, wherein the first network function is associated with the network access node and is configured to process at least one of user plane traffic or control plane traffic for the client device when the client device is in a reduced data transfer mode. In an aspect, the first network function associated with the network access node is different from a second network function indicated in the data packet, the second network function implemented at a second network device. In an aspect, the network access node may further include means for receiving a control message from the first network function associated with the network access node, means for identifying a temporary identifier in the control message, the temporary identifier associated with the client device, means for removing the temporary identifier from the control message, and means for transmitting, to the client device, a service relocation message that includes the control message. In an aspect, the control message includes information associated with the first network function implemented at the first network device. In an aspect, the control message includes a client device context generated at the first network function implemented at the first network device, and wherein the client device context includes network state information associated with the client device. In an aspect, the client device context is encrypted by the first network function implemented at the first network device.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

Figure 1:
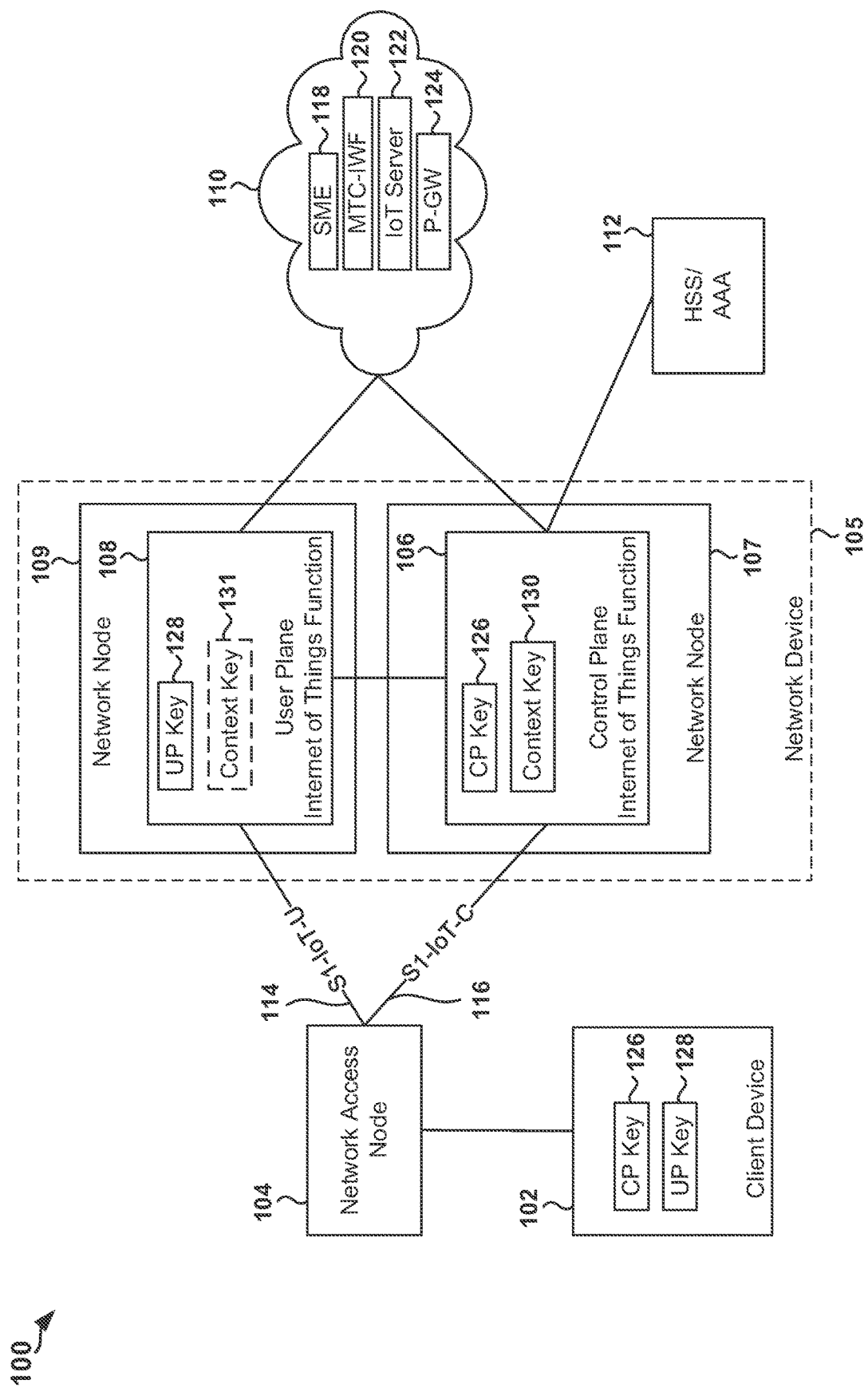
FIG. 1 is a block diagram of an Internet of Things (IoT) network architecture in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A network (e.g., an LTE network) may need to support a large number (e.g., billions) of Internet of Things (IoT) devices. For example, an IoT device may be a client device that attaches to the network as an IoT device (also referred to as an IoT device mode) or for purposes of reduced data transfer between the client device and the network. In an aspect, the reduced data transfer mode may involve infrequent small data (e.g., a single packet or a few packets) transmissions or short bursts of data. Therefore, in the present disclosure, the term client device as used herein also refers to an IoT device. A client device, for example, may be a cellular telephone (e.g., a smartphone), a personal computer (e.g., a laptop), a gaming device, an automobile, an appliance, or any other suitable device that is configured to communicate with the network. In some aspects, the client device may be referred to as a user equipment (UE) or an access terminal (AT). In some aspects, a client device as referred to herein may be a mobile device or a static device.

Since the amount of resources, such as IoT network functions and other IoT related equipment, allocated by the network for IoT purposes may be limited, the network functions implemented at the network may not be able to maintain all contexts (e.g., network state information associated with client devices) for client devices that are not frequently active. For example, client devices may wake up every 10 minutes or longer, send traffic (e.g., transmit data) to a server, and immediately enter a sleep mode. As another example, client devices may send an alert to a server when an unexpected event occurs. Furthermore, client devices may have limited resources (e.g., memory, processor, battery) and may not be suited to handle complex protocol stacks and/or signaling procedures.

The aspects disclosed herein include IoT network architectures for client devices, from an upper-layer perspective, for achieving ultra-low client device power consumption, a large number of devices per cell, and/or a small spectrum. Dedicated network functions are introduced to enable independent deployment and remove scalability/inter-working requirements. Security is anchored at an IoT network function (also referred to as an IoT Function (IoTF)) implemented at a network device. According to various aspects, the architecture may allow no security context to be maintained at a network access node (e.g., eNB, base station, network access point) for data transfer to or from client devices.

To avoid affecting normal packet data network (PDN) connection/traffic of client devices, dedicated core network resources are allocated for small data transfer. The network may allocate dedicated physical (PHY) layer resources for access control to also limit small data traffic. A client device context may be used for small data transfer to eliminate a client device's semi-persistent context at an IoTF when the client device is in an idle state. To achieve efficient data transmission for client devices, the disclosed network architectures may include an IoTF implemented at a network device.

In an aspect, an IoTF may include a control plane IoTF (IoTF-C) and a user plane IoTF (IoTF-U). In some aspects, such IoTF-C and IoTF-U may be implemented in a single IoTF. In other aspects, such IoTF-C and IoTF-U may be implemented as separate IoTFs. In an aspect of the present disclosure, an IoTF-C may have functions similar to a mobility management entity (MME). In an aspect of the present disclosure, an IoTF-U may be the mobility and security anchor for user plane data traffic. In an aspect of the present disclosure, an IoTF-U may have functions similar to a serving gateway (S-GW) and/or a network access node (e.g., evolved Node B (eNB), base station, or network access point).

In order to allow the network functions (e.g., IoTF-C, IoTF-U) to optimize resource usage for client devices, various aspects of the disclosed IoT network architectures may implement a design protocol in which a context for a client device is carried in a packet (e.g., IP packet) and the IoTF (e.g., an IoTF that includes an IoTF-C and an IoTF-U) creates the context for the client device opportunistically. This enables network functions to maintain minimal to no network state information for the client device and minimal to no signaling overhead. It should be understood that the disclosed IoT network architectures and the functions included therein may be used for any type of small data transfer. For example, a client device (e.g., smartphone) may have a nominal mode where it establishes a connection and transfers data, but also uses procedures as disclosed herein to transfer data using a client device context.

IoT Network Architecture

FIG. 1 is a block diagram of an IoT network architecture 100 in accordance with various aspects of the present disclosure. As shown in FIG. 1, the IoT network architecture 100 includes a client device 102 (also referred to as an IoT device), a network access node 104, a network device 105, a service network 110, and a home subscriber server (HSS)/authentication, authorization, and accounting (AAA) server 112. In one aspect, the network access node 104 may be an eNB, base station, or a network access point. In one aspect, the network device 105 may include one or more processing circuits and/or other appropriate hardware configured to implement an IoTF. In one aspect of the present disclosure, an IoTF may include a control plane IoT Function (IoTF-C) 106 and a user plane IoT Function (IoTF-U) 108. For example, the IoTF-C 106 may be implemented at a first network node 107 and the IoTF-U 108 may be implemented at a second network node 109. In accordance with the various aspects disclosed herein, the term "node" may represent a physical entity, such as a processing circuit, a device, a server, or a network entity, included in the network device 105. Accordingly, for example, a network node may be referred to as a network node device.

In one aspect, the IoTF-C 106 and the IoTF-U 108 may be implemented at the same hardware platform (e.g., one or more processing circuits and other associated hardware components, such as memory). In such aspect, for example, the IoTF-C 106 may be implemented at a first virtual machine (e.g., a first operating system) provided on a hardware platform (e.g., the network device 105) and the IoTF-U 108 may be implemented at a second virtual machine (e.g., a second operating system) provided on the hardware platform.

As shown in FIG. 1, the IoTF-C 106 is in communication with the network access node 104 via a first S1 connection 116, and the IoTF-U 108 is in communication with the network access node 104 via a second S1 connection 114. In an aspect of the present disclosure, the service network 110 may include a number of entities, functions, gateways, and/or servers configured to provide various types of services. For example, the service network 110 may include a short message entity (SME) 118, a machine type communication interworking function (MTC-IWF) 120, an IoT server 122, and/or a packet data network (PDN) gateway (P-GW) 124. It should be understood that the service network 110 disclosed in FIG. 1 serves as one example and that in other aspects, the service network 110 may include different types of entities, functions, and/or servers than those disclosed in FIG. 1.

In an aspect of the present disclosure, the IoTF implemented at the network device 105 may provide control plane and user plane functionality. In an aspect of the present disclosure, the IoTF-C 106 handles control plane signaling (e.g., packets carrying control information, herein referred to as "control packets") for client devices. For example, the IoTF-C 106 may perform mobility and session management for client devices, perform authentication and key agreement (also referred to as an AKA procedure) with client devices, and/or may create security contexts for client devices. In an aspect of the present disclosure, the IoTF-C 106 may derive control plane (CP) key(s) 126 for control plane traffic associated with the client device 102, user plane (UP) key(s) 128 for user plane traffic associated with the client device 102, and/or a context key(s) 130 for generating an encrypted client device context and/or encrypted network reachability context for the client device 102. In an aspect of the present disclosure, the IoTF-C 106 may provide the user plane key(s) 128 and/or at least one of the context key(s) 130 to the IoTF-U 108. Accordingly, in some aspects, the IoTF-U 108 may include the user plane key(s) 128 and/or the context key(s) 131 provided by the IoTF-C 106.

In an aspect of the present disclosure, the IoTF-U 108 may handle user plane traffic for client devices. For example, the IoTF-U 108 may derive a ciphering key and an integrity key (e.g., an Authenticated Encryption with Associated Data (AEAD) cipher using the UP key 128), create a client device context (also referred to as an IoT device context) on-the-fly, authenticate and decipher uplink (UL) packets sent by client devices and forward the uplink packets to a PDN or P-GW (e.g., P-GW 124), cipher and authenticate downlink (DL) packets for connected client devices and forward the downlink packets to the next hop network access node (e.g., eNB), and/or buffer downlink packets for idle client devices during paging. In an aspect of the present disclosure, the IoTF-U 108 may serve as a mobility and security anchor for data traffic.

Exemplary Key Hierarchy for an IoT Network

Figure 2:
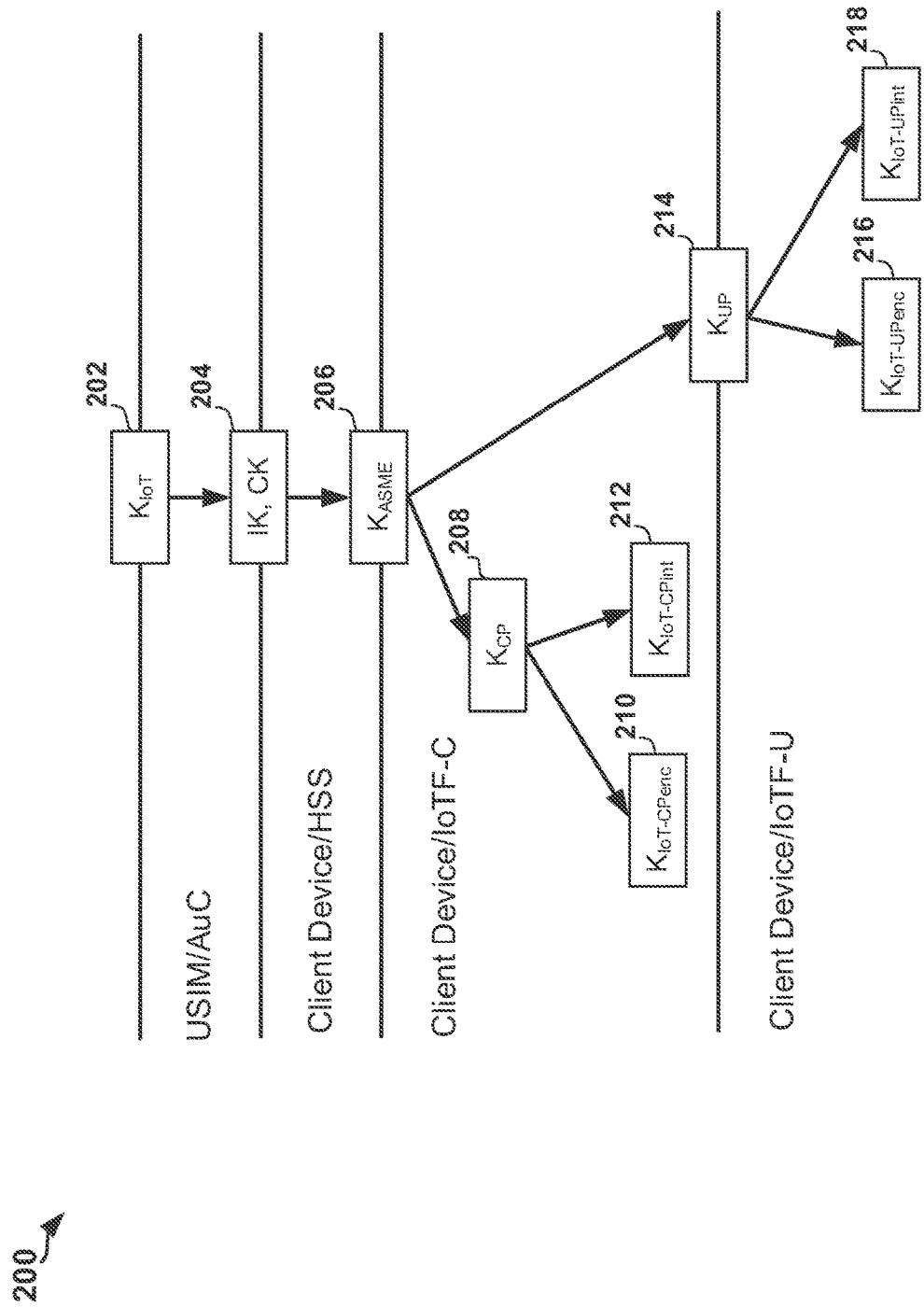
FIG. 2 is a diagram illustrating a key hierarchy for an IoT network architecture in accordance with various aspects of the present disclosure.

FIG. 2 is a diagram illustrating a key hierarchy 200 for an IoT network architecture (e.g., IoT network architecture 100) in accordance with various aspects of the present disclosure. In FIG. 2, the key $K_{IoT}$ 202 may be a secret key stored permanently in a Universal Mobile Telecommunications System (UMTS) Subscriber Identity Module (USIM) of a client device (e.g., the client device 102) and an Authentication Center (AuC)) of the network. The integrity key (IK) and cipher key (CK) (shown as IK, CK 204 in FIG. 2) are a pair of keys derived in the AuC and USIM during an AKA procedure. With reference to FIG. 1, during the AKA procedure, the IoTF-C 106 may receive authentication vectors (AVs) from the HSS/AAA server 112 which contain a key (shown in FIG. 2 as the key $K_{ASME}$ 206) from an Access Security Management Entity (ASME). The IoTF-C 106 may derive a control plane key ($K_{CP}$) 208 and a user plane key ($K_{UP}$) 214 from the key $K_{ASME}$ 206. The IoTF-C 106 may provide the key $K_{UP}$ 214 to the IoTF-U 108. The IoTF-C 106 may derive an encryption key $K_{IoT\text{-}CPenc}$ 210 and an integrity protection key $K_{IoT\text{-}CPint}$ 212 from the key $K_{CP}$ 208. The IoTF-U 108 may derive an encryption key $K_{IoT\text{-}UPenc}$ 216 and an integrity protection key $K_{IoT\text{-}UPint}$ 218 from the key $K_{UP}$ 214.

Figure 3:
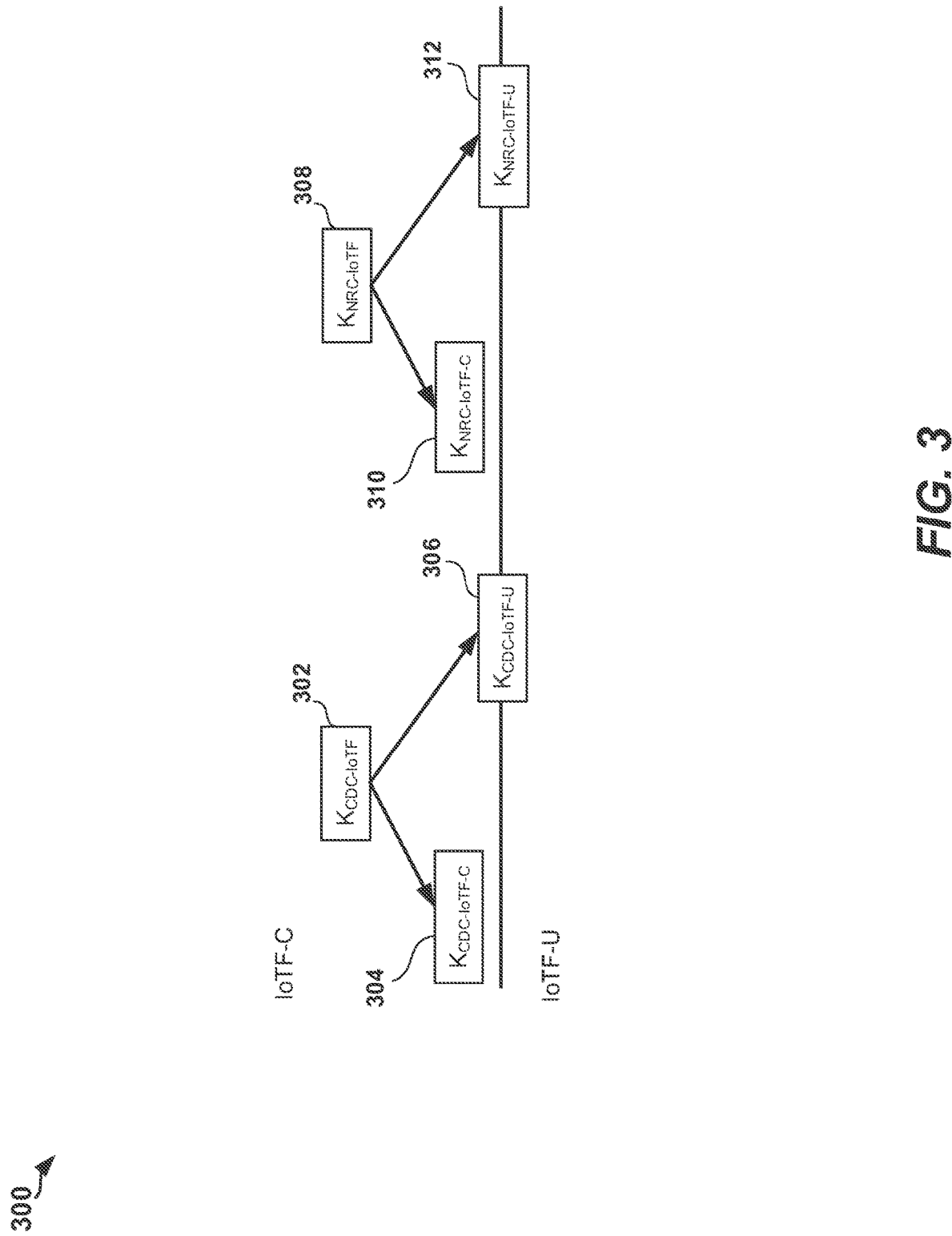
FIG. 3 is a diagram illustrating a key hierarchy for encrypting client device contexts in an IoT network architecture in accordance with various aspects of the present disclosure.

FIG. 3 is a diagram illustrating a key hierarchy 300 for encrypting contexts in an IoT network architecture (e.g., IoT network architecture 100) in accordance with various aspects of the present disclosure. In an aspect of the present disclosure, with reference to FIG. 1, the IoTF-C 106 may randomly generate a control plane client device context encryption key ($K_{CDC\text{-}IoTF\text{-}C}$) 304 and a user plane client device context encryption key ($K_{CDC\text{-}IoTF\text{-}U}$) 306 for a client device (e.g., client device 102) based on a context key $K_{CDC\text{-}IoTF}$ 302 for a client device. In an aspect of the present disclosure, with reference to FIG. 1, the IoTF-C 106 may randomly generate a network reachability context (NRC) encryption key ($K_{NRC\text{-}IoTF\text{-}C}$) 310 for the control plane based on a context key $K_{NRC\text{-}IoTF}$ 308. The IoTF-C 106 may further randomly generate a network reachability context (NRC) encryption key ($K_{NRC\text{-}IoTF\text{-}U}$) 312 for the user plane based on the context key $K_{NRC\text{-}IoTF}$ 308. For example, the key $K_{NRC\text{-}IoTF\text{-}C}$ 310 and the key $K_{NRC\text{-}IoTF\text{-}U}$ 312 may be generated for an application service or a P-GW (e.g., P-GW 124).

Exemplary Network States of a Client Device

In a wireless communication system (e.g. an LTE network), network states are defined for a client device for mobility management (e.g., Evolved Packet System Mobility Management (EMM)). Such network states enable efficient communication between a client device and other entities in the network. In an aspect of the present disclosure, a client device (e.g., client device 102 in FIG. 1) may be in a deregistered state or a registered state.

For example, when the client device is in a deregistered state, the context for the client device may be stored in the HSS. The network holds no valid location or routing information for the client device, and the client device is not reachable.

As another example, the client device may enter a registered state by a successful registration with the network. In an aspect of the present disclosure, the client device may perform such registration by performing an attach procedure with the network. In the registered state, the client device has at least one active PDN connection. The client device also has an Evolved Packet System (EPS) security context set up. It should be noted that the deregistered and registered states assume that the client device has credentials (e.g., there is a subscription available in the HSS) for the network.

A wireless communication network (e.g., an LTE network) may further include network states defined for a client device for Evolved Packet System Connection Management (ECM). Accordingly, a client device (e.g., client device 102 in FIG. 1) in a registered state may be in one of two states (also referred to as sub-states of the registered state), such as an idle state or a connected state. In the idle state, no Non-Access-Stratum (NAS) signaling connection exists between the client device and the other network entities. In the idle state, the client device may perform cell selection/reselection and public land mobile network (PLMN) selection. There may be no context for the client device in the radio access network (e.g., network access node) when the client device is in the idle state. Moreover, there may be no S1-MME and no S1-U connection for the client device in the idle state.

In the connected state, the location of the client device is known in the MME with an accuracy of a serving access network identifier (e.g., eNB identifier (ID), base station ID, or network access point ID). Mobility of the client device is handled by a handover procedure. In the connected mode, a signaling connection exists between the client device and the MME. The signaling connection may be made up of two parts: a radio resource control (RRC) connection and an S1-MME connection.

Figure 4:
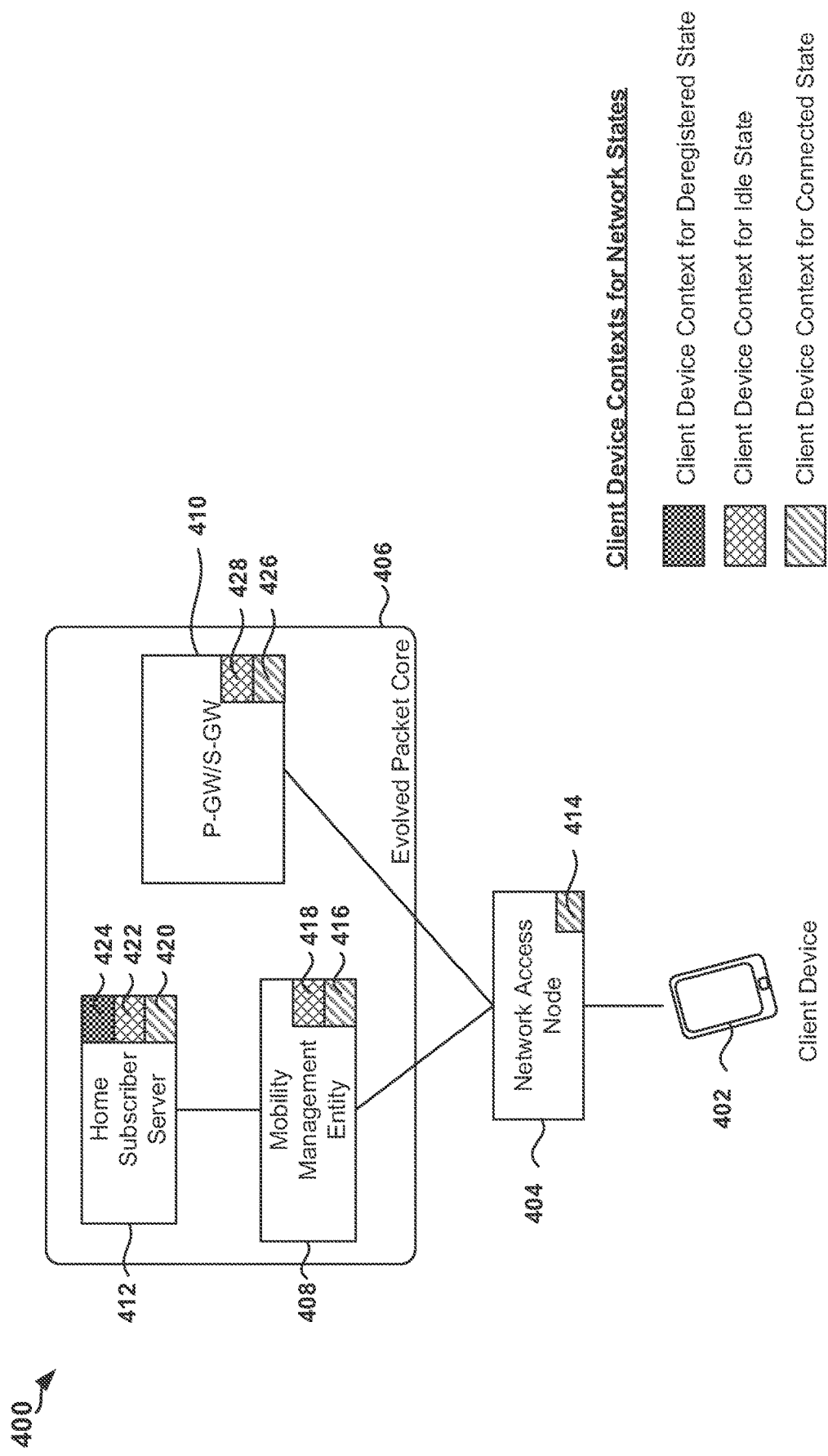
FIG. 4 is a diagram illustrating example network states of a client device maintained at various entities in a network.

FIG. 4 is a diagram illustrating example network states of a client device maintained at various entities in a network 400. As shown in FIG. 4, network 400 includes a client device 402, a network access node 404, and an Evolved Packet Core (EPC) 406. As further shown in FIG. 4, the EPC 406 includes a home subscriber server (HSS) 412, a mobility management entity (MME) 408, and a Packet Data Network Gateway (P-GW)/Serving Gateway (S-GW) 410. In an aspect of the present disclosure, the network 400 may be a 4G network. In other aspects, the network 400 may be a 3G network, an LTE network, a 5G network, or other appropriate network.

For example, with reference to FIG. 4, the network access node 404 may maintain a context 414 (also referred to as network state information) for the client device 402 when the client device 402 is in a connected state. The MME 408 may maintain a context 416 for the client device 402 when the client device 402 is in a connected state, and a context 418 for the client device 402 when the client device 402 is in an idle state. The P-GW/S-GW 410 may maintain a context 426 for the client device 402 when the client device 402 is in a connected state, and a context 428 for the client device 402 when the client device 402 is in an idle state. The HSS 412 may maintain a context 420 for the client device 402 when the client device 402 is in a connected state, a context 422 for the client device 402 when the client device 402 is in an idle state, and a context 424 for the client device 402 when the client device 402 is in a deregistered state. In an aspect of the present disclosure, if the network 400 is implemented as a 3G network, the P-GW/S-GW 410 may not maintain a context for the client device 402 when the client device 402 is in the idle state.

In an aspect of the present disclosure, an encrypted client device context may be generated for network functions, such as the IoTF-C 106 and IoTF-U 108 in FIG. 1, to enable opportunistic reconstruction of a context for a client device (also referred to as a client device context). For example, an encrypted client device context may enable a network entity to reconstruct a client device context while maintaining minimal to no network state information for the client device. Therefore, the encrypted client device context may enable a network entity to reconstruct a client device context without storing or caching any network state information. It should be noted that in the presence of potentially billions of client devices that transmit traffic infrequently, it is not desirable for network functions (e.g., the MME 408, the P-GW/S-GW 410) to maintain contexts (including security contexts) for client devices. Also, the encrypted client device context may eliminate signaling overhead at the network access node (e.g., eNB, base station, or network access point) during a handover or during transition from idle mode to connected mode. The encrypted client device context may be used to substantially reduce or eliminate signaling overhead since communication with an MME/controller may be avoided.

User Plane Encrypted Client Device Context

In an aspect of the present disclosure, a user plane (UP) encrypted client device context may be generated for a client device. For example, with reference to FIG. 1, the user plane encrypted client device context may be used at the IoTF-U 108 for uplink (UL) data transmissions. In an aspect of the present disclosure, the user plane encrypted client device context may include bearer IDs, Evolved Packet System (EPS) bearer quality of service(s) (QoS), an S5 tunnel endpoint identifier (TEID) for a user plane General Packet Radio Service (GPRS) tunneling protocol (GTP-U), a P-GW Internet Protocol (IP) address (or equivalent information) to which the IoTF-U 108 forwards UL data, a security context (e.g., a selected encryption algorithm and a user-plane (UP) key 128). In other aspects, the user plane encrypted client device context may include other parameters, values, settings, or features that may be needed by the network to provide a service to the client device. In one example, the UP key 128 may be the key $K_{UP}$ 214, from which the key $K_{IoT\text{-}UPenc}$ 216 and the key $K_{IoT\text{-}UPint}$ 218 may be derived. The UP encrypted client device context may be generated by encrypting a UP context for the client device using a secret key of the IoTF-U 108, such as the key $K_{CDC\text{-}IoTF\text{-}U}$ 306 shown in FIG. 3. In an aspect of the present disclosure, the secret key of the IoTF-U 108, such as the key $K_{CDC\text{-}IoTF\text{-}U}$ 306, may be provisioned by IoTF-C 106. The user plane encrypted client device context may be decrypted by an IoTF that has the secret key (e.g., the key $K_{CDC\text{-}IoTF\text{-}U}$ 306). Accordingly, a user plane encrypted client device context may be decrypted by the IoTF that generated the user plane encrypted client device context.

Control Plane Encrypted Client Device Context

A control plane (CP) encrypted client device context may be generated by encrypting a control plane client device context for control messages (e.g., control packets or messages including control packets). In an aspect, the control plane encrypted client device context may include a client device identifier, the client device security context (e.g., control plane keys, such as the key $K_{IoT}$ ($K_{ASME}$ equivalent), the key $K_{IoT\text{-}CPenc}$ 210, the key $K_{IoT\text{-}CPint}$ 212), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. For example, with reference to FIG. 1, the control plane client device context for control messages may be encrypted with a secret key of the IoTF-C 106, such as key $K_{CDC\text{-}IoTF\text{-}C}$ 304 shown in FIG. 3. The control plane encrypted client device context may be decrypted by an IoTF that has the secret key (e.g., the key $K_{CDC\text{-}IoTF\text{-}C}$ 304). Accordingly, an encrypted client device context may be decrypted by the IoTF that generated the control plane encrypted client device context.

Encrypted Network Reachability Context

A network reachability context (NRC) for a client device may be encrypted (e.g., by an IoTF) to generate an encrypted network reachability context for downlink (DL) transmissions to the client device. The encrypted network reachability context enables an IoTF (e.g., IoTF-C 106, IoTF-U 108) to remove a client device context when the client device becomes idle. For example, with reference to FIG. 1, the encrypted network reachability context may be provided to the IoT server 122 or to the P-GW 124 that desires to communicate with the client device 102. Therefore, in this example, the IoT network architecture 100 does not need to maintain network state information for the client device 102 or may reduce the amount of network state information maintained for the client device 102. The IoT server 122 or the P-GW 124 may provide the encrypted network reachability context when it sends a DL data packet to the client device 102 to allow one or more nodes or entities (e.g., network access node 104) in the IoT network architecture 100 to reconstruct the network reachability context.

Encrypted network reachability context(s) may include one or more of the following features. In an aspect of the present disclosure, an encrypted network reachability context may provide a mobility feature by including an identifier for retrieving the network side network state information of the client device 102, a service area identifier list (e.g., a tracking area ID (TAI) list) or equivalent to determine where to page the client device 102, and timing information (e.g., to determine when to page the client device 102). In an aspect of the present disclosure, an encrypted network reachability context may enable a context relocation procedure, such as a service area update (e.g., a tracking area update (TAU)) and optionally to obtain a new encrypted network reachability context and ID. In an aspect of the present disclosure, an encrypted network reachability context may include information extending beyond security and may indicate how security context is managed.

In an aspect of the present disclosure, the IoTF-C 106 provides information (e.g., a TAI list) to one or more entities in the service network 110 (e.g., IoT server 122 or P-GW 124). Such one or more entities in the service network 110 may then send the encrypted network reachability context to other entities in the IoT network architecture 100 to re-establish the context for the client device 102. The encrypted network reachability context(s) may be implemented for network initiated traffic. However, in some aspects involving client device initiated traffic or network initiated traffic, the IoTF implemented at the network device 105 may maintain very limited to no network state information for the client device 102. In an aspect of the present disclosure, the IoTF-C 106 may provide the location of client device 102 in terms of at least a TAI list, which may be a portion of a network reachability context.

Initial Attach Procedure

Figure 5:
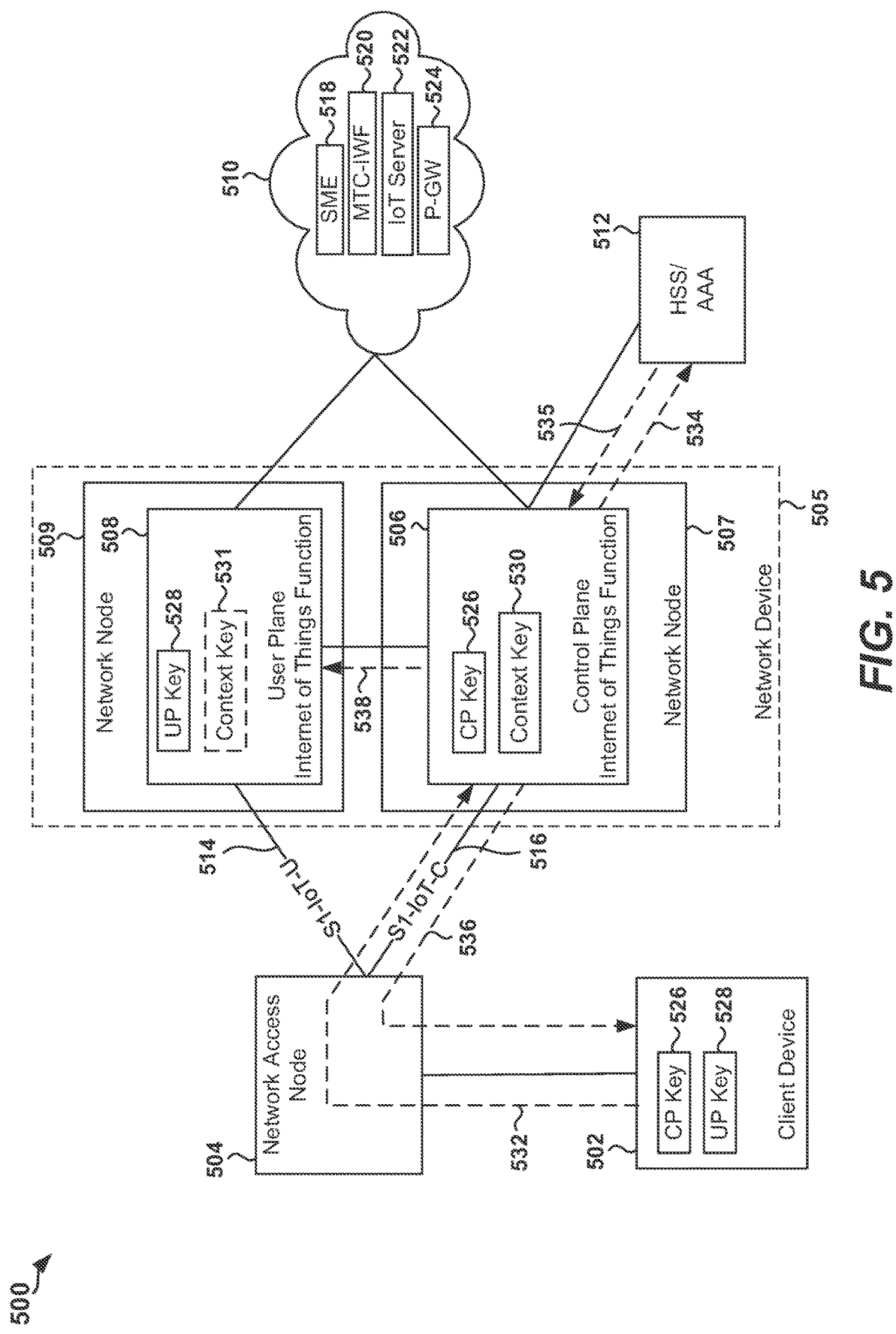
FIG. 5 is a block diagram illustrating an initial attach procedure by a client device in an IoT network architecture in accordance with various aspects of the present disclosure.

FIG. 5 is a block diagram illustrating an initial attach procedure by a client device in an IoT network architecture 500 in accordance with various aspects of the present disclosure. In some aspects, an attach procedure as described herein is also referred to as a network attachment procedure or a registration procedure.

As shown in FIG. 5, the IoT network architecture 500 includes a client device 502 (also referred to as an IoT device), a network access node 504 (e.g., eNB, base station, network access point), a network device 505, a service network 510, and a home subscriber server (HSS)/authentication, authorization, and accounting (AAA) server 512. In one aspect, the network device 505 may include one or more processing circuits and/or other appropriate hardware configured to implement an IoTF. For example, an IoTF may include a control plane IoT Function (IoTF-C) 506 and a user plane IoT Function (IoTF-U) 508. In such aspect, the IoTF-C 506 may be implemented at a first network node 507 and the IoTF-U 508 may be implemented at a second network node 509. In one aspect, the IoTF-C 506 and the IoTF-U 508 may be implemented at the same hardware platform, such that the IoTF-C 506 and the IoTF-U 508 each represent an independent node in the architecture 500. In such aspect, for example, the IoTF-C 506 may be implemented at a first virtual machine (e.g., a first operating system) provided on a hardware platform (e.g., the network device 505) and the IoTF-U 508 may be implemented at a second virtual machine (e.g., a second operating system) provided on the hardware platform.

As shown in FIG. 5, the IoTF-C 506 is in communication with the network access node 504 via a first S1 connection 516, and the IoTF-U 508 is in communication with the network access node 504 via a second S1 connection 514. In an aspect of the present disclosure, the service network 510 may include a number of entities, functions, gateways, and/or servers configured to provide various types of services. For example, the service network 510 may include a short message entity (SME) 518, a machine type communication interworking function (MTC-IWF) 520, an IoT server 522, and/or a packet data network (PDN) gateway (P-GW) 524. It should be understood that the service network 510 disclosed in FIG. 5 serves as one example and that in other aspects, the service network 510 may include different types of entities, functions, and/or servers than those disclosed in FIG. 5.

As shown in FIG. 5, the client device 502 may transmit an attach request 532 to the network, which may be received by the network access node 504. In an aspect of the present disclosure, the attach request 532 may indicate that the client device 502 is to attach as an IoT device (e.g., or indicate a request to perform reduced data transfer, or indicate that the client device is operating in a low power consumption mode) and may indicate the home domain (e.g., HPLMN ID or fully qualified domain name (FQDN)) from which the authentication information should be retrieved. The network access node 504 may forward the request to the IoTF-C 506 to which it belongs.

The IoTF-C 506 may determine the address of the HSS/AAA server 512 from the home domain information provided by the client device 502 and may transmit a request 534 for authentication information for the client device 502 to the HSS/AAA server 512. The IoTF-C 506 may receive the authentication information 535 from the HSS/AAA server 512.

The IoTF-C 506 may perform mutual authentication (e.g., an AKA procedure) with the client device 502. During the AKA procedure, the IoTF-C 506 may receive AVs from the HSS/AAA server 512 through the authentication information 535. For example, the AVs may contain a key (shown in FIG. 2 as the key $K_{ASME}$ 206) from an Access Security Management Entity (ASME). For example, the IoTF-C 506 may provide the key $K_{ASME}$ 206 to the client device 502 through the signal 536. When the AKA procedure is completed, the IoTF-C 506 and the client device 502 may derive CP key(s) 526, such as the key $K_{CP}$ 208, the key $K_{IoT\text{-}CPenc}$ 210 and/or the key $K_{IoT\text{-}CPint}$ 212, and may derive UP key(s) 528, such as the key $K_{UP}$ 214, the key $K_{IoT\text{-}UPenc}$ 216 and/or the key $K_{IoT\text{-}UPint}$ 218, from the key $K_{ASME}$ 206 or from the key $K_{IoT}$ 202. In some aspects, the IoTF-C 506 may transfer the key $K_{UP}$ 214 and the user plane encryption and integrity protection keys, such as the key $K_{IoT\text{-}UPenc}$ 216 and the key $K_{IoT\text{-}UPint}$ 218, to the IoTF-U 508 via the message 538.

In an aspect of the present disclosure, the IoTF-C 506 may generate one or more encrypted client device contexts for the client device 502 by using the context key 530 to encrypt a client device context. The IoTF-C 506 may then transmit the one or more encrypted client device contexts to the client device 502. For example, the IoTF-C 506 may generate an encrypted client device context for the control plane and an encrypted client device context for the user plane. In such example, the context key 530 may include a first context key (e.g., the key $K_{CDC\text{-}IoTF\text{-}C}$ 304) for generating an encrypted client device context for the control plane and a second context key (e.g., the key $K_{CDC\text{-}IoTF\text{-}U}$ 306) for generating an encrypted client device context for the user plane. In an aspect of the present disclosure, the IoTF-C 506 may provide one or more of the context key(s) 530 to the IoTF-U 508. For example, the IoTF-C 506 may transmit the second context key (e.g., the key $K_{CDC\text{-}IoTF\text{-}U}$ 306) for generating the encrypted client device context for the user plane to the IoTF-U 508 via the message 538. Accordingly, in some aspects, the IoTF-U 508 may include context key(s) 531 provided by the IoTF-C 506.

In an aspect of the present disclosure, the IoTF-C 506 may generate one or more encrypted network reachability contexts for transmitting downlink (DL) traffic to the client device 502 using the context key 530 to encrypt a network reachability context. The IoTF-C 506 may then transmit the one or more encrypted network reachability contexts to a network entity such as the IoT server 522 or P-GW 524. Example approaches for generating one or more encrypted network reachability contexts are discussed in detail herein. The IoTF-C 506 may send the key $K_{UP}$ 214, user plane encryption and integrity protection keys (e.g., the key $K_{IoT\text{-}UPenc}$ 216 and the key $K_{IoT\text{-}UPint}$ 218), and a network reachability context (NRC) encryption key for the user plane (e.g., the key $K_{NRC\text{-}IoTF\text{-}U}$ 312), to the IoTF-U 508 via the message 538. Accordingly, in some aspects, the IoTF-U 508 may include context key(s) 531 (e.g., the key $K_{NRC\text{-}IoTF\text{-}U}$ 312) provided by the IoTF-C 506.

Figure 6:
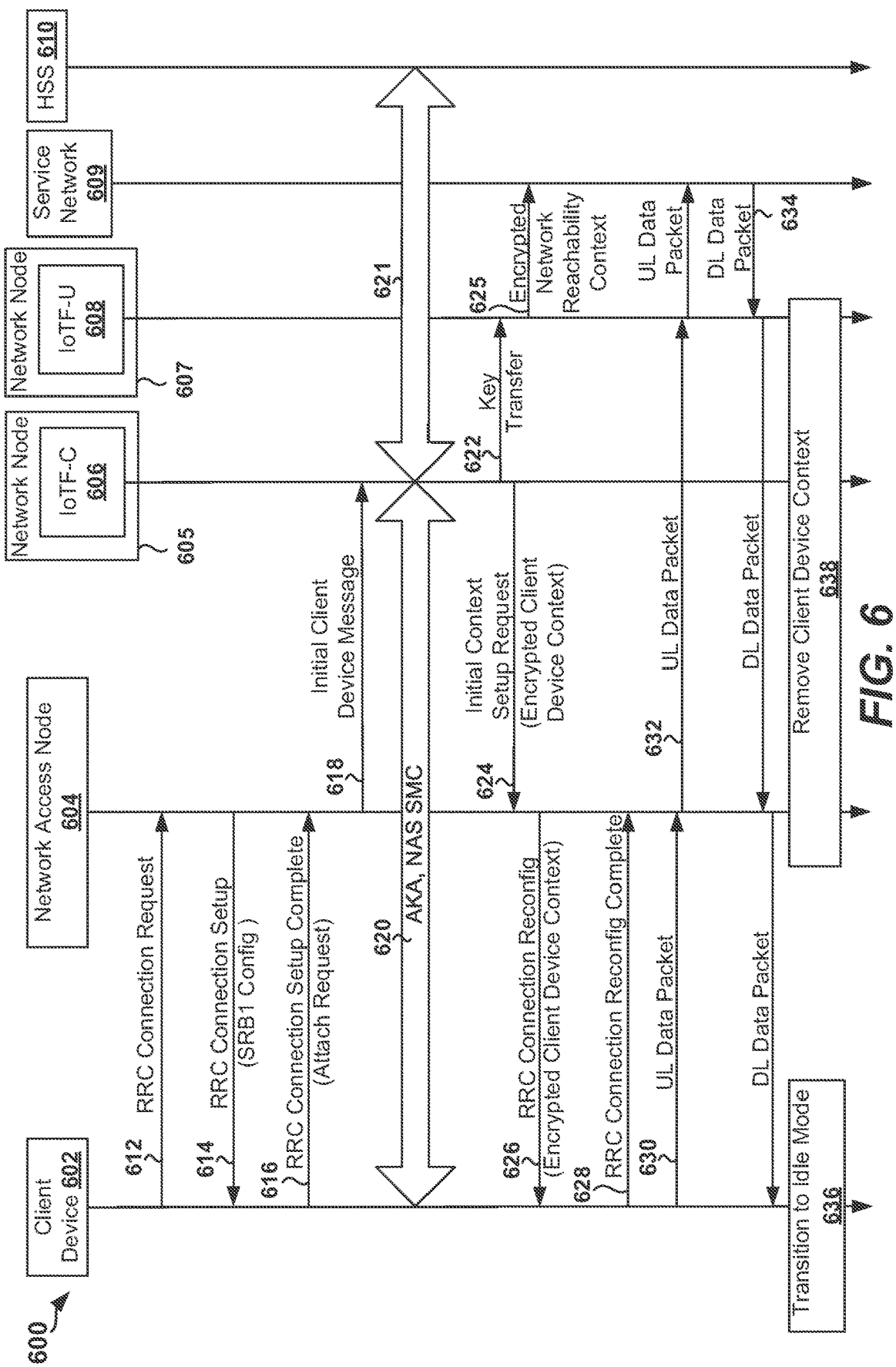
FIG. 6 is a signal flow diagram of an exemplary attach procedure by a client device in an IoT network architecture in accordance with various aspects of the present disclosure.

FIG. 6 is a signal flow diagram 600 of an exemplary attach procedure by a client device in an IoT network architecture (e.g., IoT network architecture 100, 500) in accordance with various aspects of the present disclosure. As shown in FIG. 6, the signal flow diagram 600 includes a client device 602 (also referred to as an IoT device), a network access node 604 (e.g., eNB, base station, or network access point), an IoTF-C 606 implemented at a network node 605, an IoTF-U 608 implemented at a network node 607, a service network 609, and a home subscriber server (HSS) 610. As shown in FIG. 6, the client device 602 may transmit a request 612 (e.g., an RRC connection request) to the network access node 604 in order to communicate with the network. The client device 602 may receive an RRC connection setup message 614, which may include a signaling radio bearer (SRB) configuration (e.g., an SRB1 configuration for transmitting NAS messages over a dedicated control channel (DCCH). The client device 602 may transmit an RRC connection setup complete message 616 to the network access node 604. For example, the RRC connection setup complete message 616 may indicate an attach request. The network access node 604 may transmit an initial client device message 618 to the IoTF-C 606. The IoTF-C 606 may determine the address of the HSS server 610 from the home domain information provided by the client device 602, and may communicate 621 with the HSS 610. For example, the IoTF-C 606 may transmit a request for authentication information for the client device 602 to the HSS server 610 and may receive the authentication information from the HSS server 610.

As shown in FIG. 6, the IoTF-C 606 may perform mutual authentication, such as an AKA procedure 620, with the client device 602. When the AKA procedure 620 is completed, the IoTF-C 606 and the client device 602 may derive control plane keys, such as the key $K_{IoT\text{-}CPenc}$ 210 and/or key $K_{IoT\text{-}CPint}$ 212, from the key $K_{ASME}$ 206 or from the key $K_{IoT}$ 202. The IoTF-C 606 and the client device 602 may further derive user plane keys, such as the key $K_{IoT\text{-}UPenc}$ 216 and/or the key $K_{IoT\text{-}UPint}$ 218, from the key $K_{ASME}$ 206 or from the key $K_{IoT}$ 202. In an aspect of the present disclosure, the IoTF-C 606 may generate a control plane encrypted client device context by encrypting a control plane context for the client device 602 using the key $K_{CDC\text{-}IoTF\text{-}C}$ 304 and/or may generate a user plane encrypted client device context by encrypting a user plane context for the client device 602 using the key $K_{CDC\text{-}IoTF\text{-}U}$ 306. The IoTF-C 606 may transfer one or more keys (e.g., user plane keys, such as the key $K_{IoT\text{-}UPenc}$ 216 and/or the key $K_{IoT\text{-}UPint}$ 218, and/or the key $K_{CDC\text{-}IoTF\text{-}U}$ 306) to the IoTF-U 608 via the message 622.

The IoTF-C 606 may transmit an initial context set up request message 624 with an encrypted client device context (e.g., a control plane encrypted client device context and/or user plane encrypted client device context) to the client device 602. Therefore, the encrypted client device context may include a client device context associated with the IoTF-C 606 and/or IoTF-U 608 of the IoTF, where the client device context may be used for uplink data transmission by the client device 602. In an aspect of the present disclosure, the encryption key is only known to an IoTF (e.g., the client device security context may be retrieved exclusively by the IoTF-C 606 and/or IoTF-U 608 of the IoTF). Accordingly, in such aspect, the encryption key may be the $K_{CDC}$-IoTF-U 306, which may be unknown to network entities outside of the IoTF 606, such as the network access node 604 or the client device 602. In an aspect of the present disclosure, each encrypted client device context corresponds to one data radio bearer (DRB).

In an aspect of the present disclosure, the IoTF-C 606 may transmit a message 625 including an encrypted network reachability context to the service network 609. In an aspect of the present disclosure, the IoTF-C 606 may generate a control plane (CP) encrypted network reachability context by encrypting a control plane context for the client device 602 using the key $K_{NRC\text{-}IoTF\text{-}C}$ 310 and/or may generate a user plane (UP) encrypted network reachability context for the client device 602 by encrypting a user plane context for the client device 602 using the key $K_{NRC\text{-}IoTF\text{-}U}$ 312. Therefore, in one example, the IoTF-C 606 may transmit the message 625 including an encrypted network reachability context (e.g., a CP encrypted network reachability context and/or a UP encrypted network reachability context) to the service network 609. Therefore, the encrypted network reachability context may include a client device context (e.g., network state information) associated with the IoTF-C 606 and/or IoTF-U 608 of the IoTF, where such client device context may be used for downlink (DL) data transmission from the network (e.g., from an entity in the service network 609) to the client device 602. In an aspect of the present disclosure, the encryption key is only known to IoTFs (e.g., may be retrieved exclusively by the IoTF-C 606 and/or IoTF-U 608 of the IoTF). In an aspect of the present disclosure, the IoTF-C 608 may allocate encrypted network reachability contexts to a network entity, such as an IoT server or a P-GW in the service network 609.

The network access node 604 may transmit an RRC connection reconfiguration message 626 to the client device 602. In an aspect of the present disclosure, the RRC connection reconfiguration message 626 may include the encrypted client device context. The client device 602 may transmit an RRC connection reconfiguration complete message 628 to the network access node 604. The client device 602 may transmit a first message 630 including a data packet (e.g., a UL data packet) to the network access node 604. The network access node 604 may forward the data packet to the service network 609 via the second message 632. The service network 609 may transmit a third message 634 including a data packet (e.g., a DL data packet) to the client device 602. For example, and as shown in FIG. 6, the third message 634 may be forwarded to the client device 602 by the IoTF-U 608 and the network access node 604. The client device 602 may then transition 636 to the idle mode. The network access node 604, the IoTF-C 606, and the IoTF-U 608 may proceed to remove 638 the client device context.

IoT UL Data Transfer

Figure 7:
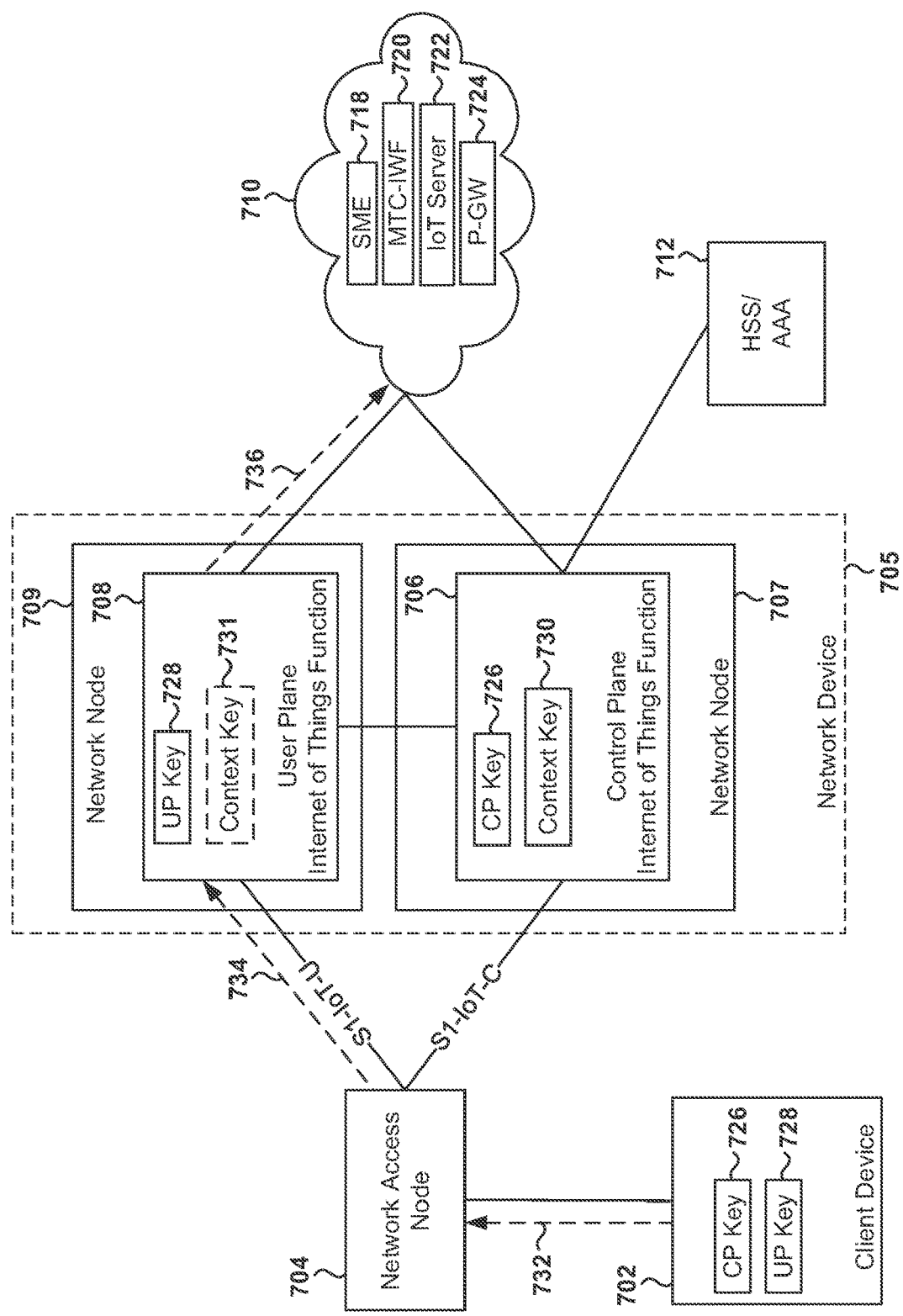
FIG. 7 is a block diagram illustrating a data transmission initiated by a client device in an IoT network architecture in accordance with various aspects of the disclosure.

FIG. 7 is a block diagram illustrating a data transmission initiated by a client device in an IoT network architecture 700 in accordance with various aspects of the present disclosure. As shown in FIG. 7, the IoT network architecture 700 includes a client device 702 (also referred to as an IoT device), a network access node 704 (e.g., eNB, base station, network access point), a network device 705, a service network 710, and a home subscriber server (HSS)/authentication, authorization, and accounting (AAA) server 712. In one aspect, the network device 705 may include one or more processing circuits and/or other appropriate hardware configured to implement an IoTF. For example, an IoTF may include a control plane IoT Function (IoTF-C) 706 and a user plane IoT Function (IoTF-U) 708. In such aspect, the IoTF-C 706 may be implemented at a network node 707 and the IoTF-U 708 may be implemented at a network node 709. In one aspect, the IoTF-C 706 and the IoTF-U 708 may be implemented at the same hardware platform, such that the IoTF-C 706 and the IoTF-U 708 each represent an independent node in the architecture 700. In such aspect, for example, the IoTF-C 706 may be implemented at a first virtual machine (e.g., a first operating system) provided on a hardware platform (e.g., the network device 705) and the IoTF-U 708 may be implemented at a second virtual machine (e.g., a second operating system) provided on the hardware platform.

In an aspect of the present disclosure, the service network 710 may include a number of entities, functions, gateways, and/or servers configured to provide various types of services. For example, the service network 710 may include a short message entity (SME) 718, a machine type communication interworking function (MTC-IWF) 720, an IoT server 722, and/or a packet data network (PDN) gateway (P-GW) 724. It should be understood that the service network 710 disclosed in FIG. 7 serves as one example and that in other aspects, the service network 710 may include different types of entities, functions, and/or servers than those disclosed in FIG. 7.

In the aspect of FIG. 7, the IoTF-C 706 may have generated an encrypted client device context for the control plane and an encrypted client device context for the user plane. In such aspect, the context key(s) 730 may include a first context key (e.g., the key $K_{CDC\text{-}IoTF\text{-}C}$ 304) for generating an encrypted client device context for the control plane and a second context key (e.g., the key $K_{CDC\text{-}IoTF\text{-}U}$ 306) for generating an encrypted client device context for the user plane. For example, the IoTF-C 706 may have transmitted the second context key (e.g., the key $K_{CDC\text{-}IoTF\text{-}U}$ 306) for generating the encrypted client device context for the user plane to the IoTF-U 708. Accordingly, in such example, the IoTF-U 708 may include the context key(s) 731 provided by the IoTF-C 706 as shown in FIG. 7. In the aspect of FIG. 7, the client device 702 has derived CP key(s) 726 and UP key(s) 728 in a manner previously discussed.

In the aspect of FIG. 7, the IoTF-C 706 may have generated an encrypted network reachability context for the control plane and an encrypted network reachability context for the user plane. In such aspect, the context key(s) 730 may include a first context key (e.g., the key $K_{NRC\text{-}IoTF\text{-}C}$ 310) for generating an encrypted network reachability context for the control plane and a second context key (e.g., the key $K_{NRC\text{-}IoTF\text{-}U}$ 312) for generating an encrypted network reachability context for the user plane. For example, the IoTF-C 706 may have transmitted the second context key (e.g., the key $K_{NRC\text{-}IoTF\text{-}U}$ 312) for generating the encrypted network reachability context for the user plane to the IoTF-U 708. Accordingly, in such example, the IoTF-U 708 may include the context key(s) 731 provided by the IoTF-C 706 as shown in FIG. 7.

As shown in FIG. 7, the client device 702 may transmit a first message 732 including a data packet and an encrypted client device context provided by the IoTF-C 706 to the network access node 704. The network access node 704 may determine the address of the IoTF-U 708 from the IoTF-U identifier in the data packet and may forward the data packet to the IoTF-U 708 via a second message 734. In an aspect, the network access node 704 may forward the data packet to the next hop node (e.g., the IoTF-U 708) indicated by the client device 702 without verifying the packet. The IoTF-U 708 may verify the encrypted client device context and may decrypt the encrypted client device context using the context key 731 (e.g., the key $K_{CDC\text{-}IoTF\text{-}U}$ 306 for generating the encrypted client device context for the user plane). The IoTF-U 708 may then reconstruct the client device context based on the decrypted information. The IoTF-U 708 may then decrypt and verify the data packet with the encryption and integrity keys (e.g., UP key(s) 728). In an aspect of the present disclosure, the IoTF-U 708 may generate an encrypted network reachability context based on the context (e.g., network state information) of the client device 702. The IoTF-U 708 may forward the data packet via a third message 736 to the next hop (e.g., the IoT server 722 or the P-GW 724) with the encrypted network reachability context. In an aspect of the present disclosure, initial data transfer by the client device 702 immediately following an attach procedure may not carry the encrypted client device context.

Figure 8:
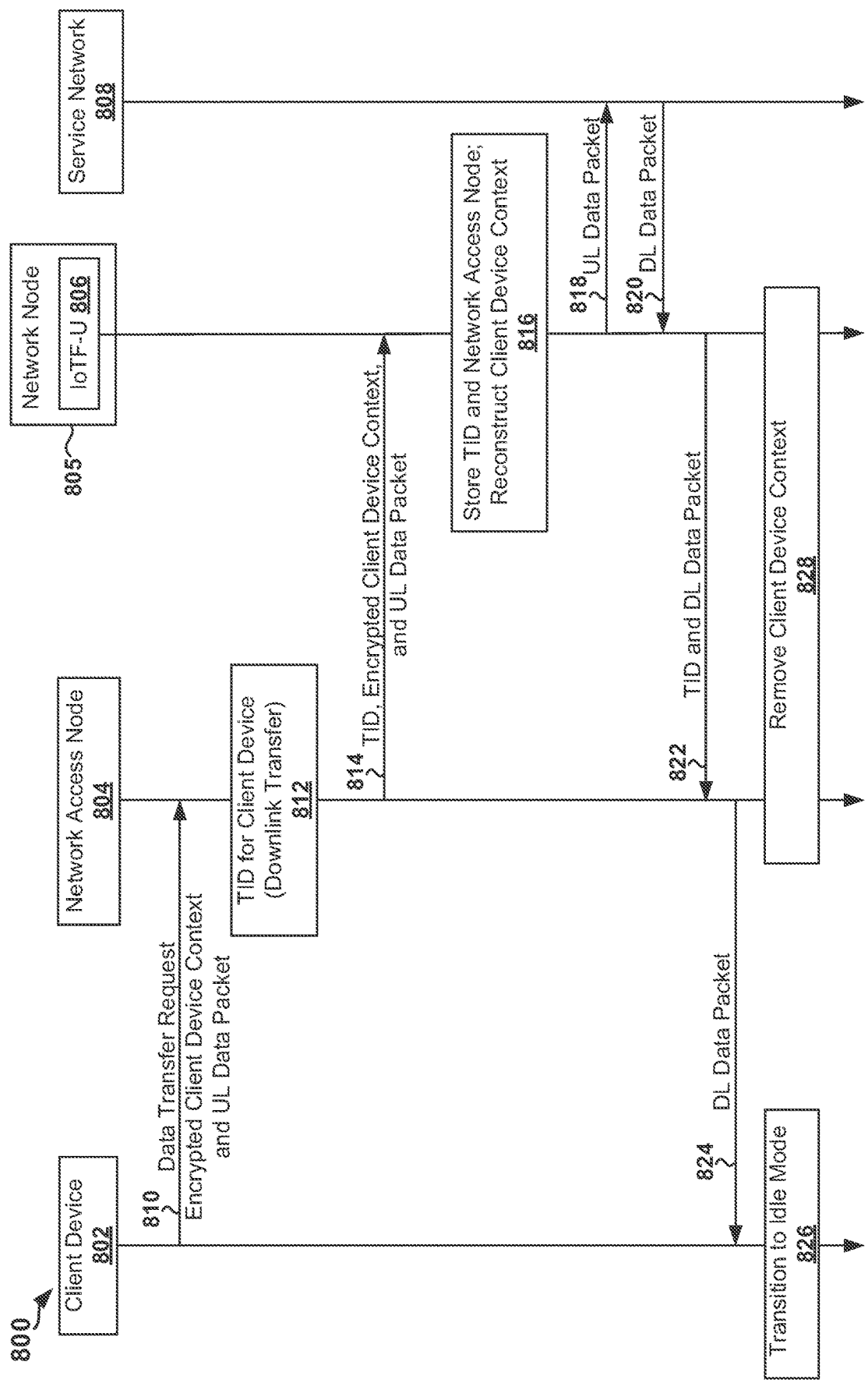
FIG. 8 is a signal flow diagram illustrating an exemplary data transmission initiated by a client device in an IoT network architecture in accordance with various aspects of the present disclosure.

FIG. 8 is a signal flow diagram 800 illustrating an exemplary data transmission initiated by a client device in an IoT network architecture (e.g., IoT network architecture 700) in accordance with various aspects of the present disclosure. As shown in FIG. 8, the signal flow diagram 800 includes a client device 802 (also referred to as an IoT device), a network access node 804 (e.g., eNB, base station, or network access point), an IoTF-U 806 implemented at a network node 805, and a service network 808. The client device 802 may transmit a data transfer request message 810 that includes an encrypted client device context and a data packet (e.g., a UL data packet) to the network access node 804. In as aspect, the data transfer request message 810 may be sent by the client device 802 without establishing an RRC connection with the network access node 804. The network access node 804, upon receipt of the data transfer request message 810, may assign 812 a temporary identifier (TID) for the client device 802 for potential downlink (DL) traffic. For example, the TID may be a cell radio network temporary identifier (C-RNTI). The network access node 804 may determine the IoTF-U identifier included in the header of the data packet. An example format of the data packet including such header is discussed herein with reference to FIG. 12. The network access node 804 may determine the IP address of the IoTF-U 806, and may forward the data packet to the IoTF-U 806 via a first message 814. For example, as part of the Operations and Maintenance (OAM) procedures, the network access node 804 may be configured with a set of IoTF-U identifiers and the corresponding IP address, or alternatively, the network access node 804 may use a domain name system (DNS) query based on the IoTF-U ID to determine the IP address of the IoTF-U 806. In an aspect of the present disclosure, and as shown in FIG. 8, the network access node 804 may include the TID and the encrypted client device context along with the data packet in the first message 814. In an aspect of the present disclosure, the TID is stored at the network access node 804 for a predefined time interval. In such aspect, the network access node 804 may transmit the TID expiration time to IoTF-U 806 along with the TID in the first message 814. The IoTF-U 806 may decrypt the encrypted client device context and may reconstruct 816 the client device context (e.g., S5 bearer). In an aspect, the IoTF-U 806 may decrypt and verify the data packet with the encryption and integrity keys (e.g., UP key(s) 728).

The IoTF-U 806 may forward the data packet to the service network 808 (e.g., the P-GW in service network 808 or other entity in the service network 808) via a second message 818. In response to the uplink data (e.g., the UL data packet in the second message 818), the IoTF-U 806 may receive a data packet (e.g., a DL data packet) from the service network 808 (e.g., the P-GW in the service network 808 or a corresponding entity in the service network 808) via the third message 820. The IoTF-U 806 may transmit the received data packet to the network access node 804 with the TID in a fourth message 822. The network access node 804 may identify the client device 802 using the TID and may transmit the data packet to the client device 802 in a fifth message 824. The client device 802 may transition 826 to the idle mode based on a pre-configured timer. The network access node 804 and the IoTF-U 806 may proceed to remove 828 the client device context that was created on-the-fly from the encrypted client device context.

Client Device Terminated Data Transfer

Figure 9:
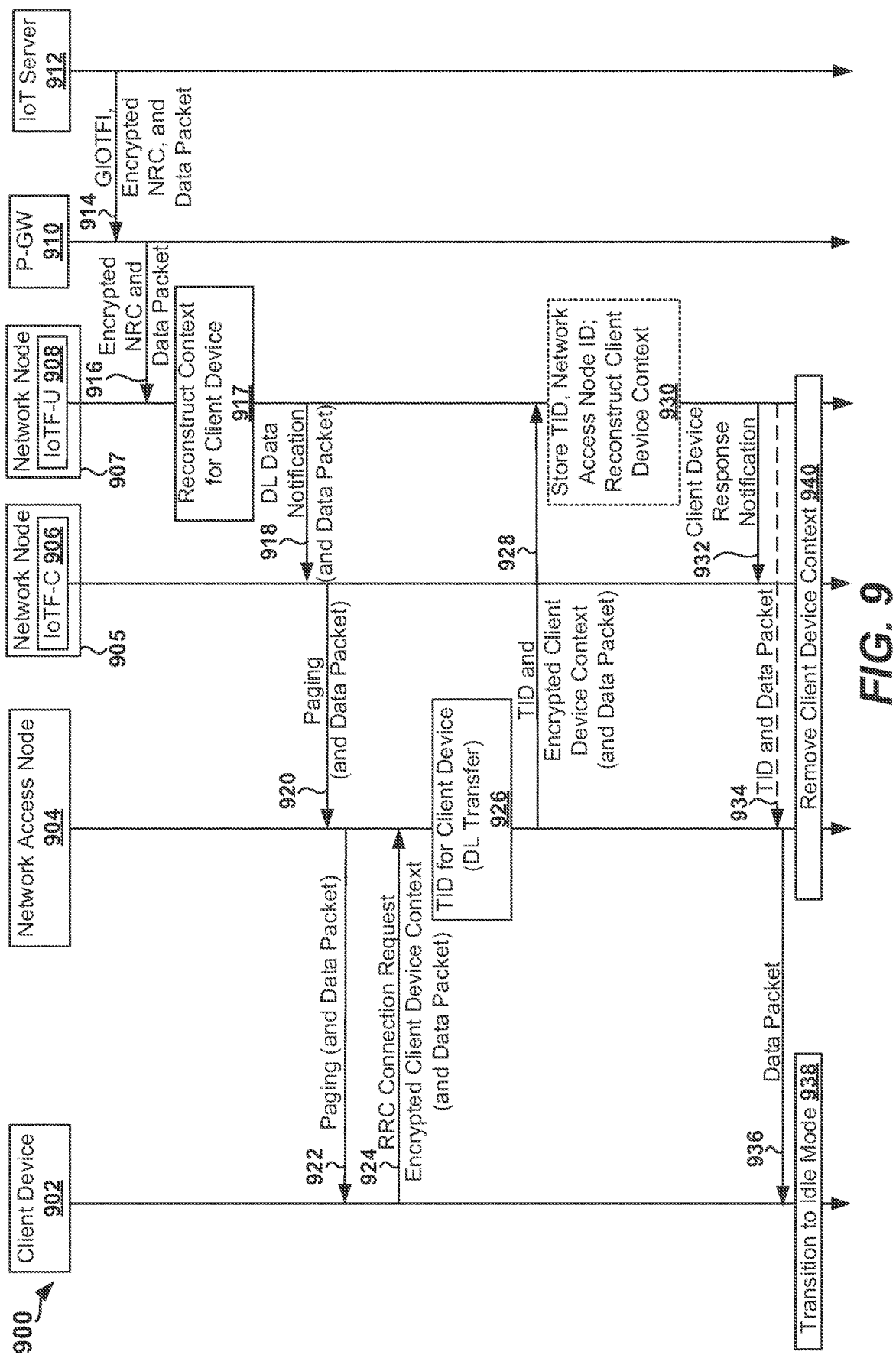
FIG. 9 is a signal flow diagram of an exemplary client device terminated data transmission in an IoT network architecture in accordance with various aspects of the present disclosure.

FIG. 9 is a signal flow diagram 900 of an exemplary client device terminated data transmission in an IoT network architecture (e.g., IoT network architecture 100) in accordance with various aspects of the present disclosure. As shown in FIG. 9, the signal flow diagram 900 includes a client device 902 (also referred to as an IoT device), a network access node 904 (e.g., eNB, base station, network access point), an IoTF-C 906 implemented at a network node 905 and an IoTF-U 908 implemented at a network node 907, a P-GW 910, and an IoT server 912. The IoT server 912 may transmit a downlink (DL) message 914 including a DL data packet, a global IoTF identifier (GIOTFI), and an encrypted network reachability context (NRC) to the P-GW 910. The P-GW 910 may locate the IoTF-U 908 based on the GIOTFI and may forward the DL data packet to the IoTF-U 908 in a forward message 916. In an aspect of the present disclosure, the IoTF-U 908 may verify the encrypted network reachability context. As shown in FIG. 9, the IoTF-U 908 may reconstruct 917 the context for the client device 902. For example, the IoTF-U 908 may reconstruct the context for the client device 902 by decrypting the encrypted network reachability context using a context key (e.g., the key $K_{NRC\text{-}IoTF\text{-}U}$ 312) stored at the IoTF-U 908. The IoTF-U 908 may transmit a DL data notification message 918 to the IoTF-C 906. In an aspect of the present disclosure, the DL data notification message 918 may include the DL data packet if the DL data packet is small enough to be carried in a paging message. The IoTF-C 906 may transmit a paging message 920 to one or more network access nodes (e.g., network access node 904). The network access node 904 may then page the client device 902 by transmitting the page message 922. The client device 902 may transmit an RRC connection request message 924 including a UL data packet to the IoTF-U 908. In an aspect of the present disclosure, the UL data packet transmitted by the client device 902 may be empty. The network access node 904 may assign 926 a temporary identifier (TID) for the client device 902 for potential downlink (DL) traffic. For example, the TID may be a cell radio network temporary identifier (C-RNTI). The network access node 904 may then forward the UL data packet with the TID and encrypted client device context to the IoTF-U 908 in a forward message 928. The IoTF-U 908 may store 930 the TID and ID of the network access node 904. The IoTF-U 908 may transmit a client device response notification message 932 to the IoTF-C 906. In an aspect of the present disclosure, the IoTF-U 908 may transmit, to the client device 902, a message 934 including a DL data packet and the TID for the client device 902 if the IoTF-U 908 was not able to include the DL data packet in the DL data notification message 918. The network access node 904 may forward the DL data packet to the client device 902 in a forward message 936. The client device 902 may then transition 938 to the idle mode. The network access node 904 and IoTF-C 906 may remove 940 the client device context.

Control Plane Protocol Stack

Figure 10:
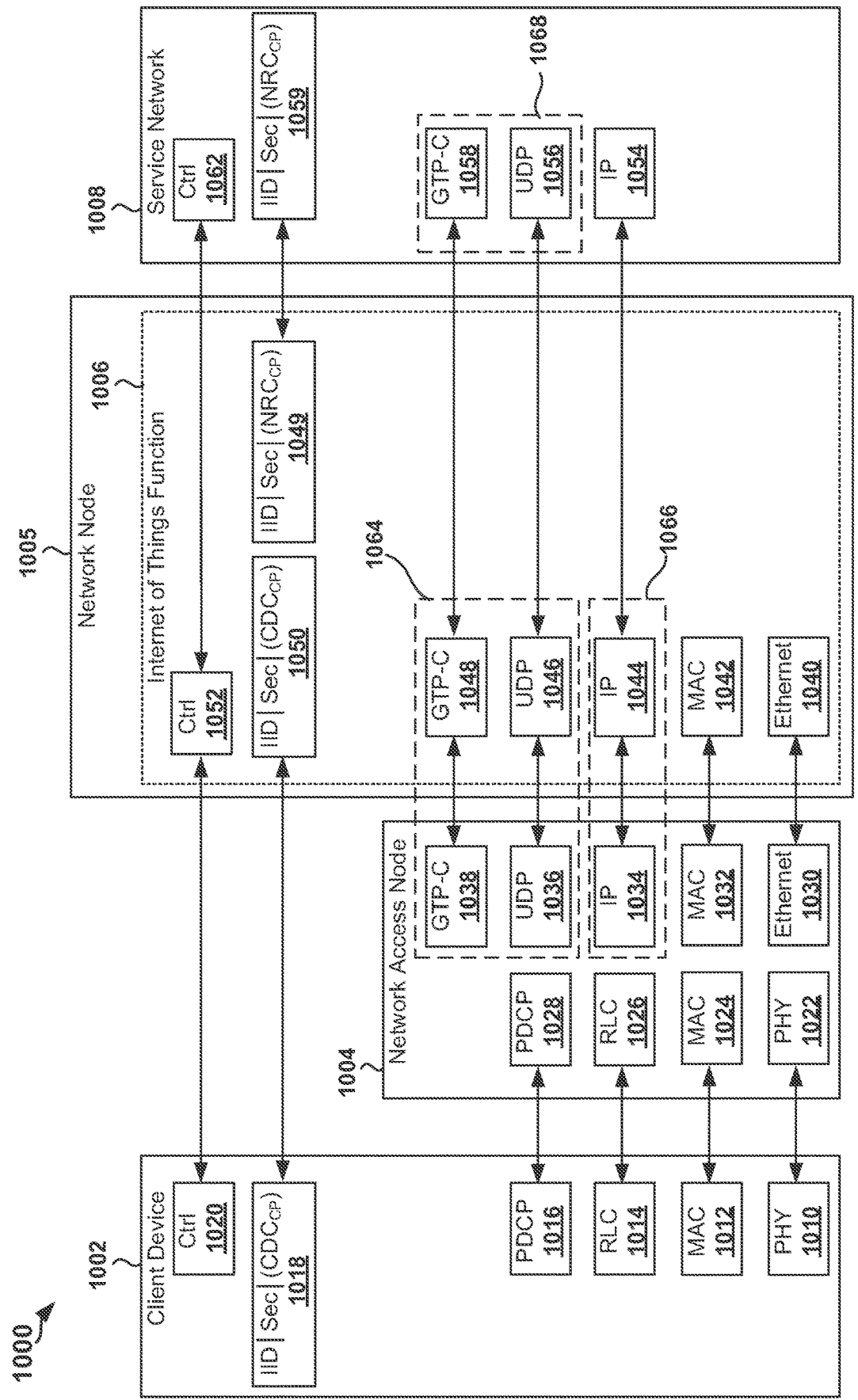
FIG. 10 is a diagram illustrating a control plane protocol stack for IoT data transmission in accordance with various aspects of the present disclosure.

FIG. 10 is a diagram illustrating a control plane protocol stack 1000 for IoT data transmission in accordance with various aspects of the present disclosure. As shown in FIG. 10, the protocol stack 1000 may include a client device protocol stack 1002 (also referred to as an IoT device protocol stack), a network access node protocol stack 1004, an IoTF protocol stack 1006 implemented at a network node 1005, and a service network protocol stack 1008. For example, the network access node protocol stack 1004 may be implemented in an eNB, base station, or network access point. As another example, service network protocol stack 1008 may be implemented in a P-GW. As shown in FIG. 10, the client device protocol stack 1002 may include a physical (PHY) layer 1010, a media access control (MAC) layer 1012, a radio link control (RLC) layer 1014, a packet data convergence protocol (PDCP) layer 1016, and a control (Ctrl) layer 1020. As further shown in FIG. 10, the client device protocol stack 1002 may implement a context protocol layer 1018 for communicating a control plane encrypted client device context (abbreviated as "$CDC_{CP}$" in FIG. 10). The context protocol layer 1018 may further enable communication of an IoTF ID (IID) and/or a security header (abbreviated as "Sec" in FIG. 10) that indicates the presence of an encrypted client device context.

As shown in FIG. 10, the network access node protocol stack 1004 may include a PHY layer 1022, a MAC layer 1024, an RLC layer 1026, and a PDCP layer 1028 that respectively interface with the PHY layer 1010, the MAC layer 1012, the RLC layer 1014, and the PDCP layer 1016 of the client device protocol stack 1002. The network access node protocol stack 1004 may further include an Ethernet layer 1030, a MAC layer 1032, an Internet Protocol (IP) layer 1034, a user datagram protocol (UDP) layer 1036, and a control plane GPRS Tunneling Protocol (GTP-C) layer 1038.

As shown in FIG. 10, the IoTF protocol stack 1006 may include an Ethernet layer 1040, a MAC layer 1042, an IP layer 1044, a UDP layer 1046, a GTP-C layer 1048, and a control (Ctrl) layer 1052. As further shown in FIG. 10, the IoTF protocol stack 1006 may implement a context protocol layer 1050 for communicating a control plane encrypted client device context (abbreviated as "$CDC_{CP}$" in FIG. 10). The context protocol layer 1050 may also enable communication of an IoTF ID (IID) and/or a security header (abbreviated as "Sec" in FIG. 10) that indicates the presence of an encrypted client device context. As shown in FIG. 10, the context protocol layer 1018 of the client device protocol stack 1002 is in communication with the context protocol layer 1050 of the IoTF protocol stack 1006. In an aspect, an encrypted client device context may be carried in a packet header outside a UP message in accordance with the exemplary IoT packet format described with respect to FIG. 12. As further shown in FIG. 10, the IoTF protocol stack 1006 may further implement a context protocol layer 1049 for communicating a control plane encrypted network reachability context (abbreviated as "$NRC_{CP}$" in FIG. 10). The context protocol layer 1049 may also enable communication of an IoTF ID (IID) and/or a security header (abbreviated as "Sec" in FIG. 10) that indicates the presence of an encrypted network reachability context.

The service network protocol stack 1008 may include an IP layer 1054, a UDP layer 1056, a GTP-C layer 1058, and a Ctrl layer 1062 that respectively interface with the IP layer 1044, the UDP layer 1046, the GTP-C layer 1048 and the Ctrl layer 1052 of the IoTF protocol stack 1006. As further shown in FIG. 10, the service network protocol stack 1008 may implement a context protocol layer 1059 for communicating a control plane encrypted network reachability context (abbreviated as "$NRC_{CP}$" in FIG. 10). The context protocol layer 1059 may also enable communication of an IoTF ID (IID) and/or a security header (abbreviated as "Sec" in FIG. 10) that indicates the presence of an encrypted network reachability context. As shown in FIG. 10, the context protocol layer 1059 of the service network protocol stack 1008 is in communication with the context protocol layer 1049 of the IoTF protocol stack 1006. In an aspect of the present disclosure, an encrypted network reachability context may be carried in a packet header outside a user plane message in accordance with the exemplary IoT packet format described with respect to FIG. 13. In an aspect of the present disclosure, if a network architecture is implemented as a GSM EDGE Radio Access Network (GERAN), protocols different than the IP protocols 1066 may be used. In an aspect of the present disclosure, the GTP-C and UDP protocols indicated by regions 1064 and 1068 may be omitted.

User Plane Protocol Stack

Figure 11:
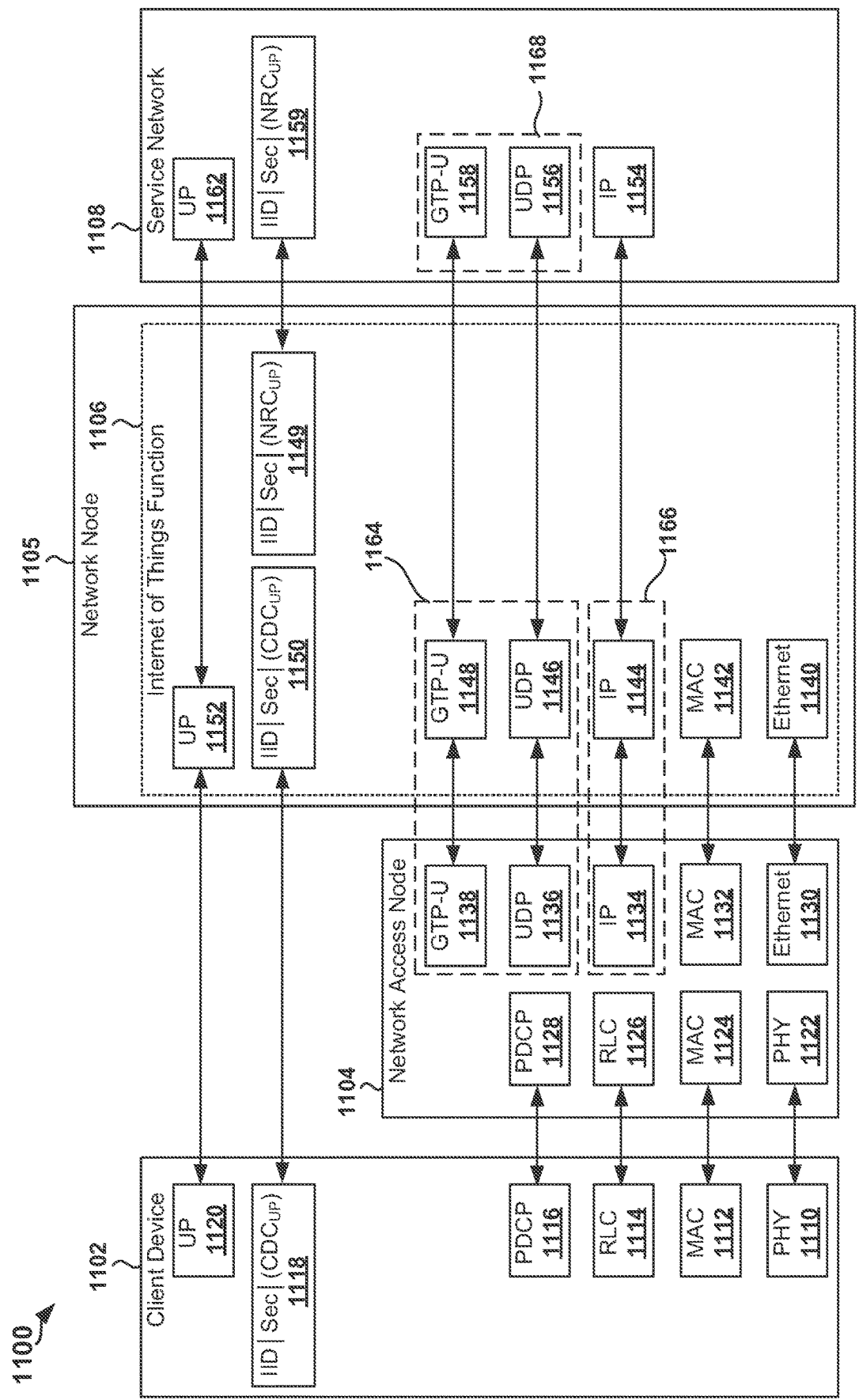
FIG. 11 is a diagram illustrating a user plane protocol stack for IoT data transmission in accordance with various aspects of the present disclosure.

FIG. 11 is a diagram illustrating a user plane protocol stack 1100 for IoT data transmission in accordance with various aspects of the present disclosure. As shown in FIG. 11, the protocol stack 1100 may include a client device protocol stack 1102 (also referred to as an IoT device protocol stack), a network access node protocol stack 1104, an IoTF protocol stack 1106 implemented at a network node 1105, and a service network protocol stack 1108. For example, the network access node protocol stack 1104 may be implemented in an eNB, base station, or network access point. As another example, the service network protocol stack 1108 may be implemented in a P-GW. As shown in FIG. 11, the client device protocol stack 1102 may include a physical (PHY) layer 1110, a media access control (MAC) layer 1112, a radio link control (RLC) layer 1114, a packet data convergence protocol (PDCP) layer 1116, and a user plane (UP) layer 1120. As further shown in FIG. 11, the client device protocol stack 1102 may implement a context protocol layer 1118 for communicating a user plane encrypted client device context (abbreviated as "$CDC_{UP}$" in FIG. 11). The context protocol layer 1118 may further enable communication of an IoTF ID (IID) and/or a security header (abbreviated as "Sec" in FIG. 101) that indicates the presence of an encrypted client device context.

As shown in FIG. 11, the network access node protocol stack 1104 may include a PHY layer 1122, a MAC layer 1124, an RLC layer 1126, and a PDCP layer 1128 that respectively interface with the PHY layer 1110, the MAC layer 1112, the RLC layer 1114, and the PDCP layer 1116 of the client device protocol stack 1102. The network access node protocol stack 1104 may further include an Ethernet layer 1130, a MAC layer 1132, an Internet Protocol (IP) layer 1134, a user datagram protocol (UDP) layer 1136, and a user plane GPRS Tunneling Protocol (GTP-U) layer 1138.

As shown in FIG. 11, the IoTF protocol stack 1106 may include an Ethernet layer 1140, a MAC layer 1142, an IP layer 1144, a UDP layer 1146, and a GTP-U layer 1148. As further shown in FIG. 11, the IoTF protocol stack 1106 may implement a context protocol layer 1150 for communicating a user plane encrypted client device context (abbreviated as "$CDC_{UP}$" in FIG. 11). The context protocol layer 1150 may also enable communication of an IoTF ID (IID) and/or a security header (abbreviated as "Sec" in FIG. 11) that indicates the presence of an encrypted client device context. As shown in FIG. 11, the context protocol layer 1118 of the client device protocol stack 1102 is in communication with the context protocol layer 1150 of the IoTF protocol stack 1106. In an aspect, a user plane encrypted client device context may be carried in a packet header outside a UP message in accordance with the exemplary IoT packet format described with respect to FIG. 12. As further shown in FIG. 11, the IoTF protocol stack 1106 may further implement a context protocol layer 1149 for communicating a user plane encrypted network reachability context (abbreviated as "$NRC_{UP}$" in FIG. 11). The context protocol layer 1149 may also enable communication of an IoTF ID (IID) and/or a security header (abbreviated as "Sec" in FIG. 11) that indicates the presence of an encrypted network reachability context.

The service network protocol stack 1108 may include an IP layer 1154, a UDP layer 1156, a GTP-U layer 1158 and a UP layer 1162 that respectively interface with the IP layer 1144, the UDP layer 1146, the GTP-U layer 1148, and the UP layer 1152 of the IoTF protocol stack 1106. The service network protocol stack 1108 may implement a context protocol layer 1159 for communicating a user plane encrypted network reachability context (abbreviated as "$NRC_{UP}$" in FIG. 11). As shown in FIG. 11, the context protocol layer 1159 of the service network protocol stack 1108 is in communication with the context protocol layer 1149 of the IoTF protocol stack 1106. In an aspect of the present disclosure, a user plane encrypted network reachability context may be carried in a packet header outside a UP message in accordance with the exemplary IoT packet format described with respect to FIG. 11. In an aspect of the present disclosure, if a network architecture is implemented as a GSM EDGE Radio Access Network (GERAN), protocols different than the IP protocols 1166 may be used. In an aspect of the present disclosure, the GTP-U and UDP protocols indicated by regions 1164 and 1168 may be omitted. In an aspect of the present disclosure, if the IP protocol is used for UP message delivery, the user plane encrypted network reachability context may be carried in the IP options field (IPv4) or IP extension header (IPv6).

IoT Packet Format

Figure 12:
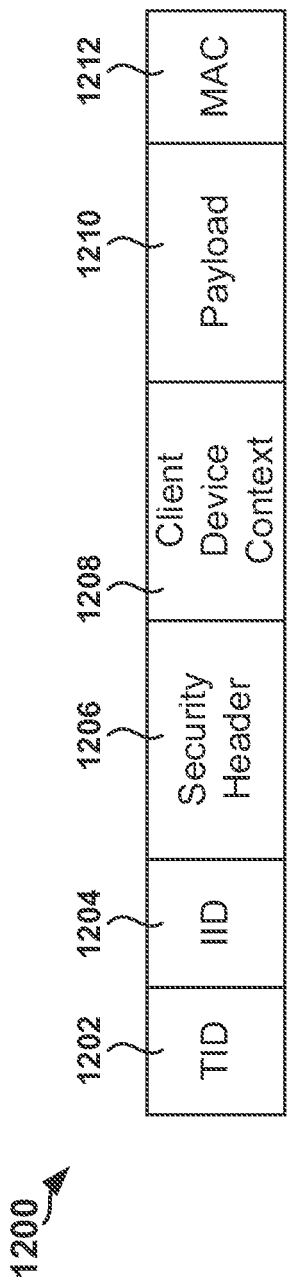
FIG. 12 is a diagram of a packet format for transmissions in an IoT network architecture in accordance with various aspects of the present disclosure.

FIG. 12 is a diagram of a packet format 1200 for transmissions in an IoT network architecture in accordance with various aspects of the present disclosure. With reference to FIG. 12, the temporary identifier (TID) field 1202 may be used by a network access node (e.g., eNB, base station, or network access point) to identify a client device (also referred to as an IoT device) locally. For example, the value assigned by a network access node to the TID field 1202 for identifying a client device may be a C-RNTI or equivalent. In an aspect of the present disclosure, the IoTF ID (IID) field 1204 may include a globally unique temporary identifier (GUTI). For example, the GUTI may include an identifier associated with an IoTF and an identifier (e.g., a temporary identifier, such as a mobility management entity (MME) temporary mobile subscriber identity (M-TMSI)) associated with the client device. For example, the GUTI may be used by a network access node to identify an IoTF, and the GUTI may be used by an IoTF to identify a client device. In another aspect, the IID field 1204 may include a global IoTF identifier (GIOTFI) and an identifier (e.g., a temporary identifier, such as an M-TMSI) associated with the client device. For example, the GIOTFI may be an equivalent of a globally unique mobility management entity identifier (GUMMEI) for an IoTF. In an aspect of the present disclosure, the M-TMSI may be encrypted for client device privacy. It should be noted that using the IoTF IP address may disclose the network topology.

The security header field 1206 may indicate the presence of an encrypted client device context, a control plane (CP)/user plane (UP) indication, a sequence number, a time stamp value and/or a random value. For example, the time stamp value may be based on a time and a counter, where the time is the network access node time or IoTF time. The client device context field 1208 may include an encrypted client device context. It should be noted that if a time stamp is used for encryption instead of the sequence number, the IoTF may not need to maintain any client device network states. A random value may be based on the random number and a counter. The random value is generated by the network access node or by the client device, or a combination thereof. The counter may be incremented by a certain value (e.g., one) for each packet. If a random value is used for encryption instead of the sequence number, the client device may generate a new encryption key based on the encryption key in the security context and the random number. If a random value is used for integrity protection instead of the sequence number, the client device may generate a new integrity protection key based on the integrity protection key in the security context and the random number, and may protect a message using the new integrity protection key. The payload field 1210 may include data or control information (e.g., a data packet or a control packet).

The message authentication code (MAC) field 1212 may be used for integrity protection. For example, the MAC field 1212 may include a message authentication code generated by a transmitting device or entity. The message authentication code in the MAC field 1212 may then be used by a receiving device or entity to verify that the integrity of the message has not been compromised (e.g., that the contents of the message have not been altered or manipulated). In one aspect, the message authentication code in the MAC field 1212 may be generated at a transmitting device or entity by applying a message authentication code generation algorithm (e.g., an AEAD cihper), where a message (e.g., a packet) and a user plane key or a control plane key are used as inputs for the message authentication code generation algorithm. The output of the message authentication code generation algorithm may be the message authentication code included in the MAC field 1212. A receiving device or entity may verify the integrity of the received message by applying the message authentication code generation algorithm (e.g., the AEAD cihper) to the message. For example, the received message (e.g., the packet) and the user plane key or the control plane key may be used as inputs for the message authentication code generation algorithm. The receiving device or entity may then compare the output of the message authentication code generation algorithm to the message authentication code included in the MAC field 1212. In such example, when the output of the message authentication code generation algorithm matches the message authentication code included in the MAC field 1212, the receiving device or entity may determine that the message has been successfully verified.

Figure 13:
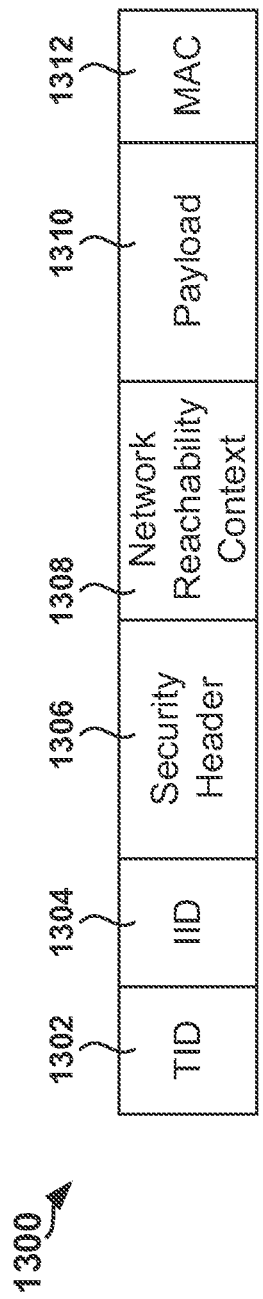
FIG. 13 is a diagram of a packet format for transmissions in an IoT network architecture in accordance with various aspects of the present disclosure.

FIG. 13 is a diagram of a packet format 1300 for transmissions in an IoT network architecture in accordance with various aspects of the present disclosure. With reference to FIG. 13, the temporary identifier (TID) field 1302 may be used by a network access node (e.g., eNB, base station, or network access point) to identify a client device (also referred to as an IoT device) locally. For example, the value assigned by a network access node to the TID field 1302 for identifying a client device may be a C-RNTI or equivalent. In an aspect of the present disclosure, the IoTF ID (IID) field 1304 may include a globally unique temporary identifier (GUTI) or a global IoTF identifier (GIOTFI). For example, the GUTI may be used by a network access node to identify an IoTF, and the GUTI may be used by an IoTF to identify a client device. For example, the GIOTFI may be an equivalent of a globally unique mobility management entity identifier (GUMMEI) for an IoTF. In an aspect of the present disclosure, a mobility management entity (MME) temporary mobile subscriber identity (M-TMSI) may be encrypted for client device privacy. It should be noted that using the IoTF IP address may disclose the network topology.

The security header field 1306 may indicate the presence of an encrypted network reachability context, a CP/UP indication, a sequence number, a time stamp value, and/or a random value. For example, the time stamp value may be based on a time and a counter, where the time is the network access node time or IoTF time. The network reachability context field 1308 may include an encrypted network reachability context. The payload field 1310 may include data or control information (e.g., a data packet or a control packet). The message authentication code (MAC) field 1312 may be used for integrity protection (e.g., an AEAD cipher may be used). It should be noted that if a time stamp is used for encryption instead of the sequence number, the IoTF may not need to maintain any network state information for a client device. In an aspect, the random value may be based on a random number and a counter. The random value may generated by the network access node or by the client device, or a combination thereof. The counter may be incremented by a certain value (e.g., one) for each packet. If a random value is used for encryption instead of the sequence number, the client device may generate a new encryption key based on the encryption key in the security context and the random number. If a random value is used for integrity protection instead of the sequence number, the client device may generate a new integrity protection key based on the integrity protection key in the security context and the random number, and may protect a message using the new integrity protection key.

Encrypted Client Device Context Design and Generation

In an aspect of the present disclosure, the encrypted client device context may contain the client device context established during an AKA procedure. For example, the client device context may include a security context, a bearer ID, Evolved Packet System (EPS) bearer quality of service(s) (QoS) and S5-TEID(s), and/or other services, parameters, values, settings, or features that may be needed by the network to provide a service to the client device.

In some aspects, the encrypted client device context may include one or more items of information in addition to the client device context. For example, the encrypted client device context may include an expiration time set by the IoTF-C 106 (or indicated in the client device context), which limits the lifetime of the encrypted client device context (e.g., to prevent permanent reuse). As another example, the encrypted client device context may have a key index that identifies the key used for generating the encrypted client device context.

In some aspects, the encrypted client device context may be generated using a secret key that is only known to an entity in the network and, therefore, may not be interpreted and/or modified by client devices. For example, the encrypted client device context may be generated by encrypting a client device context using the secret key of the IoTF-U (e.g., IoTF-U 108). In some aspects, the encrypted client device context may be integrity protected with the secret key of the IoTF-U (e.g., IoTF-U 108) and, therefore, may not be manipulated/modified by client devices.

In an aspect, the encrypted client device context may be provided to a client device (e.g., client device 102) by the IoTF-C (e.g., IoTF-C 106) as a successful completion of authentication and context (e.g., bearer) setup. In an aspect, a client device may include the encrypted client device context in one or more user plane packets (e.g., UL data packets) to enable the IoTF-U (e.g., IoTF-U 108) to reconstruct the client device context on-the-fly. For example, if a client device needs to transmit multiple packets in series, the client device may include the encrypted client device context in the first packet without including the encrypted client device context in subsequent packets. In some aspects, the encrypted client device context may be specific to a client device and, therefore, an encrypted client device context issued to a client device may not be used by any other client devices.

a) Control Plane Encrypted Client Device Context

In an aspect of the present disclosure, an IoTF (e.g., IoTF-C 106 in FIG. 1) may generate an encrypted client device context by concatenating one or more items of information. For example, a control plane (CP) encrypted client device context ($CDC_{CP}$) may be generated based on the expression KeyID∥Enc_$K_{CDC\text{-}IoTF\text{-}C}$ ($CDC_{CP}$)∥ MAC. In an aspect of the present disclosure, the key $K_{CDC\text{-}IoTF\text{-}C}$ (e.g., the key $K_{CDC\text{-}IoTF\text{-}C}$ 304 in FIG. 3) may be the same as the key $K_{CDC\text{-}IoTF}$ (e.g., the key $K_{CDC\text{-}IoTF}$ 302 in FIG. 3) or derived from the key $K_{CDC\text{-}IoTF}$. The term KeyID may represent the Key Index (used for generating the encrypted client device context). The term $CDC_{CP}$ may represent the control plane client device context. For example, the control plane client device context may include a client device identifier, the client device security context (e.g., control plane keys, such as the key $K_{IoT}$ ($K_{ASME}$ equivalent), the key $K_{IoT\text{-}CPenc}$ 210, the key $K_{IoT\text{-}CPint}$ 212), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. The term MAC may indicate the encryption mode and/or a message authentication code generation algorithm (also referred to as a MAC algorithm), which may be chosen by a mobile network operator (MNO) and configured to IoTFs. Therefore, the term Enc_$K_{CDC\text{-}IoTF\text{-}C}$ ($CDC_{CP}$) may represent the result of an encryption operation performed on the control plane client device context using the key $K_{CDC\text{-}IoTF\text{-}C}$.

b) User Plane Encrypted Client Device Context

As another example, a user plane (UP) encrypted client device context ($CDC_{UP}$) may be generated based on the expression KeyID∥Enc_$K_{CDC\text{-}IoTF\text{-}U}$ ($CDC_{UP}$)∥ MAC. The term $CDC_{UP}$ may represent the user plane client device context. For example, the user plane client device context may include a client device identifier, bearer IDs, Evolved Packet System (EPS) bearer quality of service(s) (QoS), an S5 tunnel endpoint identifier (TEID) for a user plane General Packet Radio Service (GPRS) tunneling protocol (GTP-U), a P-GW Internet Protocol (IP) address (or equivalent information) to which the IoTF-U 108 forwards UL data, a client device security context (e.g., a selected encryption algorithm and user plane keys, such as the key $K_{IoT\text{-}UPenc}$ 216, the key $K_{IoT\text{-}UPint}$ 218), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. Therefore, the term Enc_$K_{CDC\text{-}IoTF\text{-}U}$ ($CDC_{UP}$) may represent the result of an encryption operation performed on the user plane client device context using the key $K_{CDC\text{-}IoTF\text{-}U}$. In an aspect of the present disclosure, the encrypted client device context may only be decrypted by the IoTF (e.g., IoTF-C 106 and/or IoTF-U 108) to which the client device is attached/associated. In an aspect of the present disclosure, a client device context may be compressed before being encrypted.

The encrypted client device context may have one or more characteristics. For example, an encrypted client device context may contain the network state information associated with a particular client device and, therefore, may not be transferrable to other client devices. An IoTF-C/U (e.g., the IoTF-C 106 and/or the IoTF-U 108) does not maintain contexts (e.g., network state information) of a client device. Accordingly, such IoTF-C/U may recover a client device context from an encrypted client device context using its own secret key and, therefore, the IoTF-C/U does not need to store any additional information to recover a client device context. The IoTF-C/U may remove a client device context under certain conditions (e.g., Evolved Packet System Connection Management (ECM)-Idle or immediately after small data transfer) and restore it when necessary (e.g., for data transfer).

A client device may store encrypted client device contexts provided by an IoTF-C for fast UL data transfer/fast control plane message transfer. The client device may enter a sleep mode immediately after transmitting one or more data packet(s). Since there may be no message exchange overhead for an IoTF-U to reconstruct a client device context, no delay may be experienced for transmission of small data packets. In an aspect of the present disclosure, no control plane message may be used for user plane data transmission when the client device is in the idle mode.

Encrypted Network Reachability Context Design and Generation a) Control Plane Encrypted Network Reachability Context In an aspect of the present disclosure, an encrypted network reachability context may be generated by concatenating one or more items of information. For example, a control plane (CP) encrypted network reachability context may be generated based on the expression KeyID||Enc_$K_{NRC\text{-}IoTF\text{-}C}$ ($CDC_{CP}$)|| MAC. In an aspect of the present disclosure, the key $K_{NRC\text{-}IoTF\text{-}C}$ (e.g., the key $K_{NRC\text{-}IoTF}$ 310 in FIG. 3) may be the same as the key $K_{NRC\text{-}IoTF}$ (e.g., the key $K_{NRC\text{-}IoTF}$ 308 in FIG. 3) or may be derived from the key $K_{NRC\text{-}IoTF}$. The term KeyID may represent the Key Index (used for generating the network reachability context). The term $CDC_{CP}$ may represent the control plane client device context. For example, the control plane client device context may include a client device identifier, the client device security context (e.g., control plane keys, such as the key $K_{IoT}$ 202 ($K_{ASME}$ equivalent), the key $K_{IoT\text{-}CPenc}$ 210, the key $K_{IoT\text{-}CPint}$ 212), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. The term MAC may indicate the encryption mode and/or a message authentication code generation algorithm (also referred to as a MAC algorithm), which may be chosen by a mobile network operator (MNO) and configured to IoTFs. Therefore, the term Enc_$K_{NRC\text{-}IoTF\text{-}C}$ ($CDC_{CP}$) may represent the result of an encryption operation performed on the control plane client device context using the key $K_{NRC\text{-}IOTF\text{-}C}$ (e.g., the key $K_{NRC\text{-}IoTF\text{-}C}$ 310 in FIG. 3).

b) User Plane Encrypted Network Reachability Context

As another example, a user plane (UP) encrypted network reachability context may be generated based on the expression KeyID||Enc_$K_{NRC\text{-}IoTF\text{-}U}$ ($CDC_{UP}$)|| MAC. The term $CDC_{UP}$ may represent the user plane client device context. For example, the user plane client device context may include a client device identifier, bearer IDs, Evolved Packet System (EPS) bearer quality of service(s) (QoS), an S5 tunnel endpoint identifier (TEID) for a user plane General Packet Radio Service (GPRS) tunneling protocol (GTP-U), a P-GW Internet Protocol (IP) address (or equivalent information) to which the IoTF-U 108 forwards UL data, a client device security context (e.g., a selected encryption algorithm and user plane keys, such as the key $K_{IoT\text{-}UPenc}$ 216, the key $K_{IoT\text{-}UPint}$ 218), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. Therefore, the term Enc_$K_{NRC\text{-}IoTF\text{-}U}$ ($CDC_{UP}$) may represent the result of an encryption operation performed on the user plane client device context using the key $K_{NRC\text{-}IoTF\text{-}U}$ (e.g., the key $K_{NRC\text{-}IoTF\text{-}U}$ 312 in FIG. 3). In an aspect of the present disclosure, the encrypted network reachability context may only be decrypted by the IoTF (e.g., IoTF-C 106 and/or IoTF-U 108) to which the client device is attached/associated. In an aspect of the present disclosure, the network reachability context may be compressed prior to encryption.

The encrypted network reachability context may have one or more characteristics. For example, an encrypted network reachability context may contain the network state information associated with a particular client device and, therefore, may not be transferrable to other client devices. An IoTF-C/U (e.g., the IoTF-C 106 and/or the IoTF-U 108) does not maintain contexts (e.g., network state information) of a client device. Accordingly, such IoTF-C/U may reconstruct a network reachability context for a client device by decrypting an encrypted network reachability context using its own secret key and, therefore, the IoTF-C/U does not need to store any additional information to recover a network reachability context. The IoTF-C/U may remove a network reachability context for a client device under certain conditions (e.g., Evolved Packet System Connection Management (ECM)-Idle or immediately after small data transfer) and restore it when necessary (e.g., for data transfer).

Mobility Procedure

A network may define a number of service areas to keep track of the location of a client device (e.g., the client device 102). In some aspects, such service areas may be referred to as tracking areas. For example, each service area may include a group of cells.

In an aspect of the present disclosure, a client device in a first service area of a network may establish a network connection with a source IoTF that serves the first service area. The client device may obtain information that includes a first client device context generated for the client device at the source IoTF. For example, the first client device context may include first network state information associated with the client device. In an aspect of the present disclosure, the first client device context in the information obtained from the source IoTF may be encrypted by the source IoTF. In such aspect, the obtained information may serve as a token that can be used by the client device to communicate with the network.

When the client device leaves the first service area and enters a second service area (also referred to as a new service area) of the network that is served by a target IoTF, the network may perform an IoTF relocation procedure. In an aspect of the present disclosure, and as described in detail herein, such IoTF relocation procedure may be performed when the client device transmits data (e.g., UL transmission) to the network or in response to a service area update request (e.g., a tracking area update (TAU) request). For example, the IoTF relocation procedure may achieve a handover of service from the source IoTF to the target IoTF.

In one aspect, and as described below with respect to FIG. 14, the network may implement a first approach for the handover. For example, in the first approach, the target IoTF routes a UL data packet received from the client device to the source IoTF. The source IoTF then verifies (e.g., using an integrity key) the integrity of the UL data packet.

In another aspect, and as described below with respect to FIG. 15, the network may implement a second approach for the handover. For example, in the second approach, the target IoTF refrains from routing a UL data packet received from the client device to the source IoTF and requests the context of the client device from the source IoTF. The target IoTF verifies (e.g., using an integrity key) the integrity of UL data packet and, if the verification is successful, routes the UL data packet to the source IoTF.

Figure 14:
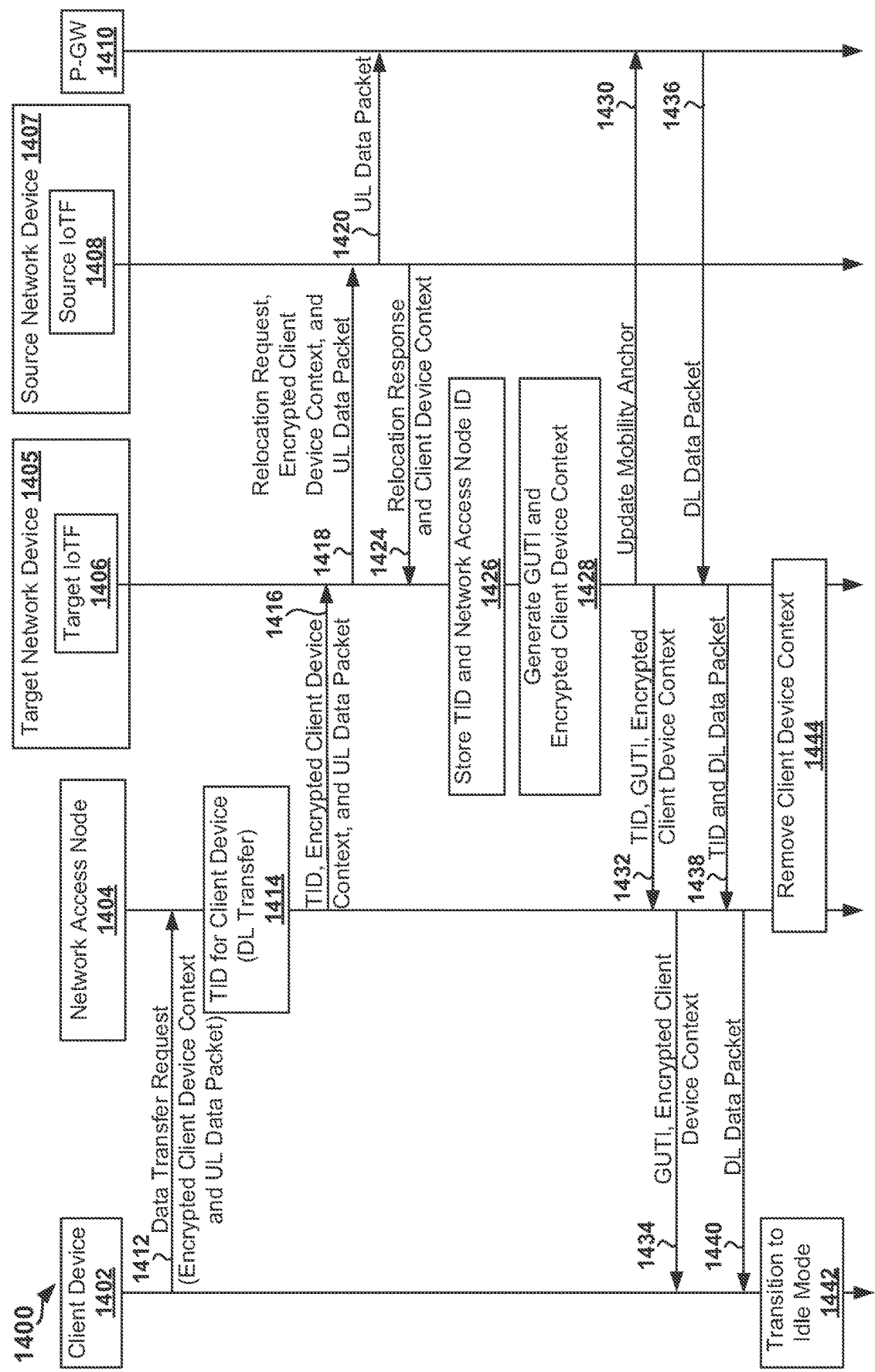
FIG. 14 is a signal flow diagram of an IoTF relocation procedure implementing a first approach for a handover in an IoT network architecture in accordance with various aspects of the present disclosure.

FIG. 14 is a signal flow diagram 1400 of an exemplary IoTF relocation procedure implementing a first approach for a handover in an IoT network architecture in accordance with various aspects of the present disclosure. As shown in FIG. 14, the signal flow diagram 1400 includes a client device 1402 (also referred to as an IoT device), a network access node 1404 (e.g., eNB, base station, or network access point), a target IoTF 1406 implemented at a target network device 1405, a source IoTF 1408 implemented at a source network device 1407, and a P-GW 1410. In an aspect of the present disclosure, the target IoTF 1406 may include a control plane target IoTF (target IoTF-C) and a user plane target IoTF (target IoTF-U). In an aspect of the present disclosure, the source IoTF 1408 may include a control plane source IoTF (source IoTF-C) and a user plane source IoTF (source IoTF-U).

When the client device 1402 enters a new service area, the client device 1402 may transmit a data transfer request message 1412 to the network. In an aspect of the present disclosure, the data transfer request message 1412 may include a data packet (e.g., a UL data packet) and information (e.g., the encrypted first client device context) previously obtained from the source IoTF. For example, as shown in FIG. 14, the client device 1402 may include the encrypted first client device context in the data transfer request message 1412. In an aspect of the present disclosure, the data transfer request message 1412 may be transmitted by the client device 1402 without establishing a radio resource control (RRC) connection with the network.

The network access node 1404, upon receipt of the data transfer request message 1412, may assign 1414 a temporary identifier (TID) for the client device 1402 for potential downlink (DL) traffic. The network access node 1404 may further determine the target IoTF identifier included in a header of the data packet received in the data transfer request message 1412. The network access node 1404 may then determine the IP address of the target IoTF 1406, and may forward the data packet to the target IoTF 1406 (e.g., the target IoTF-U of the target IoTF 1406) in the forward message 1416 (if the target IoTF-U 1406 has no association with the source IoTF 1408). In an aspect of the present disclosure, the forward message 1416 may further include the TID and/or the encrypted first client device context.

The target IoTF 1406 (e.g., the target IoTF-U of the target IoTF 1406) may transmit the data packet and a relocation request to the source IoTF 1408 (e.g., the source IoTF-U of the source IoTF 1408) in the message 1418. In an aspect of the present disclosure, the message 1418 may further include the encrypted first client device context.

In an aspect of the present disclosure, the target IoTF 1406 (e.g., the target IoTF-C of the target IoTF 1406) may request the client device context from the source IoTF 1408 (e.g., the source IoTF-C of the source IoTF 1408). The source IoTF 1408 (e.g., the source IoTF-U of the source IoTF 1408) may verify the encrypted first client device context and may forward the data packet to the P-GW 1410 with an IoTF relocation indication (e.g., an indication of the handover of service from the source IoTF to the target IoTF) in the message 1420. In an aspect of the present disclosure, the IoTF relocation indication may be achieved by providing the global IoTF identifier (GIOTFI) of the target IoTF 1406 (e.g., the target IoTF-U of the target IoTF 1406) to the P-GW 1410.

The source IoTF 1408 (e.g., the source IoTF-C of the source IoTF 1408) may transmit a relocation response message 1424 to the target IoTF 1406 (e.g., the target IoTF-C of the target IoTF 1406). In an aspect of the present disclosure, the relocation response message 1424 may include the first client device context.

The target IoTF 1406 may store 1426 the TID and an identifier of the network access node 1404. The target IoTF 1406 (e.g., the target IoTF-C of the target IoTF 1406) may generate 1428 a new globally unique temporary identifier (GUTI), control plane and user plane keys, and a second client device context (e.g., encrypted second client device context) for the client device 1402. For example, the target IoTF 1406 may generate the second client device context based on the first client device context. In an aspect of the present disclosure, the target IoTF 1406 may generate a security context for the client device 1402 and may include the security context in the second client device context. For example, the security context may include an encryption key, an integrity key, and/or an algorithm. In an aspect of the present disclosure, the target IoTF 1406 (e.g., the target IoTF-C of the target IoTF 1406) may encrypt the second client device context using a secret key (e.g., the context key 130) that is unknown to network entities (e.g., the client device 1402, the network access node 1404, or other IoT functions) outside of the target IoTF 1406.

The target IoTF 1406 (e.g., the target IoTF-C of the target IoTF 1406) may transmit a mobility update message 1430 that updates the mobility anchor at the P-GW 1410. For example, the mobility update message 1430 may include the GIOTFI of the target IoTF 1406.

The target IoTF 1406 (e.g., the target IoTF-C of the target IoTF 1406) may transmit a service relocation message 1432 (also referred to as a control message) to the client device 1402 via the network access node 1404. In an aspect of the present disclosure, the service relocation message includes information associated with the target IoTF 1406. In an aspect of the present disclosure, the service relocation message 1432 may include the TID for the client device 1402, the GUTI, the encrypted second client device context, and/or an indication of handover. After receiving the service relocation message 1432 from the target IoTF 1406, the network access node 1404 may identify a TID corresponding to the client device 1402 included in the service relocation message 1432 and may remove the TID. The network access node 1404 may transmit a service relocation message 1434 to the client device 1402 based on the TID for the client device 1402. In an aspect of the present disclosure, the service relocation message 1434 may include the new GUTI and the encrypted second client device context.

The P-GW 1410 may transmit a message 1436 that includes a data packet (e.g., a DL data packet) to the target IoTF 1406. For example, the DL data packet in the message 1436 may be intended for the client device 1402. The target IoTF 1406 may transmit a message 1438 that includes the TID for the client device 1402 and the data packet to the network access node 1404. The network access node 1404 may forward the DL data packet to the client device 1402 in the forward message 1440. The client device 1402 may transition 1442 to idle mode. The network access node 1404 and the target IoTF 1406 may remove 1444 the client device context.

Figure 15:
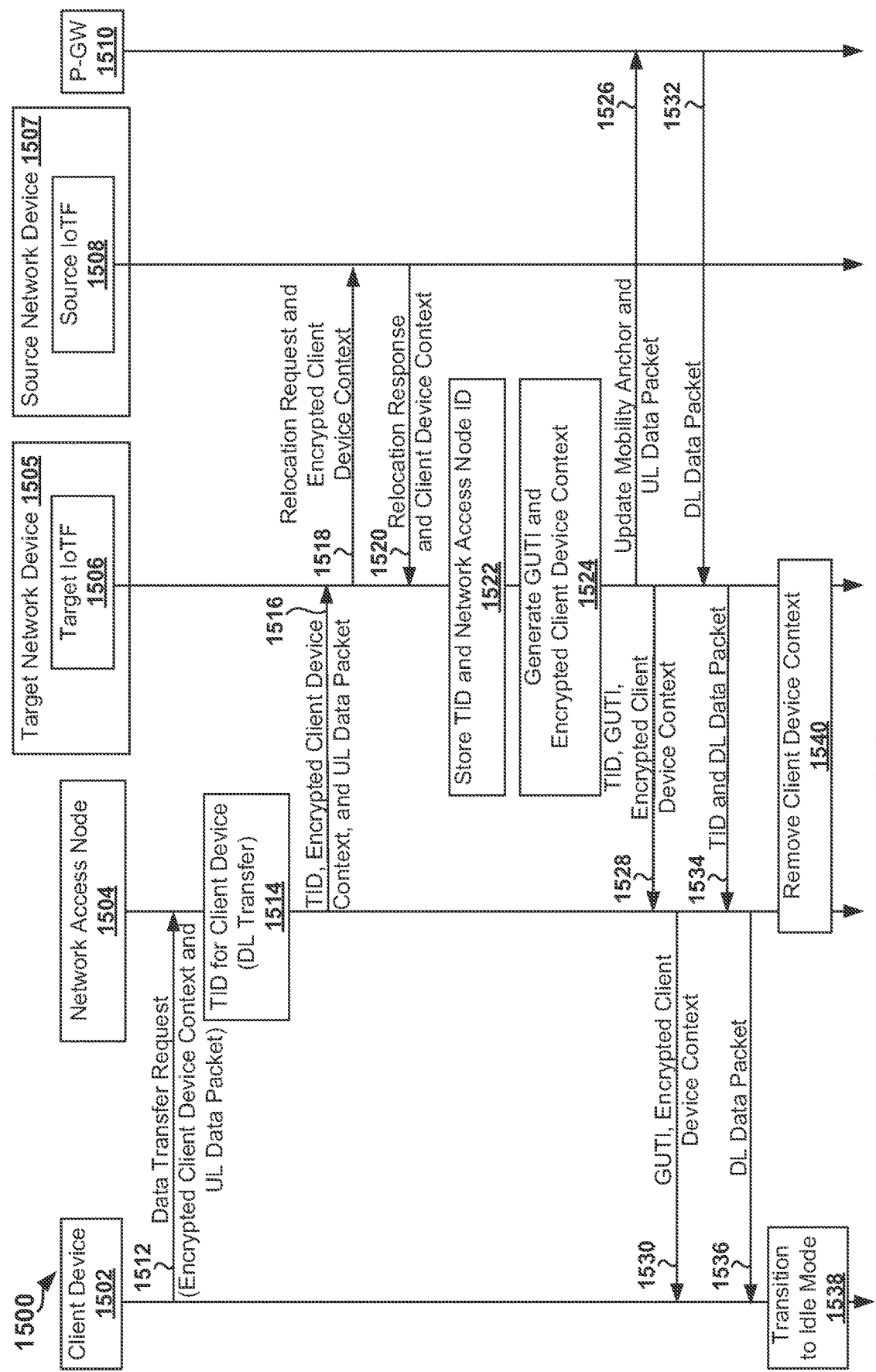
FIG. 15 is a signal flow diagram of an IoTF relocation procedure implementing a second approach for a handover in an IoT network architecture in accordance with various aspects of the present disclosure.

FIG. 15 is a signal flow diagram 1500 of an exemplary IoTF relocation procedure implementing a second approach for a handover in an IoT network architecture in accordance with various aspects of the present disclosure. As shown in FIG. 15, the signal flow diagram 1500 includes a client device 1502 (also referred to as an IoT device), a network access node 1504 (e.g., eNB, base station, or network access point), a target IoTF 1506 implemented at a target network device 1505, and a source IoTF 1508 implemented at a source network device 1507, a source IoTF 1508, and a P-GW 1510. In an aspect of the present disclosure, the target IoTF 1506 may include a control plane target IoTF (target IoTF-C) and a user plane target IoTF (target IoTF-U). In an aspect of the present disclosure, the source IoTF 1508 may include a control plane source IoTF (source IoTF-C) and a user plane source IoTF (source IoTF-U).

When the client device 1502 enters a new service area, the client device 1502 may transmit a data transfer request message 1512 to the network. In an aspect of the present disclosure, the data transfer request message 1512 may include a data packet (e.g., a UL data packet) and information (e.g., the encrypted first client device context) previously obtained from the source IoTF. For example, as shown in FIG. 15, the client device 1502 may include the encrypted first client device context in the data transfer request message 1512. In an aspect of the present disclosure, the data transfer request message 1512 may be transmitted by the client device 1502 without establishing a radio resource control (RRC) connection with the network.

The network access node 1504, upon receipt of the data transfer request message 1512, may assign 1514 a temporary identifier (TID) for the client device 1502 for potential downlink (DL) traffic. The network access node 1504 may further determine the target IoTF identifier included in a header of the data packet received in the data transfer request message 1512. The network access node 1504 may then determine the IP address of the target IoTF 1506, and may forward the data packet to the target IoTF 1506 (e.g., the target IoTF-U of the target IoTF 1506) in the forward message 1516 (if the target IoTF 1506 has no association with the source IoTF 1508). In an aspect of the present disclosure, the forward message 1516 may include the TID and/or the encrypted first client device context.

In an aspect, the target IoTF-U of the target IoTF 1506 may transmit a request for the client device context to the target IoTF-C of the target IoTF 1506. The target IoTF-C of the target IoTF 1506 may then transmit a message requesting the client device context to the source IoTF-C of the source IoTF 1508, where the message includes the encrypted first client device context. For example, the target IoTF 1506 (e.g., the target IoTF-C of the target IoTF 1506) may transmit a message 1518 to the source IoTF 1508 (e.g., the source IoTF-C of the source IoTF 1508), where the message includes a relocation request and the encrypted first client device context. In an aspect of the present disclosure, the relocation request may serve as a request for the client device context.

The source IoTF 1508 (e.g., the source IoTF-C of the source IoTF 1508) may verify the encrypted first client device context and may transmit a relocation response message 1520 to the target IoTF 1506 (e.g., the target IoTF-C of the target IoTF 1506). In an aspect of the present disclosure, the relocation response message 1520 may include the first client device context.

The target IoTF 1506 may store 1522 the TID and an identifier of the network access node 1504. The target IoTF 1506 (e.g., the target IoTF-C of the target IoTF 1506) may generate 1524 a new globally unique temporary identifier (GUTI), control plane and user plane keys, and a second client device context for the client device 1502. For example, the target IoTF 1506 (e.g., the target IoTF-C of the target IoTF 1506) may generate the second client device context based on the first client device context. In an aspect of the present disclosure, the target IoTF 1506 (e.g., the target IoTF-C of the target IoTF 1506) may generate a security context for the client device 1502 and may include the security context in the second client device context. For example, the security context may include an encryption key, an integrity key, and/or an algorithm. In an aspect of the present disclosure, the target IoTF 1506 (e.g., the target IoTF-C of the target IoTF 1506) may encrypt the second client device context using a secret key (e.g., the context key 130) that is unknown to network entities (e.g., the client device 1502, the network access node 1504, or other IoT functions) outside of the target IoTF 1506.

The target IoTF-C of the target IoT 1506 may transmit a request to the target IoTF-U of the target IoT 1506, where the request is to forward the data packet with an indication of IoTF relocation. The target IoTF 1506 (e.g., the target IoTF-U of the target IoT 1506) may send a mobility update message 1526 that updates the mobility anchor at the P-GW 1510. For example, the mobility update message 1526 may include the data packet from the client device 1502 and the GIOTFI of the target IoTF 1506.

The target IoTF 1506 (e.g., the target IoTF-C of the target IoTF 1506) may transmit a service relocation message 1528 (also referred to as a control message) to the client device 1502 via the network access node 1504. In an aspect of the present disclosure, the service relocation message 1528 includes information associated with the target IoTF 1506. In an aspect of the present disclosure, the service relocation message 1528 may include the TID for the client device 1502, the GUTI, the encrypted second client device context, and/or an indication of handover.

After receiving the service relocation message 1528 from the target IoTF 1506, the network access node 1504 may identify a TID corresponding to the client device 1502 included in the service relocation message 1528 and may remove the TID for the client device 1502. The network access node 1504 may transmit a service relocation message 1530 to the client device 1502 based on the TID for the client device 1502. In an aspect of the present disclosure, the service relocation message 1530 may include the new GUTI and the encrypted second client device context.

The P-GW 1510 may transmit a message 1532 that includes a data packet (e.g., a DL data packet) to the target IoTF 1506. For example, the DL data packet in the message 1532 may be intended for the client device 1502. The target IoTF 1506 may transmit a message 1534 that includes the TID for the client device 1502 and the DL data packet to the network access node 1504. The network access node 1504 may forward the DL data packet to the client device 1502 in the forward message 1536. The client device 1502 may transition 1538 to idle mode. The network access node 1504 and the target IoTF 1506 may remove 1540 the client device context.

The aspects disclosed herein provide a clean slate design with new dedicated network functions that enable independent deployment and remove scalability/inter-working requirements. In an aspect of the present disclosure, the security architecture may be configured such that no security context at a network access node is implemented for data transfer to or from client devices. Security features may be anchored at a new network function (referred to as the IoT Function (IoTF)). Dedicated resources are allocated for IoT data transfer in order to avoid affecting normal client devices' PDN connection/traffic. In some aspects, an encrypted client device context may be used for data transfer (e.g., UL data transmission from a client device) to eliminate client device's semi-persistent context at IoTF during the idle-state. In other aspects, an encrypted network reachability context may be used for data transfer to eliminate the client device's semi-persistent context at the IoTF when the client device is in the idle state. The MME/S-GW should not maintain large states (i.e., contexts) of client devices that do not send traffic frequently. Client devices may achieve cost-effective data delivery without exhausting expensive core network resources.

Therefore, in accordance with the aspects disclosed herein, when a client device leaves one service area of a network and enters another service area (e.g., a new service area), it may begin to transmit data (e.g., UL data packets) to the network without first performing a separate service area update procedure (e.g., a TAU procedure). Therefore, the client device may transmit data in a new service area as if it is still attached to the network function (e.g., IoTF) of the previous service area. The network may identify that the service area of the client device has changed to a new service area and may perform a service area update procedure (e.g., a TAU procedure) in response to the data transmission from the client device. If an IoTF relocation procedure should be performed due to movement of the client device from one service area to another service area, the network may perform the IoTF relocation procedure. In an aspect of the present disclosure, the IoTF relocation procedure may be performed in response to a data transmission from the client device or a service area update request (e.g., a TAU request).

First Exemplary Apparatus and Method Thereon

Figure 16:
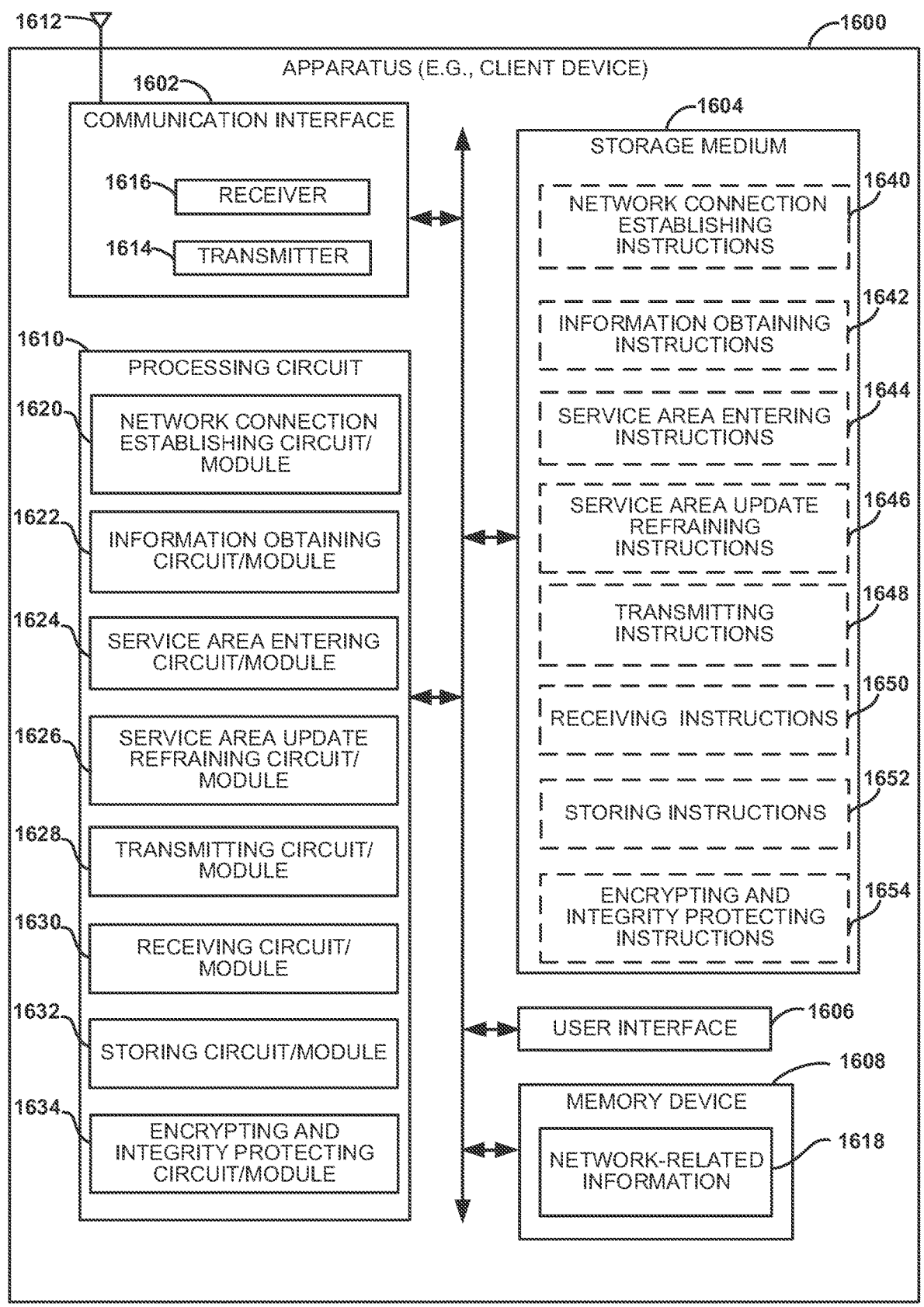
FIG. 16 is an illustration of an apparatus configured to communicate in an IoT network architecture according to one or more aspects of the present disclosure.

FIG. 16 is an illustration of an apparatus 1600 configured to communicate with a network based on an IoT network architecture according to one or more aspects of the disclosure (e.g., aspects related to the method of FIG. 17 described below). In an aspect, the apparatus 1600 may be a client device (also referred to as an IoT device). The apparatus 1600 includes a communication interface (e.g., at least one transceiver) 1602, a storage medium 1604, a user interface 1606, a memory device 1608, and a processing circuit 1610.

These components can be coupled to and/or placed in electrical communication with one another via a signaling bus or other suitable component, represented generally by the connection lines in FIG. 16. The signaling bus may include any number of interconnecting buses and bridges depending on the specific application of the processing circuit 1610 and the overall design constraints. The signaling bus links together various circuits such that each of the communication interface 1602, the storage medium 1604, the user interface 1606, and the memory device 1608 are coupled to and/or in electrical communication with the processing circuit 1610. The signaling bus may also link various other circuits (not shown) such as timing sources, peripherals, voltage regulators, and power management circuits, which are well known in the art, and therefore, will not be described any further.

The communication interface 1602 may be adapted to facilitate wireless communication of the apparatus 1600. For example, the communication interface 1602 may include circuitry and/or code (e.g., instructions) adapted to facilitate the communication of information bi-directionally with respect to one or more communication devices in a network. The communication interface 1602 may be coupled to one or more antennas 1612 for wireless communication within a wireless communication system. The communication interface 1602 can be configured with one or more standalone receivers and/or transmitters, as well as one or more transceivers. In the illustrated example, the communication interface 1602 includes a transmitter 1614 and a receiver 1616.

The memory device 1608 may represent one or more memory devices. As indicated, the memory device 1608 may maintain network-related information/along with other information used by the apparatus 1600. In some implementations, the memory device 1608 and the storage medium 1604 are implemented as a common memory component. The memory device 1608 may also be used for storing data that is manipulated by the processing circuit 1610 or some other component of the apparatus 1600.

The storage medium 1604 may represent one or more computer-readable, machine-readable, and/or processor-readable devices for storing code, such as processor executable code or instructions (e.g., software, firmware), electronic data, databases, or other digital information. The storage medium 1604 may also be used for storing data that is manipulated by the processing circuit 1610 when executing code. The storage medium 1604 may be any available media that can be accessed by a general purpose or special purpose processor, including portable or fixed storage devices, optical storage devices, and various other mediums capable of storing, containing or carrying code.

By way of example and not limitation, the storage medium 1604 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1604 may be embodied in an article of manufacture (e.g., a computer program product). By way of example, a computer program product may include a computer-readable medium in packaging materials. In view of the above, in some implementations, the storage medium 1604 may be a non-transitory (e.g., tangible) storage medium.

The storage medium 1604 may be coupled to the processing circuit 1610 such that the processing circuit 1610 can read information from, and write information to, the storage medium 1604. That is, the storage medium 1604 can be coupled to the processing circuit 1610 so that the storage medium 1604 is at least accessible by the processing circuit 1610, including examples where at least one storage medium is integral to the processing circuit 1610 and/or examples where at least one storage medium is separate from the processing circuit 1610 (e.g., resident in the apparatus 1600, external to the apparatus 1600, distributed across multiple entities, etc.).

Code and/or instructions stored by the storage medium 1604, when executed by the processing circuit 1610, causes the processing circuit 1610 to perform one or more of the various functions and/or process operations described herein. For example, the storage medium 1604 may include operations configured for regulating operations at one or more hardware blocks of the processing circuit 1610, as well as to utilize the communication interface 1602 for wireless communication utilizing their respective communication protocols.

The processing circuit 1610 is generally adapted for processing, including the execution of such code/instructions stored on the storage medium 1604. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1610 is arranged to obtain, process and/or send data, control data access and storage, issue commands, and control other desired operations. The processing circuit 1610 may include circuitry configured to implement desired code provided by appropriate media in at least one example. For example, the processing circuit 1610 may be implemented as one or more processors, one or more controllers, and/or other structure configured to execute executable code. Examples of the processing circuit 1610 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1610 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1610 are for illustration and other suitable configurations within the scope of the disclosure are also contemplated.

According to one or more aspects of the disclosure, the processing circuit 1610 may be adapted to perform any or all of the features, processes, functions, operations and/or routines for any or all of the apparatuses described herein. As used herein, the term "adapted" in relation to the processing circuit 1610 may refer to the processing circuit 1610 being one or more of configured, employed, implemented, and/or programmed to perform a particular process, function, operation and/or routine according to various features described herein.

Figure 17:
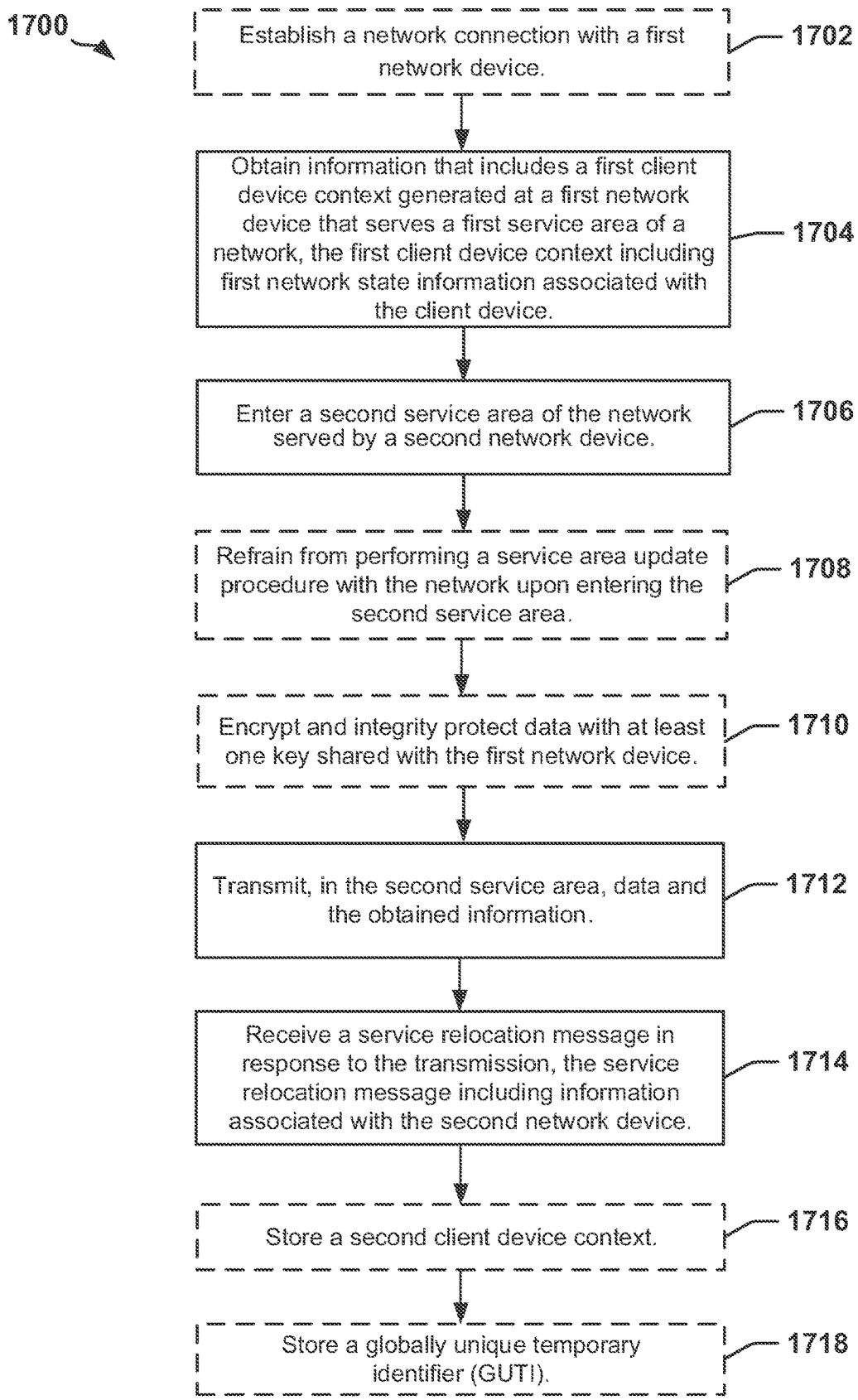
FIG. 17 is a flowchart illustrating a method for an apparatus for communicating with a network in accordance with various aspects of the present disclosure.

According to at least one example of the apparatus 1600, the processing circuit 1610 may include one or more of a network connection establishing circuit/module 1620, a client device context obtaining circuit/module 1622, a service area entering circuit/module 1624, a service area update refraining circuit/module 1626, a transmitting circuit/module 1628, a receiving circuit/module 1630, a storing circuit/module 1632, and an encrypting and integrity protecting circuit/module 1634 that are adapted to perform any or all of the features, processes, functions, operations and/or routines described herein (e.g., features, processes, functions, operations and/or routines described with respect to FIG. 17).

The network connection establishing circuit/module 1620 may include circuitry and/or instructions (e.g., network connection establishing instructions 1640 stored on the storage medium 1604) adapted to perform several functions relating to, for example, establishing a network connection with a first network device.

The client device context obtaining circuit/module 1622 may include circuitry and/or instructions (e.g., client device context obtaining instructions 1642 stored on the storage medium 1604) adapted to perform several functions relating to, for example, obtaining information that includes a first client device context generated at a first network device that serves a first service area of a network, the first client device context including first network state information associated with the client device.

The service area entering circuit/module 1624 may include circuitry and/or instructions (e.g., service area entering instructions 1644 stored on the storage medium 1604) adapted to perform several functions relating to, for example, entering a second service area of the network served by a second network device.

The service area update refraining circuit/module 1626 may include circuitry and/or instructions (e.g., service area update refraining instructions 1646 stored on the storage medium 1604) adapted to perform several functions relating to, for example, refraining from performing a service area update procedure (e.g., a tracking area update (TAU) procedure) with the network upon entering the second service area. In an aspect, the first service area or the second service area is identified as a tracking area based on a tracking area identifier.

The transmitting circuit/module 1628 may include circuitry and/or instructions (e.g., transmitting instructions 1648 stored on the storage medium 1604) adapted to perform several functions relating to, for example, transmitting, in the second service area, data and the obtained information.

The receiving circuit/module 1630 may include circuitry and/or instructions (e.g., receiving instructions 1650 stored on the storage medium 1604) adapted to perform several functions relating to, for example, receiving a service relocation message in response to the transmission, the service relocation message including information associated with the second network device.

The storing circuit/module 1632 may include storing circuitry and/or instructions (e.g., storing instructions 1652 stored on the storage medium 1604) adapted to perform several functions relating to, for example, storing the second client device context and/or storing the GUTI.

The encrypting and integrity protecting circuit/module 1634 may include circuitry and/or instructions (e.g., encrypting and integrity protecting instructions 1654 stored on the storage medium 1604) adapted to perform several functions relating to, for example, encrypting and integrity protecting the data with at least one key shared with the first network device.

As mentioned above, instructions stored by the storage medium 1604, when executed by the processing circuit 1610, causes the processing circuit 1610 to perform one or more of the various functions and/or process operations described herein. For example, the storage medium 1604 may include one or more of the network connection establishing instructions 1640, client device context obtaining instructions 1642, service area entering instructions 1644, service area update refraining instructions 1646, transmitting instructions 1648, receiving instructions 1650, storing instructions 1652, and encrypting and integrity protecting instructions 1654.

FIG. 17 is a flowchart 1700 illustrating a method for communicating with a network in accordance with various aspects of the disclosure. The method may be performed by an apparatus such as a client device (e.g., the client device 102, 502 or the apparatus 1600). It should be understood that the operations indicated by dashed lines in FIG. 17 represent optional operations.

The client device may establish a network connection with a first network device 1702. For example, the client device may be attached to the network as an Internet of Things (IoT) device. The client device may obtain information that includes a first client device context generated at a first network device that serves a first service area of a network, the first client device context including first network state information associated with the client device. In an aspect of the present disclosure, the first network device may be a first Internet of Things Function (IoTF). In an aspect of the present disclosure, the first client device context may be encrypted at the first network device based on a secret key that is only known to the first network device. That is, the secret key may be unknown to the client device and network entities outside of the first network device. In an aspect of the present disclosure, the context is not maintained at the network.

The client device may enter a second service area of the network served by a second network device. In an aspect of the present disclosure, the second network device may be a second Internet of Things Function (IoTF). The client device may refrain from performing a service area update procedure (e.g., a tracking area update (TAU) procedure) with the network upon entering the second service area 1708. The client device may encrypt and integrity protect data with at least one key shared with the first network device 1710. The client device may transmit, in the second service area, data and the obtained information 1712. The client device may receive a service relocation message in response to the transmission, the service relocation message including information associated with the second network device 1714. Therefore, it should be understood that the network may determine the location (e.g., the second service area) of the client device based on the obtained information transmitted from the client device, despite that the client device has refrained from performing a service area update procedure upon entering the second service area. As a result, the client device may continue to receive service from the network in the second service area (e.g., by the second network device) after leaving the first service area, while avoiding the delays associated with performing a service area update procedure.

In an aspect of the present disclosure, the service relocation message is a service area update accept message (e.g., a tracking area update (TAU) accept message). In an aspect of the present disclosure, the service relocation message includes a second client device context associated with the second network device, wherein the second client device context includes second network state information associated with the client device. In an aspect of the present disclosure, the service relocation message includes an identifier associated with the second network device. For example, the identifier may be a globally unique temporary identifier (GUTI). In an aspect of the present disclosure, the second client device context is encrypted at the second network device based on a secret key that is unknown to network entities outside of the second network device.

The client device may store the second client device context 1716. The client device may store the GUTI 1718.

Second Exemplary Apparatus and Method Thereon

Figure 18:
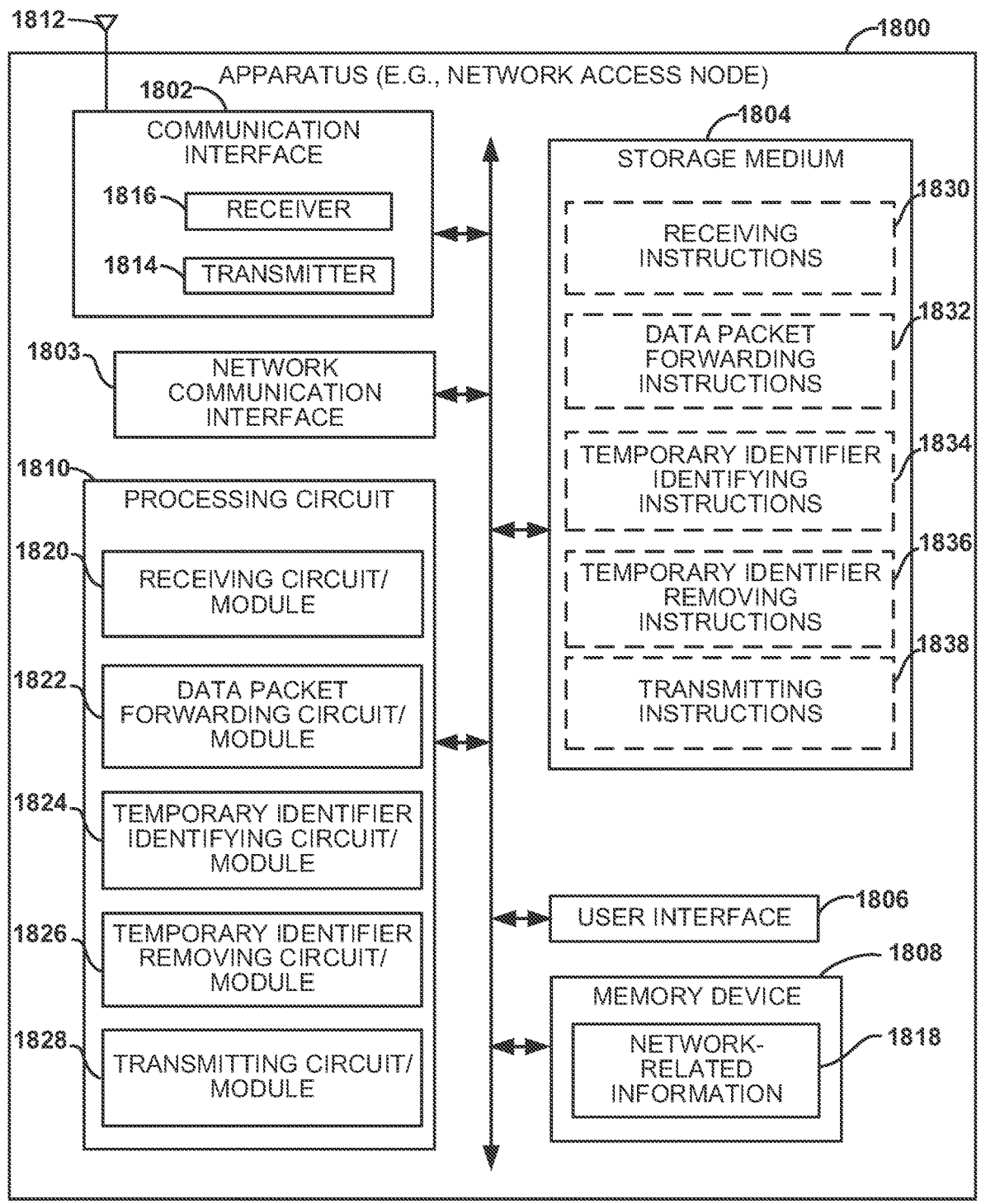
FIG. 18 is an illustration of an apparatus configured to support operations related to communication in an IoT network architecture in accordance with various aspects of the present disclosure.

FIG. 18 is an illustration of an apparatus 1800 according to one or more aspects of the disclosure (e.g., aspects related to the method of FIG. 19 described below). For example, the apparatus 1800 may be a network access node (e.g., eNB, base station, or network access point). The apparatus 1800 includes a communication interface (e.g., at least one transceiver) 1802, a network communication interface 1803, a storage medium 1804, a user interface 1806, a memory device 1808, and a processing circuit 1810.

These components can be coupled to and/or placed in electrical communication with one another via a signaling bus or other suitable component, represented generally by the connection lines in FIG. 18. The signaling bus may include any number of interconnecting buses and bridges depending on the specific application of the processing circuit 1810 and the overall design constraints. The signaling bus links together various circuits such that each of the communication interface 1802, the network communication interface 1803, the storage medium 1804, the user interface 1806, and the memory device 1808 are coupled to and/or in electrical communication with the processing circuit 1810. The signaling bus may also link various other circuits (not shown) such as timing sources, peripherals, voltage regulators, and power management circuits, which are well known in the art, and therefore, will not be described any further.

The communication interface 1802 may be adapted to facilitate wireless communication of the apparatus 1800. For example, the communication interface 1802 may include circuitry and/or code (e.g., instructions) adapted to facilitate the communication of information bi-directionally with respect to one or more communication devices in a network. The communication interface 1802 may be coupled to one or more antennas 1812 for wireless communication within a wireless communication system. The communication interface 1802 can be configured with one or more standalone receivers and/or transmitters, as well as one or more transceivers. In the illustrated example, the communication interface 1802 includes a transmitter 1814 and a receiver 1816.

The network communication interface 1803 may be adapted to facilitate communication of the apparatus 1800. For example, the network communication interface 1803 may include circuitry and/or code (e.g., instructions) adapted to facilitate the communication of information bi-directionally with respect to one or more network entities in a network. The network communication interface 1803 can be configured with one or more standalone receivers and/or transmitters, as well as one or more transceivers.

The memory device 1808 may represent one or more memory devices. As indicated, the memory device 1808 may maintain network-related information/along with other information used by the apparatus 1800. In some implementations, the memory device 1808 and the storage medium 1804 are implemented as a common memory component. The memory device 1808 may also be used for storing data that is manipulated by the processing circuit 1810 or some other component of the apparatus 1800.

The storage medium 1804 may represent one or more computer-readable, machine-readable, and/or processor-readable devices for storing code, such as processor executable code or instructions (e.g., software, firmware), electronic data, databases, or other digital information. The storage medium 1804 may also be used for storing data that is manipulated by the processing circuit 1810 when executing code. The storage medium 1804 may be any available media that can be accessed by a general purpose or special purpose processor, including portable or fixed storage devices, optical storage devices, and various other mediums capable of storing, containing or carrying code.

By way of example and not limitation, the storage medium 1804 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1804 may be embodied in an article of manufacture (e.g., a computer program product). By way of example, a computer program product may include a computer-readable medium in packaging materials. In view of the above, in some implementations, the storage medium 1804 may be a non-transitory (e.g., tangible) storage medium.

The storage medium 1804 may be coupled to the processing circuit 1810 such that the processing circuit 1810 can read information from, and write information to, the storage medium 1804. That is, the storage medium 1804 can be coupled to the processing circuit 1810 so that the storage medium 1804 is at least accessible by the processing circuit 1810, including examples where at least one storage medium is integral to the processing circuit 1810 and/or examples where at least one storage medium is separate from the processing circuit 1810 (e.g., resident in the apparatus 1800, external to the apparatus 1800, distributed across multiple entities, etc.).

Code and/or instructions stored by the storage medium 1804, when executed by the processing circuit 1810, causes the processing circuit 1810 to perform one or more of the various functions and/or process operations described herein. For example, the storage medium 1804 may include operations configured for regulating operations at one or more hardware blocks of the processing circuit 1810, as well as to utilize the communication interface 1802 for wireless communication and the network communication interface 1803 for network communication utilizing their respective communication protocols.

The processing circuit 1810 is generally adapted for processing, including the execution of such code/instructions stored on the storage medium 1804. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1810 is arranged to obtain, process and/or send data, control data access and storage, issue commands, and control other desired operations. The processing circuit 1810 may include circuitry configured to implement desired code provided by appropriate media in at least one example. For example, the processing circuit 1810 may be implemented as one or more processors, one or more controllers, and/or other structure configured to execute executable code. Examples of the processing circuit 1810 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1810 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1810 are for illustration and other suitable configurations within the scope of the disclosure are also contemplated.

According to one or more aspects of the disclosure, the processing circuit 1810 may be adapted to perform any or all of the features, processes, functions, operations and/or routines for any or all of the apparatuses described herein. As used herein, the term "adapted" in relation to the processing circuit 1810 may refer to the processing circuit 1810 being one or more of configured, employed, implemented, and/or programmed to perform a particular process, function, operation and/or routine according to various features described herein.

Figure 19:
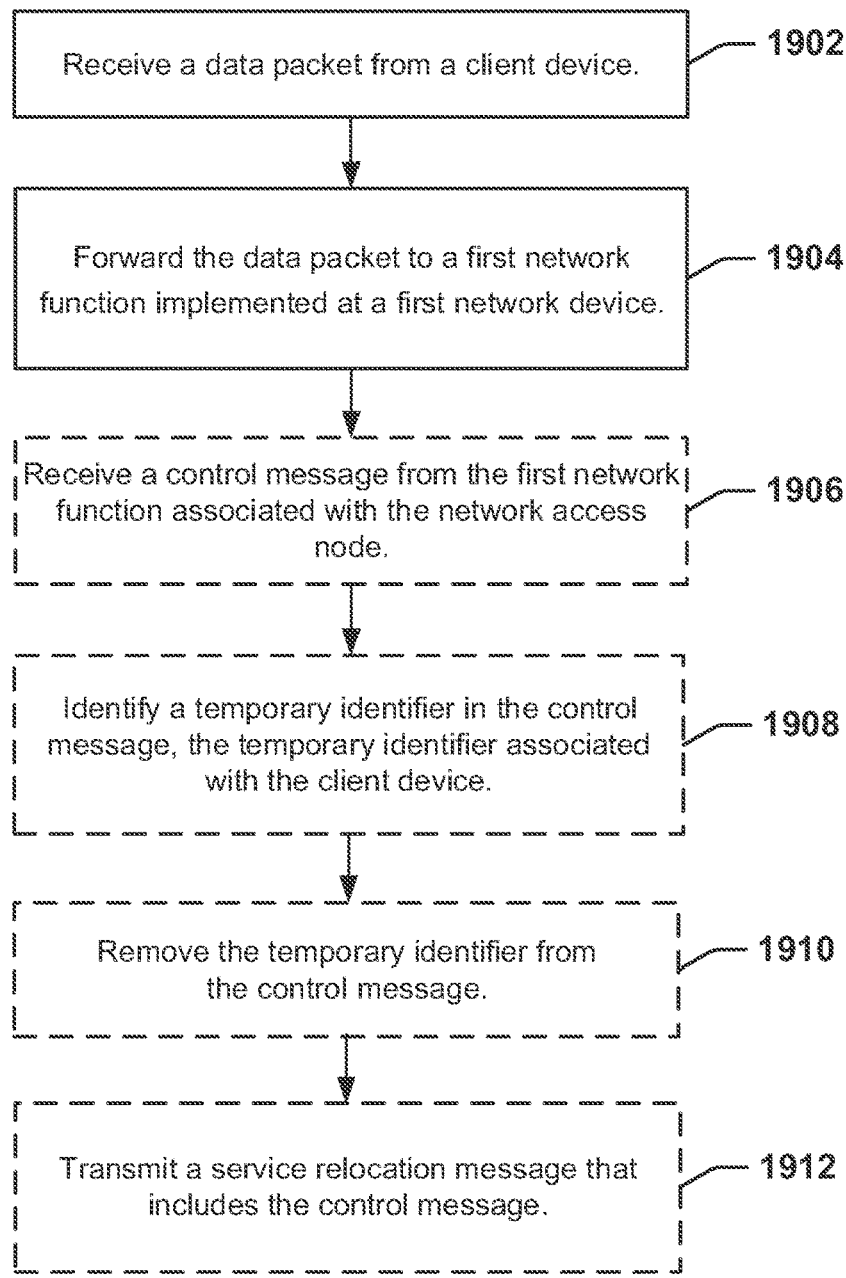
FIG. 19 is a flowchart illustrating a method for an apparatus for communicating in an IoT network architecture in accordance with various aspects of the present disclosure.

According to at least one example of the apparatus 1800, the processing circuit 1810 may include one or more of a receiving circuit/module 1820, data packet forwarding circuit/module 1822, temporary identifier identifying circuit/module 1824, temporary identifier removing circuit/module 1826, and a transmitting circuit/module 1828 that are adapted to perform any or all of the features, processes, functions, operations and/or routines described herein (e.g., features, processes, functions, operations and/or routines described with respect to FIG. 19).

The receiving circuit/module 1820 may include circuitry and/or instructions (e.g., receiving instructions 1830 stored on the storage medium 1804) adapted to perform several functions relating to, for example, receiving a data packet from a client device and receiving a control message from the first network function associated with the apparatus 1800 (e.g., network access node).

The data packet forwarding circuit/module 1822 may include circuitry and/or instructions (e.g., data packet forwarding instructions 1832 stored on the storage medium 1804) adapted to perform several functions relating to, for example, forwarding the data packet to a first network function implemented at a first network device. In an aspect, the first network function is associated with the apparatus 1800 (e.g., network access node) and is configured to process at least one of user plane traffic or control plane traffic for the client device when the client device is in a reduced data transfer mode. For example, the first network function may be the target IoTF 1406 or the target IoTF 1506.

The temporary identifier identifying circuit/module 1824 may include circuitry and/or instructions (e.g., temporary identifier identifying 1834 stored on the storage medium 1804) adapted to perform several functions relating to, for example, identifying a temporary identifier in the control message, the temporary identifier associated with the client device.

The temporary identifier removing circuit/module 1826 may include circuitry and/or instructions (e.g., temporary identifier removing instructions 1836 stored on the storage medium 1804) adapted to perform several functions relating to, for example, removing the temporary identifier from the control message.

The transmitting circuit/module 1828 may include circuitry and/or instructions (e.g., transmitting instructions 1838 stored on the storage medium 1804) adapted to perform several functions relating to, for example, transmitting, to the client device, a service relocation message that includes the control message.

As mentioned above, instructions stored by the storage medium 1804, when executed by the processing circuit 1810, causes the processing circuit 1810 to perform one or more of the various functions and/or process operations described herein. For example, the storage medium 1804 may include one or more of the receiving instructions 1830, data packet forwarding instructions 1832, temporary identifier removing instructions 1836, and transmitting instructions 1838.

FIG. 19 is a flowchart 1900 illustrating a method for communicating in an IoT network architecture in accordance with various aspects of the disclosure. The method may be performed by an apparatus such as a network access node (e.g., the network access node 104 of FIG. 1, the network access node 1404 of FIG. 14, the network access node 1504 of FIG. 15, or the apparatus 1800 of FIG. 18).

The network access node may receive a data packet from a client device 1902. The network access node may forward the data packet to a first network function implemented at a first network device 1904. In an aspect, the first network function is associated with the network access node and is configured to process at least one of user plane traffic or control plane traffic for the client device when the client device is in a reduced data transfer mode. For example, the first network function may be the target IoTF 1406 or the target IoTF 1506.

In an aspect of the present disclosure, the first network function associated with the network access node is different from a second network function indicated in the data packet. For example, the second network function may be the source IoTF 1408 or the source IoTF 1508. The network access node may receive a control message from the first network function associated with the network access node 1906. In an aspect of the present disclosure, the control message includes information associated with the first network function. In an aspect of the present disclosure, the control message includes a client device context generated at the first network function, wherein the client device context includes network state information associated with the client device. The network access node may identify a temporary identifier in the control message, the temporary identifier associated with the client device 1908. The network access node may remove the temporary identifier from the control message 1910. The network access node may transmit, to the client device, a service relocation message that includes the control message 1912.

Third Exemplary Apparatus and Method Thereon

Figure 20:
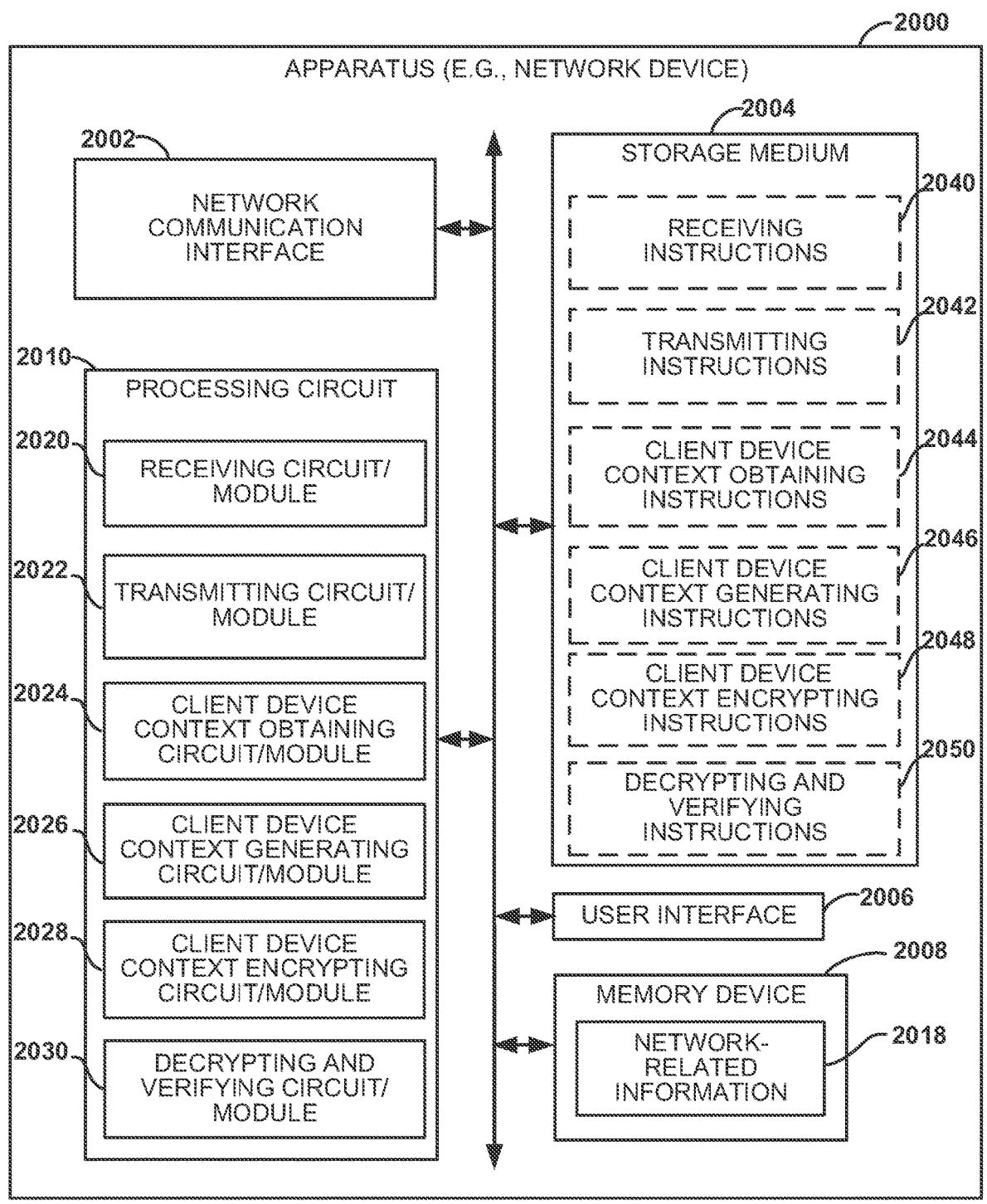
FIG. 20 is an illustration of an apparatus configured to support operations related to communication in an IoT network architecture in accordance with various aspects of the present disclosure.

FIG. 20 is an illustration of an apparatus 2000 according to one or more aspects of the disclosure (e.g., aspects related to the method of FIGS. 21 and 22 described below). For example, the apparatus 2000 may be a network device (e.g., network device 105, 505) that implements an Internet of Things (IoT) Function (e.g., target IoTF 1406, source IoTF 1408, target IoTF 1506, or source IoTF 1508). For example, the IoT Function may include a control plane IoT Function (e.g., IoTF-C 106, 506, 706, 906) and/or a user plane IoT Function (e.g., IoTF-U 108, 508, 708, 806, 908) as previously discussed. The apparatus 2000 includes a network communication interface (e.g., at least one transceiver) 2002, a storage medium 2004, a user interface 2006, a memory device 2008, and a processing circuit 2010.

These components can be coupled to and/or placed in electrical communication with one another via a signaling bus or other suitable component, represented generally by the connection lines in FIG. 20. The signaling bus may include any number of interconnecting buses and bridges depending on the specific application of the processing circuit 2010 and the overall design constraints. The signaling bus links together various circuits such that each of the network communication interface 2002, the storage medium 2004, the user interface 2006, and the memory device 2008 are coupled to and/or in electrical communication with the processing circuit 2010. The signaling bus may also link various other circuits (not shown) such as timing sources, peripherals, voltage regulators, and power management circuits, which are well known in the art, and therefore, will not be described any further.

The network communication interface 2002 may be adapted to facilitate communication of the apparatus 2000. For example, the network communication interface 2002 may include circuitry and/or code (e.g., instructions) adapted to facilitate the communication of information bi-directionally with respect to one or more network entities in a network. The network communication interface 2002 can be configured with one or more standalone receivers and/or transmitters, as well as one or more transceivers.

The memory device 2008 may represent one or more memory devices. As indicated, the memory device 2008 may maintain network-related information/along with other information used by the apparatus 2000. In some implementations, the memory device 2008 and the storage medium 2004 are implemented as a common memory component. The memory device 2008 may also be used for storing data that is manipulated by the processing circuit 2010 or some other component of the apparatus 2000.

The storage medium 2004 may represent one or more computer-readable, machine-readable, and/or processor-readable devices for storing code, such as processor executable code or instructions (e.g., software, firmware), electronic data, databases, or other digital information. The storage medium 2004 may also be used for storing data that is manipulated by the processing circuit 2010 when executing code. The storage medium 2004 may be any available media that can be accessed by a general purpose or special purpose processor, including portable or fixed storage devices, optical storage devices, and various other mediums capable of storing, containing or carrying code.

By way of example and not limitation, the storage medium 2004 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 2004 may be embodied in an article of manufacture (e.g., a computer program product). By way of example, a computer program product may include a computer-readable medium in packaging materials. In view of the above, in some implementations, the storage medium 2004 may be a non-transitory (e.g., tangible) storage medium.

The storage medium 2004 may be coupled to the processing circuit 2010 such that the processing circuit 2010 can read information from, and write information to, the storage medium 2004. That is, the storage medium 2004 can be coupled to the processing circuit 2010 so that the storage medium 2004 is at least accessible by the processing circuit 2010, including examples where at least one storage medium is integral to the processing circuit 2010 and/or examples where at least one storage medium is separate from the processing circuit 2010 (e.g., resident in the apparatus 2000, external to the apparatus 2000, distributed across multiple entities, etc.).

Code and/or instructions stored by the storage medium 2004, when executed by the processing circuit 2010, causes the processing circuit 2010 to perform one or more of the various functions and/or process operations described herein. For example, the storage medium 2004 may include operations configured for regulating operations at one or more hardware blocks of the processing circuit 2010, as well as to utilize the network communication interface 2002 for wireless communication utilizing their respective communication protocols.

The processing circuit 2010 is generally adapted for processing, including the execution of such code/instructions stored on the storage medium 2004. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 2010 is arranged to obtain, process and/or send data, control data access and storage, issue commands, and control other desired operations. The processing circuit 2010 may include circuitry configured to implement desired code provided by appropriate media in at least one example. For example, the processing circuit 2010 may be implemented as one or more processors, one or more controllers, and/or other structure configured to execute executable code. Examples of the processing circuit 2010 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2010 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2010 are for illustration and other suitable configurations within the scope of the disclosure are also contemplated.

According to one or more aspects of the disclosure, the processing circuit 2010 may be adapted to perform any or all of the features, processes, functions, operations and/or routines for any or all of the apparatuses described herein. As used herein, the term "adapted" in relation to the processing circuit 2010 may refer to the processing circuit 2010 being one or more of configured, employed, implemented, and/or programmed to perform a particular process, function, operation and/or routine according to various features described herein.

Figure 21:
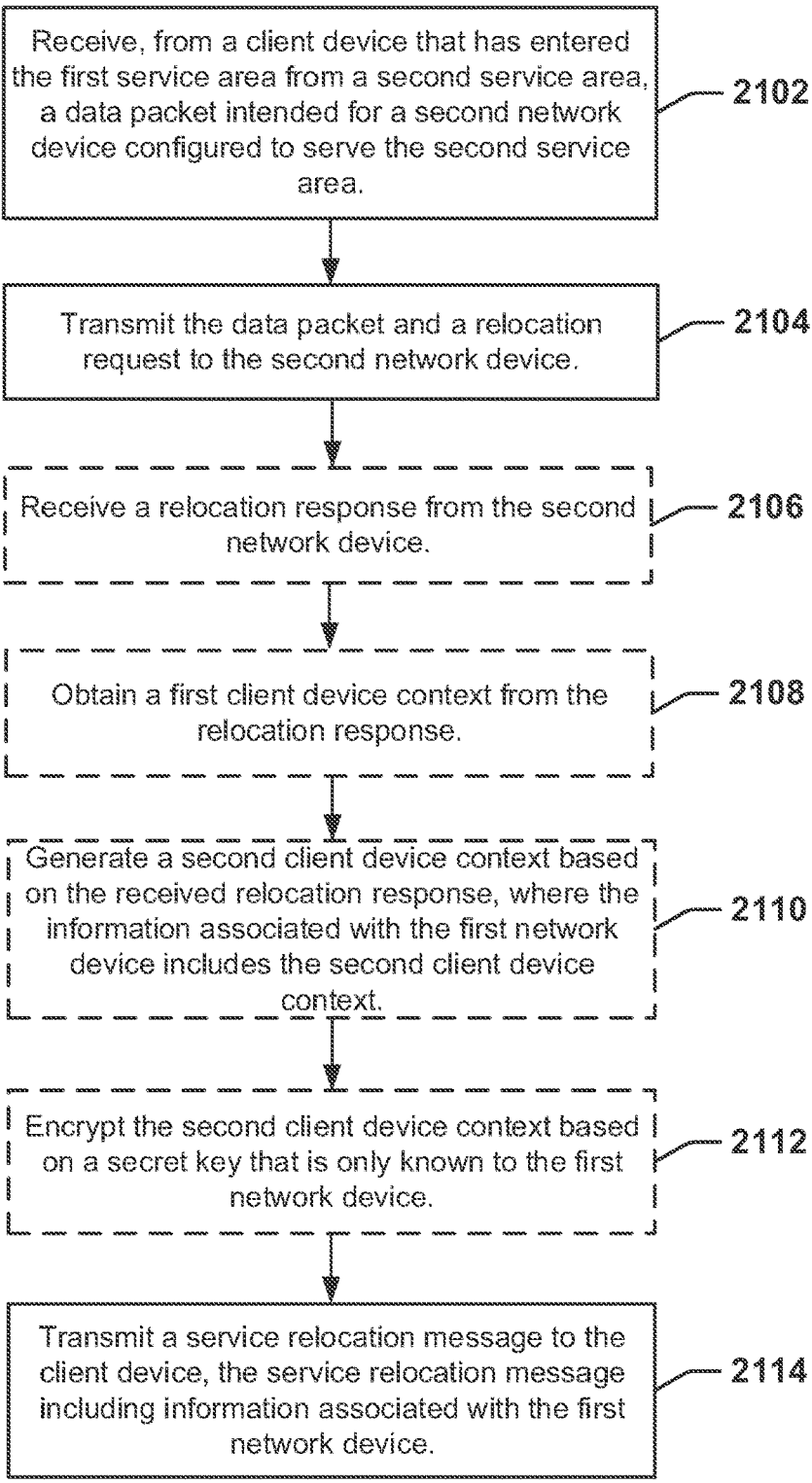
FIG. 21 is a flowchart illustrating a method for an apparatus for communicating in an IoT network architecture in accordance with various aspects of the present disclosure.
Figure 22:
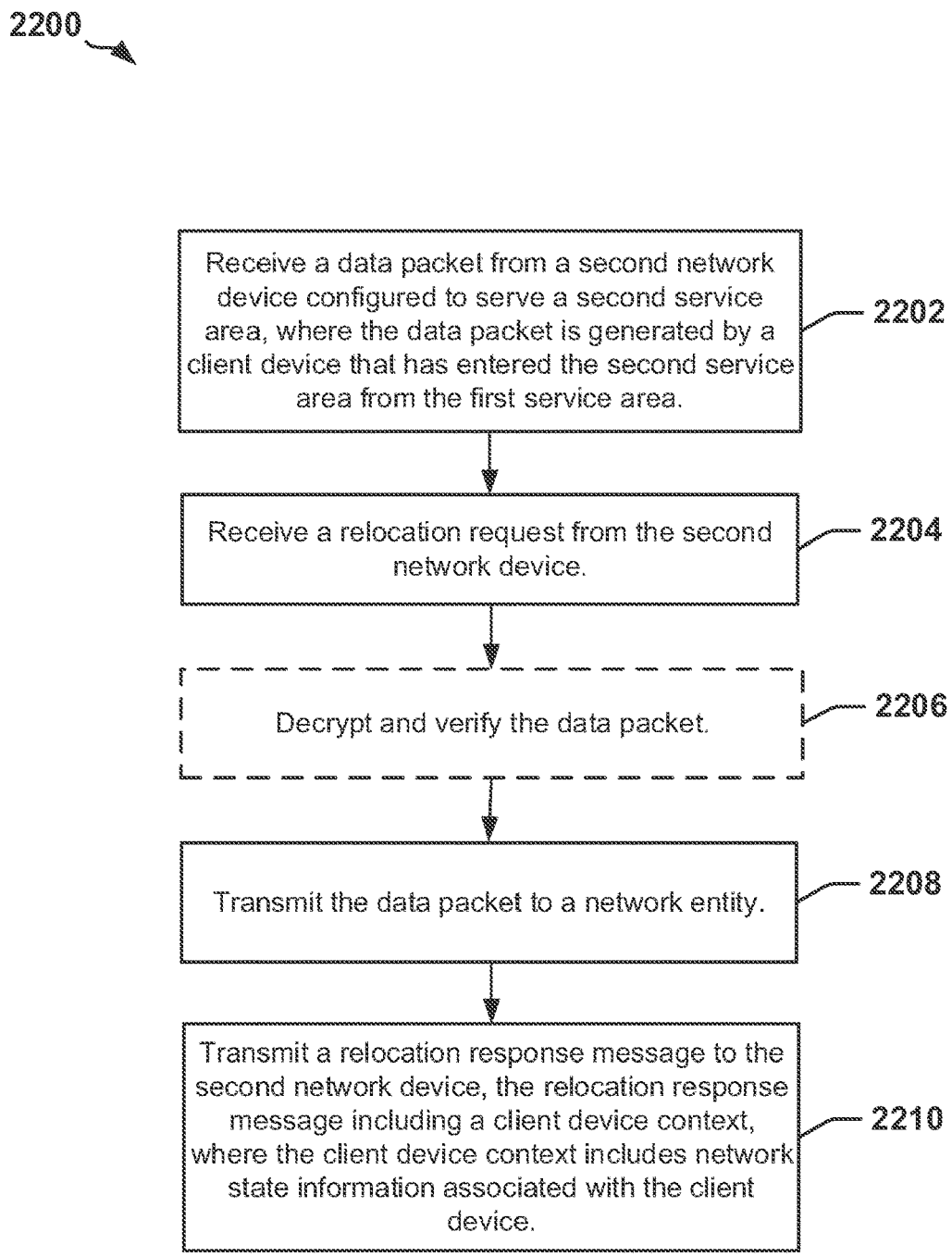
FIG. 22 is a flowchart illustrating a method for an apparatus for communicating in an IoT network architecture in accordance with various aspects of the present disclosure.

According to at least one example of the apparatus 2000, the processing circuit 2010 may include one or more of a receiving circuit/module 2020, transmitting circuit/module 2022, client device context obtaining circuit/module 2024, client device context generating circuit/module 2026, client device context encrypting circuit/module 2028, and a decrypting and verifying circuit/module 2030 that are adapted to perform any or all of the features, processes, functions, operations and/or routines described herein (e.g., features, processes, functions, operations and/or routines described with respect to FIGS. 21 and 22).

In an aspect of the present disclosure, the apparatus 2000 may be a first network device configured to serve a first service area of a network. For example, the apparatus may be a target IoT Function in communication with a source IoT Function. In such example, the receiving circuit/module 2020 may include circuitry and/or instructions (e.g., receiving instructions 2040 stored on the storage medium 2004) adapted to perform several functions relating to, for example, receiving, from a client device that has entered the first service area from a second service area, a data packet intended for a second network device configured to serve the second service area, and receiving a relocation response from the second network device. For example, the data packet received from the client device may be encrypted and integrity protected with at least one key shared between the client device and the second network device. For example, the service relocation message may be integrity protected.

The transmitting circuit/module 2022 may include circuitry and/or instructions (e.g., transmitting instructions 2042 stored on the storage medium 2004) adapted to perform several functions relating to, for example, transmitting a data packet and a relocation request to the second network device, and transmitting a service relocation message, the service relocation message including information associated with the first network device.

The client device context obtaining circuit/module 2024 may include circuitry and/or instructions (e.g., client device context obtaining 2044 stored on the storage medium 2004) adapted to perform several functions relating to, for example, obtaining a first client device context from the relocation response.

The client device context generating circuit/module 2026 may include circuitry and/or instructions (e.g., client device context generating 2046 stored on the storage medium 2004) adapted to perform several functions relating to, for example, generating a second client device context based on the received relocation response, wherein the information associated with the first network device includes the second client device context. In an aspect of the present disclosure, generating the second client device context includes generating a globally unique temporary identifier (GUTI) and generating a security context that includes at least an encryption key, an integrity key, or an algorithm. In an aspect of the present disclosure, the second client device context is generated based on the first client device context. For example, the information associated with the first network device may include the GUTI.

The client device context encrypting circuit/module 2028 may include circuitry and/or instructions (e.g., client device context encrypting 2048 stored on the storage medium 2004) adapted to perform several functions relating to, for example, encrypting the second client device context based on a secret key that is unknown to network entities outside of the first network device.

In an aspect of the present disclosure, the apparatus 2000 may be a first network device configured to serve a first service area of a network. For example, the apparatus may be a source IoT Function in communication with a target IoT Function. In such example, the receiving circuit/module 2020 may include circuitry and/or instructions (e.g., receiving instructions 2040 stored on the storage medium 2004) adapted to perform several functions relating to, for example, receiving a data packet from a second network device configured to serve a second service area, wherein the data packet is generated by a client device that has entered the second service area from the first service area, and receiving a relocation request from the second network device.

The transmitting circuit/module 2022 may include circuitry and/or instructions (e.g., transmitting instructions 2042 stored on the storage medium 2004) adapted to perform several functions relating to, for example, transmitting the data packet to a network entity (e.g., a P-GW) and transmitting a relocation response message to the second network device, the relocation response message including a client device context, where the client device context includes network state information associated with the client device.

The decrypting and verifying circuit/module 2030 may include circuitry and/or instructions (e.g., transmitting instructions 2050 stored on the storage medium 2004) adapted to perform several functions relating to, for example, decrypting and verifying the data packet.

As mentioned above, instructions stored by the storage medium 2004, when executed by the processing circuit 2010, causes the processing circuit 2010 to perform one or more of the various functions and/or process operations described herein. For example, the storage medium 2004 may include one or more of the receiving instructions 2040, transmitting instructions 2042, client device context obtaining instructions 2044, client device context generating instructions 2046, client device context encrypting instructions 2048, and decrypting and verifying instructions 2050.

FIG. 21 is a flowchart 2100 illustrating a method for communicating in an IoT network architecture in accordance with various aspects of the disclosure. The method may be performed by an apparatus such as a first network device that implements a target IoT Function.

The apparatus may receive, from a client device that has entered the first service area from a second service area, a data packet intended for a second network device configured to serve the second service area 2102. For example, the second network device may implement a source IoT Function.

In an aspect of the present disclosure, the data packet received from the client device is encrypted and integrity protected with at least one key shared between the client device and the second network device. The apparatus may transmit the data packet and a relocation request to the second network device 2104.

The apparatus may receive a relocation response from the second network device 2106. In an aspect of the present disclosure, the service relocation message is integrity protected. The apparatus obtains a first client device context from the relocation response 2108.

The apparatus may generate a second client device context based on the received relocation response, wherein the information associated with the first network device includes the second client device context 2110. In an aspect of the present disclosure, the second client device context is generated based on the first client device context. In an aspect of the present disclosure, to generate the second client device context, the apparatus may generate a globally unique temporary identifier (GUTI). The apparatus may also generate a security context that includes at least an encryption key, an integrity key, or an algorithm. In an aspect of the present disclosure, the information associated with the first network device includes the GUTI.

The apparatus may encrypt the second client device context based on a secret key that is only known to the first network device 2112. That is, the secret key may be unknown to network entities outside of the first network device. The apparatus may transmit a service relocation message to the client device, the service relocation message including information associated with the first network device 2114.

FIG. 22 is a flowchart 2200 illustrating a method for communicating in an IoT network architecture in accordance with various aspects of the disclosure. The method may be performed by an apparatus such as a first network device. For example, the first network device may be a source IoT Function.

The apparatus may receive a data packet from a second network device configured to serve a second service area, wherein the data packet is generated by a client device that has entered the second service area from the first service area 2202. For example, the second network device may be a target IoT Function. The apparatus may receive a relocation request from the second network device 2204.

The apparatus may decrypt and verify (e.g., verify the integrity of the data packet based on an integrity key) the data packet 2206. The apparatus may transmit the data packet to a network entity (e.g., third network device) 2208. For example, the network entity may be a network node (e.g., P-GW). The apparatus may transmit a relocation response message to the second network device, the relocation response message including a client device context, wherein the client device context includes network state information associated with the client device 2210.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while exemplary implementations may have been discussed herein as device, system, or method implementations, it should be understood that such exemplary implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like. As used herein, the term "obtaining" may include one or more actions including, but not limited to, receiving, generating, determining, or any combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A method for a network access node, comprising:
   receiving a data packet from a client device;
   forwarding the data packet to a first network function implemented at a first network device, wherein the first network function is associated with the network access node and is configured to process at least one of user plane traffic or control plane traffic for the client device when the client device is in a reduced data transfer mode;
   receiving a control message from the first network function associated with the network access node;
   identifying a temporary identifier in the control message, the temporary identifier associated with the client device;
   removing the temporary identifier from the control message; and
   transmitting, to the client device, a service relocation message that includes the control message.

2. The method of claim 1, wherein the first network function associated with the network access node is different from a second network function indicated in the data packet, the second network function implemented at a second network device.

3. The method of claim 1, wherein the control message includes information associated with the first network function implemented at the first network device.

4. The method of claim 1, wherein the control message includes a client device context generated at the first network function implemented at the first network device, and wherein the client device context includes network state information associated with the client device.

5. The method of claim 4, wherein the client device context is encrypted by the first network function implemented at the first network device.

6. A network access node, comprising:
   a wireless communication circuit configured for communications with a client device;
   a processing circuit coupled to the wireless communication circuit, the processing circuit configured to
      receive a data packet from a client device;
      forward the data packet to a first network function implemented at a first network device, wherein the first network function is associated with the network access node and is configured to process at least one of user plane traffic or control plane traffic for the client device when the client device is in a reduced data transfer mode;

receive a control message from the first network function associated with the network access node;

identify a temporary identifier in the control message, the temporary identifier associated with the client device;

remove the temporary identifier from the control message; and transmit, to the client device, a service relocation message that includes the control message.

7. The network access node of claim 6, wherein the first network function associated with the network access node is different from a second network function indicated in the data packet, the second network function implemented at a second network device.

8. The network access node of claim 6, wherein the control message includes information associated with the first network function implemented at the first network device.

9. The network access node of claim 6, wherein the control message includes a client device context generated at the first network function implemented at the first network device, and wherein the client device context includes network state information associated with the client device.

10. The network access node of claim 9, wherein the client device context is encrypted by the first network function implemented at the first network device.

11. A non-transitory processor-readable storage medium having instructions stored thereon, which when executed by at least one processing circuit causes the at least one processing circuit to:

receive a data packet from a client device;

forward the data packet to a first network function implemented at a first network device, wherein the first network function is associated with a network access node and is configured to process at least one of user plane traffic or control plane traffic for the client device when the client device is in a reduced data transfer mode;

receive a control message from the first network function associated with the network access node;

identify a temporary identifier in the control message, the temporary identifier associated with the client device;

remove the temporary identifier from the control message; and transmit, to the client device, a service relocation message that includes the control message.

12. The non-transitory processor-readable storage medium of claim 11, wherein the first network function associated with the network access node is different from a second network function indicated in the data packet, the second network function implemented at a second network device.

13. The non-transitory processor-readable storage medium of claim 11, wherein the control message includes information associated with the first network function implemented at the first network device.

14. The non-transitory processor-readable storage medium of claim 11, wherein the control message includes a client device context generated at the first network function implemented at the first network device, and wherein the client device context includes network state information associated with the client device.

15. The non-transitory processor-readable storage medium of claim 14, wherein the client device context is encrypted by the first network function implemented at the first network device.

16. An apparatus, comprising:

means for receiving a data packet from a client device;

means for forwarding the data packet to a first network function implemented at a first network device, wherein the first network function is associated with the apparatus and is configured to process at least one of user plane traffic or control plane traffic for the client device when the client device is in a reduced data transfer mode;

means for receiving a control message from the first network function associated with the apparatus;

means for identifying a temporary identifier in the control message, the temporary identifier associated with the client device;

means for removing the temporary identifier from the control message; and means for transmitting, to the client device, a service relocation message that includes the control message.

17. The apparatus of claim 16, wherein the first network function associated with the apparatus is different from a second network function indicated in the data packet, the second network function implemented at a second network device.

18. The apparatus of claim 16, wherein the control message includes information associated with the first network function implemented at the first network device.

19. The apparatus of claim 16, wherein the control message includes a client device context generated at the first network function implemented at the first network device, and wherein the client device context includes network state information associated with the client device.

20. The apparatus of claim 19, wherein the client device context is encrypted by the first network function implemented at the first network device.

* * * * *